US009883404B2

(12) United States Patent
Malladi et al.

(10) Patent No.: US 9,883,404 B2
(45) Date of Patent: Jan. 30, 2018

(54) LTE/LTE—A UPLINK CARRIER AGGREGATION USING UNLICENSED SPECTRUM

(71) Applicant: QUALCOMM Incorporated, San Diego, CA (US)

(72) Inventors: Durga Prasad Malladi, San Diego, CA (US); Naga Bhushan, San Diego, CA (US); Tao Luo, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 14/096,686

(22) Filed: Dec. 4, 2013

(65) Prior Publication Data

US 2014/0362780 A1   Dec. 11, 2014

Related U.S. Application Data

(60) Provisional application No. 61/833,674, filed on Jun. 11, 2013.

(51) Int. Cl.
*H04W 16/14*   (2009.01)
*H04W 74/08*   (2009.01)
(Continued)

(52) U.S. Cl.
CPC ............. *H04W 16/14* (2013.01); *H04L 5/001* (2013.01); *H04L 5/0092* (2013.01);
(Continued)

(58) Field of Classification Search
CPC ..... H04W 16/14; H04W 28/08; H04W 72/04; H04W 72/1231; H04W 72/1278;
(Continued)

(56) References Cited

U.S. PATENT DOCUMENTS

2010/0303034 A1* 12/2010 Chen et al. .................... 370/329
2011/0287794 A1* 11/2011 Koskela et al. .............. 455/509
(Continued)

FOREIGN PATENT DOCUMENTS

JP   2013069377 A   4/2013
KR   20130028950 A   3/2013
(Continued)

OTHER PUBLICATIONS

Ratasuk et al., "License-Exempt LTE Deployment in Heterogeneous Network," 2012 International Symposium on Wireless Communication Systems (ISWCS), Paris, FR, Aug. 28-31, 2012, pp. 246-250, ISBN 978-1-4673-0761-1, Institute of Electrical and Electronics Engineers.

(Continued)

*Primary Examiner* — Yamane Mesfin
*Assistant Examiner* — Peter Chen
(74) *Attorney, Agent, or Firm* — Liem T. Do

(57) ABSTRACT

Methods, systems, and apparatuses are described for wireless communications. In one method, an uplink grant may be received over a licensed spectrum. A clear channel assessment (CCA) may be performed in response to the uplink grant to determine availability of an unlicensed spectrum. The CCA may be performed prior to a transmission associated with the uplink grant. In another method, scheduling information may be received over a licensed spectrum. An uplink grant may be transmitted over the licensed spectrum. The uplink grant may be based at least in part on the scheduling information. The uplink grant may be configured to trigger a CCA to determine availability of an unlicensed spectrum prior to a transmission associated with the uplink grant.

61 Claims, 25 Drawing Sheets

(51) Int. Cl.
  *H04W 72/12* (2009.01)
  *H04W 28/08* (2009.01)
  *H04L 5/00* (2006.01)
  *H04L 27/00* (2006.01)
  *H04L 5/14* (2006.01)

(52) U.S. Cl.
  CPC ..... *H04L 27/0006* (2013.01); *H04W 72/1231* (2013.01); *H04W 74/0808* (2013.01); *H04L 5/0023* (2013.01); *H04L 5/0048* (2013.01); *H04L 5/14* (2013.01); *H04W 28/08* (2013.01); *H04W 72/1278* (2013.01)

(58) Field of Classification Search
  CPC .. H04W 74/0808; H04L 5/001; H04L 5/0092; H04L 5/0023; H04L 5/0048; H04L 5/14; H04L 27/0006
  See application file for complete search history.

(56) References Cited

U.S. PATENT DOCUMENTS

| | | | | |
|---|---|---|---|---|
| 2012/0129522 | A1* | 5/2012 | Kim et al. | 455/434 |
| 2012/0250631 | A1* | 10/2012 | Hakola | H04L 5/001 370/329 |
| 2013/0337821 | A1* | 12/2013 | Clegg | 455/452.1 |
| 2014/0036818 | A1* | 2/2014 | Koskela et al. | 370/329 |
| 2014/0079015 | A1* | 3/2014 | Kim et al. | 370/329 |
| 2014/0287769 | A1* | 9/2014 | Taori et al. | 455/450 |
| 2014/0293900 | A1* | 10/2014 | Takeda et al. | 370/329 |

FOREIGN PATENT DOCUMENTS

| | | |
|---|---|---|
| KR | 20140114567 A | 9/2014 |
| WO | WO-2012106843 A1 | 8/2012 |
| WO | WO-2012109195 A2 | 8/2012 |
| WO | WO 2012/169756 A2 * | 12/2012 |
| WO | WO-2013009635 A2 | 1/2013 |

OTHER PUBLICATIONS

ISA/EPO, International Search Report and the Written Opinion of the International Searching Authority, Int'l App. No. PCT/US2014/041616, dated Dec. 11, 2014, European Patent Office, Rijswijk, NL, 13 pgs.

* cited by examiner

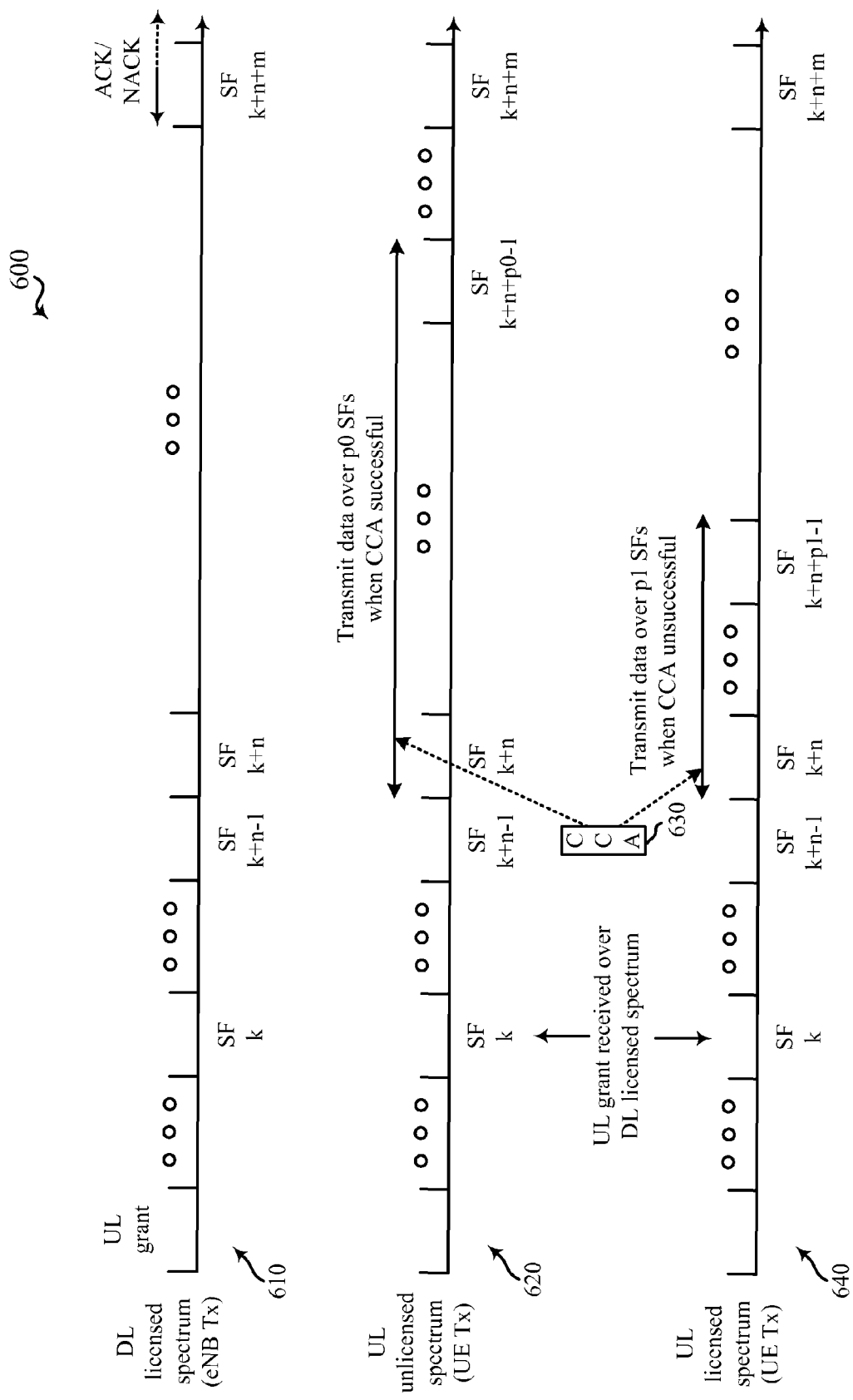

LTE/LTE—A UPLINK CARRIER AGGREGATION USING UNLICENSED SPECTRUM

CROSS-REFERENCES

The present application for patent claims priority benefit to U.S. Provisional Patent Application No. 61/833,674, entitled "LTE Uplink Carrier Aggregation Using Unlicensed Spectrum" by Malladi et al., filed Jun. 11, 2013, assigned to the assignee hereof, and expressly incorporated by reference herein.

BACKGROUND

Wireless communication networks are widely deployed to provide various communication services such as voice, video, packet data, messaging, broadcast, and the like. These wireless networks may be multiple-access networks capable of supporting multiple users by sharing the available network resources.

A wireless communication network may include a number of base stations, NodeBs (NBs), or evolved NodeBs (eNodeBs or eNBs) that support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

As wireless communications networks become more congested, operators are beginning to look at ways to increase capacity. One approach may be to use Wireless Local Area Networks (WLANs) to offload some of the traffic and/or signaling. WLANs (or WiFi networks) are attractive because, unlike cellular networks that operate in a licensed spectrum, they generally operate in an unlicensed spectrum. Moreover, a growing amount of spectrum is being allocated for access without a license, making the option of offloading traffic and/or signaling to WLANs more attractive. This approach may only provide a partial solution to the congestion problem, since WLANs tend to use spectrum less efficiently than cellular networks. Moreover, the regulations and protocols involved in WLANs are different from those for cellular networks. Unlicensed spectrum may therefore remain a reasonable option to alleviate congestion if it can be used more efficiently and in accordance with regulatory requirements.

SUMMARY

The described features generally relate to one or more improved methods, systems, and/or apparatuses for wireless communications.

A method for wireless communications is described. In some configurations, the method may include receiving an uplink grant over a licensed spectrum, and performing clear channel assessment (CCA) in response to the uplink grant. The CCA may be performed to determine availability of an unlicensed spectrum, and may be performed prior to a transmission associated with the uplink grant.

In some embodiments of the method, data may be transmitted using the unlicensed spectrum when a determination is made that the unlicensed spectrum is available, and the uplink grant may be disregarded when a determination is made that the unlicensed spectrum is not available.

In some embodiments of the method, data may be transmitted using the unlicensed spectrum when a determination is made that the unlicensed spectrum is available, and signaling indicating unavailability of the unlicensed spectrum may be transmitted using the licensed spectrum when a determination is made that the unlicensed spectrum is not available.

In some embodiments, data may be transmitted using the unlicensed spectrum when a determination is made that the unlicensed spectrum is available, and data may be transmitted using the licensed spectrum when a determination is made that the unlicensed spectrum is not available. In these embodiments, transmitting data using the unlicensed spectrum may include transmitting data during a first subset of subframes indicated by the uplink grant, and transmitting data using the licensed spectrum may include transmitting data during a second subset of subframes indicated by the uplink grant. In some cases, each of the first and second subsets of subframes may be specified in terms of one or more of a number of subframes in the subset, a time interval between successive subframes in the subset, and an initial offset between a time of reception of the uplink grant and a first occurrence of a subframe in the subset. In some cases, the first subset of subframes may include the second subset of subframes. In some cases, the first and second subsets of subframes may start in a same subframe, while in other cases, the first subset of subframes may start in a first subframe, and the second subset of subframes may start in a second subframe delayed from the first subframe.

In some embodiments of the method, the uplink grant may include a prioritized sequence of uplink grants, and each uplink grant in the prioritized sequence may be associated with a respective component carrier. In these embodiments, performing CCA to determine availability of the unlicensed spectrum may include performing CCA on at least one of the component carriers associated with the prioritized sequence of uplink grants to determine availability, and identifying one of the component carriers found to be available for use in transmitting data. In some cases, the component carriers corresponding to a subset of the uplink grants in the prioritized sequence may be found to be available, and identifying the one component carrier for use in transmitting data may include selecting from the component carriers found to be available the one that corresponds to the uplink grant with a highest priority in the subset. In some configurations, each uplink grant in the prioritized sequence may include one or more of: a set of physical resource blocks (PRBs) for the respective component carrier, and a subset of subframes for which the uplink grant is applicable. In these configurations, the subset of subframes may be specified in terms of one or more of a number of subframes in the subset, a time interval between successive subframes in the subset, and an initial offset between a time of reception of the uplink grant and a first occurrence of a subframe in the subset. In some cases, a parameter in an uplink grant in the prioritized sequence may be determined implicitly from a respective parameter in another uplink grant in the prioritized sequence. In some cases, an implicit relationship between parameters in different uplink grants of the prioritized sequence may be specified at least in part through radio resource control (RRC) signaling.

In some embodiments of the method, an indication of a maximum uplink data rate over the unlicensed spectrum for a set of PRBs may be received over the licensed spectrum, and CCA may be performed in a subframe in response to the indication. The CCA may be performed to determine availability of a component carrier for the set of PRBs in the unlicensed spectrum to transmit data in a next subframe. In these embodiments, and in some cases, data may be transmitted using the unlicensed spectrum when a determination is made that the component carrier for the set of PRBs in the unlicensed spectrum is available, and CCA may be performed in the next subframe when a determination is made that the component carrier for the set of PRBs in the unlicensed spectrum is not available. In other cases, data may be transmitted using the unlicensed spectrum when a determination is made that the component carrier for the set of PRBs in the unlicensed spectrum is available, and data may be transmitted using the licensed spectrum when a determination is made that the component carrier for the set of PRBs in the unlicensed spectrum is not available. In some configurations, the same set of PRBs may be assigned to each of a plurality of users on the uplink of the unlicensed spectrum. In these configurations, data transmitted from the plurality of users assigned the same set of PRBs may be decoded using successive interference cancellation (SIC). Also in these configurations, and in some cases, the plurality of users assigned the same set of PRBs may be assigned orthogonal demodulation reference signals (DM-RS) sequences. Each of the plurality of users may also be assigned a distinct scrambling code. In some cases, and when a determination is made that the component carrier for the set of PRBs in the unlicensed spectrum is available, the method may include transmitting one or more of uplink data, uplink control signals, and uplink reference signals according to one or both of an assigned orthogonal DM-RS sequence and an assigned scrambling code. In these cases, the method may also include transmitting, along with the one or more of the uplink data, the uplink control signals, and the uplink reference signals, a signal indicating one or more of a transmit format selection, a Hybrid Automatic Repeat Request identifier (HARQ-ID), and a HARQ redundancy version (RV).

In some embodiments of the method, the method may include transmitting one or more of a scheduling request, a buffer status report, and a power headroom report for a base station to schedule the uplink grant. The power headroom report may indicate, in some cases, a power headroom associated with the licensed spectrum and a power headroom associated with the unlicensed spectrum.

In some embodiments of the method, a change from a modulation coding scheme (MCS) indicated by the uplink grant may be identified, and a message may be transmitted over a set of resource elements within PRBs allocated by the uplink grant. The message may indicate the identified change in MCS.

In some embodiments of the method, the uplink grant may allocate PRBs for uplink transmission without allocating MCS for uplink transmission. In these embodiments, the MCS for uplink transmission may be determined upon receiving the uplink grant, and a message may be transmitted over a set of resource elements within the PRBs allocated for uplink transmission. The message may indicate the MCS determined for uplink transmission.

An apparatus for wireless communications is also described. The apparatus may include a processor, memory in electronic communication with the processor, and instructions stored in the memory. The instructions may be executable by the processor to receive an uplink grant over a licensed spectrum, and perform CCA in response to the uplink grant to determine availability of an unlicensed spectrum. The CCA may be performed prior to a transmission associated with the uplink grant.

In some embodiments of the apparatus, the instructions may be executable by the processor to transmit data using the unlicensed spectrum when a determination is made that the unlicensed spectrum is available, and disregard the uplink grant when a determination is made that the unlicensed spectrum is not available.

In some embodiments of the apparatus, the instructions may be executable by the processor to transmit data using the unlicensed spectrum when a determination is made that the unlicensed spectrum is available, and transmit signaling using the licensed spectrum indicating unavailability of the unlicensed spectrum when a determination is made that the unlicensed spectrum is not available.

In some embodiments of the apparatus, the instructions may be executable by the processor to transmit data using the unlicensed spectrum when a determination is made that the unlicensed spectrum is available, and transmit data using the licensed spectrum when a determination is made that the unlicensed spectrum is not available. In these embodiments, and in some cases, the instructions executable by the processor to transmit data using the unlicensed spectrum may include instructions executable by the processor to transmit data during a first subset of subframes indicated by the uplink grant, and the instructions executable by the processor to transmit data using the licensed spectrum may include instructions executable by the processor to transmit data during a second subset of subframes indicated by the uplink grant. In some cases, each of the first and second subsets of subframes may be specified in terms of one or more of a number of subframes in the subset, a time interval between successive subframes in the subset, and an initial offset between a time of reception of the uplink grant and a first occurrence of a subframe in the subset. In some configurations, the first subset of subframes may start in a first subframe, and the second subset of subframes may start in a second subframe delayed from the first subframe. In these configurations, the uplink grant may include a prioritized sequence of uplink grants, with each uplink grant in the prioritized sequence being associated with a respective component carrier, and the instructions executable by the processor to perform CCA to determine availability of the unlicensed spectrum may include instructions executable by the processor to perform CCA on at least one of the component carriers associated with the prioritized sequence of uplink grants to determine availability, and identify one of the component carriers found to be available for use in transmitting data. In some cases, each uplink grant in the prioritized sequence may include one or more of a set of PRBs for the respective component carrier, and a subset of subframes for which the uplink grant is applicable. The subset of subframes may be specified in terms of one or more of a number of subframes in the subset, a time interval between successive subframes in the subset, and an initial offset between a time of reception of the uplink grant and a first occurrence of a subframe in the subset. In some cases, an implicit relationship between parameters in different uplink grants of the prioritized sequence may be specified at least in part through RRC signaling.

In some embodiments of the apparatus, the instructions may be executable by the processor to receive, over the licensed spectrum, an indication of a maximum uplink data rate over the unlicensed spectrum for a set of PRBs. CCA may then be performed in a subframe in response to the indication. The CCA may be performed to determine availability of a component carrier for the set of PRBs in the unlicensed spectrum to transmit data in a next subframe. In some cases, the instructions may be executable by the processor to transmit data using the unlicensed spectrum when a determination is made that the component carrier for the set of PRBs in the unlicensed spectrum is available, and perform CCA in the next subframe when a determination is made that the component carrier for the set of PRBs in the unlicensed spectrum is not available. In some cases, the instructions may be executable by the processor to transmit data using the unlicensed spectrum when a determination is made that the component carrier for the set of PRBs in the unlicensed spectrum is available, and transmit data using the licensed spectrum when a determination is made that the component carrier for the set of PRBs in the unlicensed spectrum is not available. In some configurations, the same set of PRBs may be assigned to each of a plurality of users on the uplink of the unlicensed spectrum. In some cases, data transmitted from the plurality of users assigned the same set of PRBs may be decoded using SIC. In some cases, the plurality of users assigned the same set of PRBs may be assigned orthogonal demodulation reference signals (DM-RS) sequences. Each of the plurality of users may also be assigned a distinct scrambling code. In some cases, and when a determination is made that the component carrier for the set of PRBs in the unlicensed spectrum is available, the instructions may be executable by the processor to transmit one or more of uplink data, uplink control signals, and uplink reference signals according to one or both of an assigned orthogonal DM-RS sequence and an assigned scrambling code. In these cases, the instructions may also be executable by the processor to transmit, along with the one or more of the uplink data, the uplink control signals, and the uplink reference signals, a signal indicating one or more of a transmit format selection, a Hybrid Automatic Repeat Request identifier (HARQ-ID), and a HARQ redundancy version (RV).

In some embodiments of the apparatus, the instructions may be executable by the processor to transmit one or more of a scheduling request, a buffer status report, and a power headroom report for a base station to schedule the uplink grant.

In some embodiments of the apparatus, the uplink grant may allocate PRBs for uplink transmission without allocating a MCS for uplink transmission, and the instructions may be executable by the processor to determine the MCS for uplink transmission upon receiving the uplink grant, and transmit a message over a set of resource elements within the PRBs allocated for uplink transmission. The message may indicate the MCS determined for uplink transmission.

Another apparatus for wireless communications is also described. The apparatus may include a means for receiving an uplink grant over a licensed spectrum, and a means for performing CCA in response to the uplink grant to determine availability of an unlicensed spectrum. The CCA may be performed prior to a transmission associated with the uplink grant.

In some embodiments, the apparatus may further include a means for transmitting data using the unlicensed spectrum when a determination is made that the unlicensed spectrum is available, and a means for disregarding the uplink grant when a determination is made that the unlicensed spectrum is not available.

In some embodiments, the apparatus may further include a means for transmitting data using the unlicensed spectrum when a determination is made that the unlicensed spectrum is available, and a means for transmitting signaling using the licensed spectrum indicating unavailability of the unlicensed spectrum when a determination is made that the unlicensed spectrum is not available.

In some embodiments, the apparatus may further include a means for transmitting data using the unlicensed spectrum when a determination is made that the unlicensed spectrum is available, and a means for transmitting data using the licensed spectrum when a determination is made that the unlicensed spectrum is not available. The means for transmitting data using the unlicensed spectrum may include a means for transmitting data during a first subset of subframes indicated by the uplink grant, and the means for transmitting data using the licensed spectrum may include a means for transmitting data during a second subset of subframes indicated by the uplink grant. In some cases, each of the first and second subsets of subframes may be specified in terms of one or more of a number of subframes in the subset, a time interval between successive subframes in the subset, and an initial offset between a time of reception of the uplink grant and a first occurrence of a subframe in the subset. In some cases, the first subset of subframes may include the second subset of subframes. In some cases, the first and second subsets of subframes may start in a same subframe, while in other cases, the first subset of subframes may start in a first subframe, and the second subset of subframes may start in a second subframe delayed from the first subframe.

In some embodiments of the apparatus, the uplink grant may include a prioritized sequence of uplink grants, with each uplink grant in the prioritized sequence being associated with a respective component carrier, and the means for performing CCA to determine availability of the unlicensed spectrum may include a means for performing CCA on at least one of the component carriers associated with the prioritized sequence of uplink grants to determine availability, and a means for identifying one of the component carriers found to be available for use in transmitting data. In some cases, the component carriers corresponding to a subset of the uplink grants in the prioritized sequence may be found to be available, and the means for identifying the one component carrier for use in transmitting data may include a means for selecting from the component carriers found to be available the one that corresponds to the uplink grant with a highest priority in the subset. In some cases, each uplink grant in the prioritized sequence may include one or more of a set of physical resource blocks (PRBs) for the respective component carrier, and a subset of subframes for which the uplink grant is applicable. The subset of subframes may in some cases be specified in terms of one or more of a number of subframes in the subset, a time interval between successive subframes in the subset, and an initial offset between a time of reception of the uplink grant and a first occurrence of a subframe in the subset. In some cases, a parameter in an uplink grant in the prioritized sequence may be determined implicitly from a respective parameter in another uplink grant in the prioritized sequence. In some cases, an implicit relationship between parameters in different uplink grants of the prioritized sequence may be specified at least in part through RRC signaling.

In some embodiments, the apparatus may further include a means for receiving over the licensed spectrum, an indication of a maximum uplink data rate over the unlicensed spectrum for a set of PRBs. The apparatus may also include a means for performing CCA in a subframe in response to the indication. The CCA may be performed to determine availability of a component carrier for the set of PRBs in the unlicensed spectrum to transmit data in a next subframe. In these embodiments, and in some cases, the apparatus may further include a means for transmitting data using the unlicensed spectrum when a determination is made that the component carrier for the set of PRBs in the unlicensed spectrum is available, and a means for performing CCA in the next subframe when a determination is made that the component carrier for the set of PRBs in the unlicensed spectrum is not available. Also in these embodiments, and in some cases, the apparatus may further include a means for transmitting data using the unlicensed spectrum when a determination is made that the component carrier for the set of PRBs in the unlicensed spectrum is available, and a means for transmitting data using the licensed spectrum when a determination is made that the component carrier for the set of PRBs in the unlicensed spectrum is not available. In some configurations, the same set of PRBs may be assigned to each of a plurality of users on the uplink of the unlicensed spectrum. In these configurations, the data transmitted from the plurality of users assigned the same set of PRBs may be decoded using SIC. Also in these configurations, and in some cases, the plurality of users assigned the same set of PRBs may be assigned orthogonal DM-RS sequences. Each of the plurality of users may also be assigned a distinct scrambling code. In some cases, and when a determination is made that the component carrier for the set of PRBs in the unlicensed spectrum is available, the apparatus may include a means for transmitting one or more of uplink data, uplink control signals, and uplink reference signals according to one or both of an assigned orthogonal DM-RS sequence and an assigned scrambling code. In these cases, the apparatus may also include a means for transmitting, along with the one or more of the uplink data, the uplink control signals, and the uplink reference signals, a signal indicating one or more of a transmit format selection, a Hybrid Automatic Repeat Request identifier (HARQ-ID), and a HARQ redundancy version (RV).

In some embodiments, the apparatus may further include a means for transmitting one or more of a scheduling request, a buffer status report, and a power headroom report for a base station to schedule the uplink grant. In some cases, the power headroom report may indicate a power headroom associated with the licensed spectrum and a power headroom associated with the unlicensed spectrum.

In some embodiments, the apparatus may include a means for identifying a change from a MCS indicated by the uplink grant, and a means for transmitting a message over a set of resource elements within PRBs allocated by the uplink grant, the message indicating the identified change in MCS.

In some embodiments, the uplink grant may allocate PRBs for uplink transmission without allocating MCS for uplink transmission. In these embodiments, the apparatus may further include a means for determining the MCS for uplink transmission upon receiving the uplink grant, and a means for transmitting a message over a set of resource elements within the PRBs allocated for uplink transmission. The message may indicate the MCS determined for uplink transmission.

A computer program product for wireless communications is also described. The computer program product may include a non-transitory computer-readable medium storing instructions executable by a processor to: receive an uplink grant over a licensed spectrum, and perform CCA in response to the uplink grant to determine availability of an unlicensed spectrum. The CCA may be performed prior to a transmission associated with the uplink grant.

In some embodiments of the computer program product, the instructions may be executable by the processor to transmit data using the unlicensed spectrum when a determination is made that the unlicensed spectrum is available, and disregard the uplink grant when a determination is made that the unlicensed spectrum is not available.

In some embodiments of the computer program product, the instructions may be executable by the processor to transmit data using the unlicensed spectrum when a determination is made that the unlicensed spectrum is available, and transmit signaling using the licensed spectrum indicating unavailability of the unlicensed spectrum when a determination is made that the unlicensed spectrum is not available.

In some embodiments of the computer program product, the instructions may be executable by the processor to transmit data using the unlicensed spectrum when a determination is made that the unlicensed spectrum is available, and transmit data using the licensed spectrum when a determination is made that the unlicensed spectrum is not available.

In some embodiments of the computer program product, the uplink grant may include a prioritized sequence of uplink grants. Each uplink grant in the prioritized sequence may be associated with a respective component carrier, and the instructions executable by the processor to perform CCA to determine availability of the unlicensed spectrum may include instructions executable by the processor to perform CCA on at least one of the component carriers associated with the prioritized sequence of uplink grants to determine availability, and identify one of the component carriers found to be available for use in transmitting data.

In some embodiments of the computer program product, the instructions may be executable by the processor to receive, over the licensed spectrum, an indication of a maximum uplink data rate over the unlicensed spectrum for a set of PRBs, and perform CCA in a subframe in response to the indication. The CCA may be performed to determine availability of a component carrier for the set of PRBs in the unlicensed spectrum to transmit data in a next subframe.

In some embodiments of the computer program product, the same set of PRBs may be assigned to each of a plurality of users on the uplink of the unlicensed spectrum. In these embodiments, and in some cases, data transmitted from the plurality of users assigned the same set of PRBs may be decoded using SIC. In some cases, the plurality of users assigned the same set of PRBs may be assigned orthogonal DM-RS sequences. In some cases, each of the plurality of users may also be assigned a distinct scrambling code.

In some embodiments of the computer program product, a determination may be made that the component carrier for the set of PRBs in the unlicensed spectrum is available. In these embodiments, the instructions may be executable by the processor to transmit one or more of uplink data, uplink control signals, and uplink reference signals according to one or both of an assigned orthogonal DM-RS sequence and an assigned scrambling code. Also in these embodiments, the instructions may be executable by the processor to transmit, along with the one or more of the uplink data, the uplink control signals, and the uplink reference signals, a signal indicating one or more of a transmit format selection, a Hybrid Automatic Repeat Request identifier (HARQ-ID), and a HARQ redundancy version (RV).

In some embodiments of the computer program product, the instructions may be executable by the processor to transmit one or more of a scheduling request, a buffer status report, and a power headroom report for a base station to schedule the uplink grant.

Another method for wireless communications is also described. In some configurations, the method may include receiving scheduling information over a licensed spectrum and transmitting an uplink grant over the licensed spectrum. The uplink grant may be based at least in part on the scheduling information, and the uplink grant may be configured to trigger a CCA to determine availability of an unlicensed spectrum prior to a transmission associated with the uplink grant.

In some embodiments of the method, data may be received over the unlicensed spectrum when a determination is made that the unlicensed spectrum is available, and data may be received over the licensed spectrum when a determination is made that the unlicensed spectrum is not available. In some cases, receiving data over the unlicensed spectrum may include receiving data transmitted over a first subset of subframes indicated by the uplink grant, and receiving data over the licensed spectrum may include receiving data transmitted over a second subset of subframes indicated by the uplink grant. In some configurations, the first subset of subframes may include the second subset of subframes. In some configurations, the first and second subsets of subframes may start in a same subframe, while in other configurations, the first subset of subframes may start in a first subframe, and the second subset of subframes may start in a second subframe delayed from the first subframe. In these latter configurations, resources in the licensed spectrum associated with the transmission of data over the second subset of subframes may be released when data transmitted over the first subset of subframes is received.

In some embodiments, the scheduling information may include one or more of a scheduling request, a buffer status report, and a power headroom report indicating a power headroom associated with the licensed spectrum and a power headroom associated with the unlicensed spectrum.

In some embodiments, the method may include assigning a same set of PRBs to a plurality of users on the uplink of the unlicensed spectrum, based at least in part on the transmitted uplink grant; receiving uplink data from the plurality of users using the assigned PRBs; and decoding the uplink data using a SIC. In these embodiments, and in some cases, the method may further include assigning one or both of an orthogonal DM-RS sequence and a scrambling code to each of the plurality of users for transmission of the uplink data. In some cases, a signal indicating one or more of a transmit format selection, a HARQ-ID, and a HARQ RV may be received from each of the plurality of users along with the uplink data.

Another apparatus for wireless communications is also described. The apparatus may include a processor, memory in electronic communication with the processor, and instructions stored in the memory. The instructions may be executable by the processor to receive scheduling information over a licensed spectrum and transmit an uplink grant over the licensed spectrum. The uplink grant may be based at least in part on the scheduling information and be configured to trigger a CCA to determine availability of an unlicensed spectrum prior to a transmission associated with the uplink grant.

In some embodiments of the apparatus, the instructions may be executable by the processor to receive data over the unlicensed spectrum when a determination is made that the unlicensed spectrum is available, and receive data over the licensed spectrum when a determination is made that the unlicensed spectrum is not available. In these embodiments, the instructions executable by the processor to receive data over the unlicensed spectrum may include instructions executable by the processor to receive data transmitted over a first subset of subframes indicated by the uplink grant, and the instructions executable by the processor to receive data over the licensed spectrum may include instructions executable by the processor to receive data transmitted over a second subset of subframes indicated by the uplink grant.

In some embodiments of the apparatus, the scheduling information may include one or more of a scheduling request, a buffer status report, and a power headroom report indicating a power headroom associated with the licensed spectrum and a power headroom associated with the unlicensed spectrum.

Yet another apparatus for wireless communications is also described. In some configurations, the apparatus may include a means for receiving scheduling information over a licensed spectrum, and a means for transmitting an uplink grant over the licensed spectrum. The uplink grant may be based at least in part on the scheduling information, and may be configured to trigger a CCA to determine availability of an unlicensed spectrum prior to a transmission associated with the uplink grant.

In some embodiments, the apparatus may further include a means for receiving data over the unlicensed spectrum when a determination is made that the unlicensed spectrum is available, and a means for receiving data over the licensed spectrum when a determination is made that the unlicensed spectrum is not available. In these embodiments, and in some cases, the means for receiving data over the unlicensed spectrum may include a means for receiving data transmitted over a first subset of subframes indicated by the uplink grant, and the means for receiving data over the licensed spectrum may include a means for receiving data transmitted over a second subset of subframes indicated by the uplink grant. In some cases, the first subset of subframes may include the second subset of subframes. In some cases, the first and second subsets of subframes may start in a same subframe, while in other cases, the first subset of subframes may start in a first subframe, and the second subset of subframes may start in a second subframe delayed from the first subframe. In some cases, the apparatus may include a means for releasing resources in the licensed spectrum associated with the transmission of data over the second subset of subframes when data transmitted over the first subset of subframes is received.

In some embodiments of the apparatus, the scheduling information may include one or more of a scheduling request, a buffer status report, and a power headroom report indicating a power headroom associated with the licensed spectrum and a power headroom associated with the unlicensed spectrum.

A computer program product for wireless communications is also described. The computer program product may include a non-transitory computer-readable medium storing instructions executable by a processor to receive scheduling information over a licensed spectrum, and transmit an uplink grant over the licensed spectrum, the uplink grant being based at least in part on the scheduling information, and the uplink grant being configured to trigger a CCA to determine availability of an unlicensed spectrum prior to a transmission associated with the uplink grant.

In some embodiments of the computer program product, the instructions may be executable by the processor to receive data over the unlicensed spectrum when a determination is made that the unlicensed spectrum is available, and receive data over the licensed spectrum when a determination is made that the unlicensed spectrum is not available. In some cases, the instructions executable by the processor to receive data over the unlicensed spectrum may include instructions executable by the processor to receive data transmitted over a first subset of subframes indicated by the uplink grant, and the instructions executable by the processor to receive data over the licensed spectrum may include instructions executable by the processor to receive data transmitted over a second subset of subframes indicated by the uplink grant.

In some embodiments of the computer program product, the scheduling information may include one or more of a scheduling request, a buffer status report, and a power headroom report indicating a power headroom associated with the licensed spectrum and a power headroom associated with the unlicensed spectrum.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 6A and 6B are timing diagrams illustrating additional examples of transmissions made by an eNB and a UE according to various embodiments;

DETAILED DESCRIPTION

Figure 1:
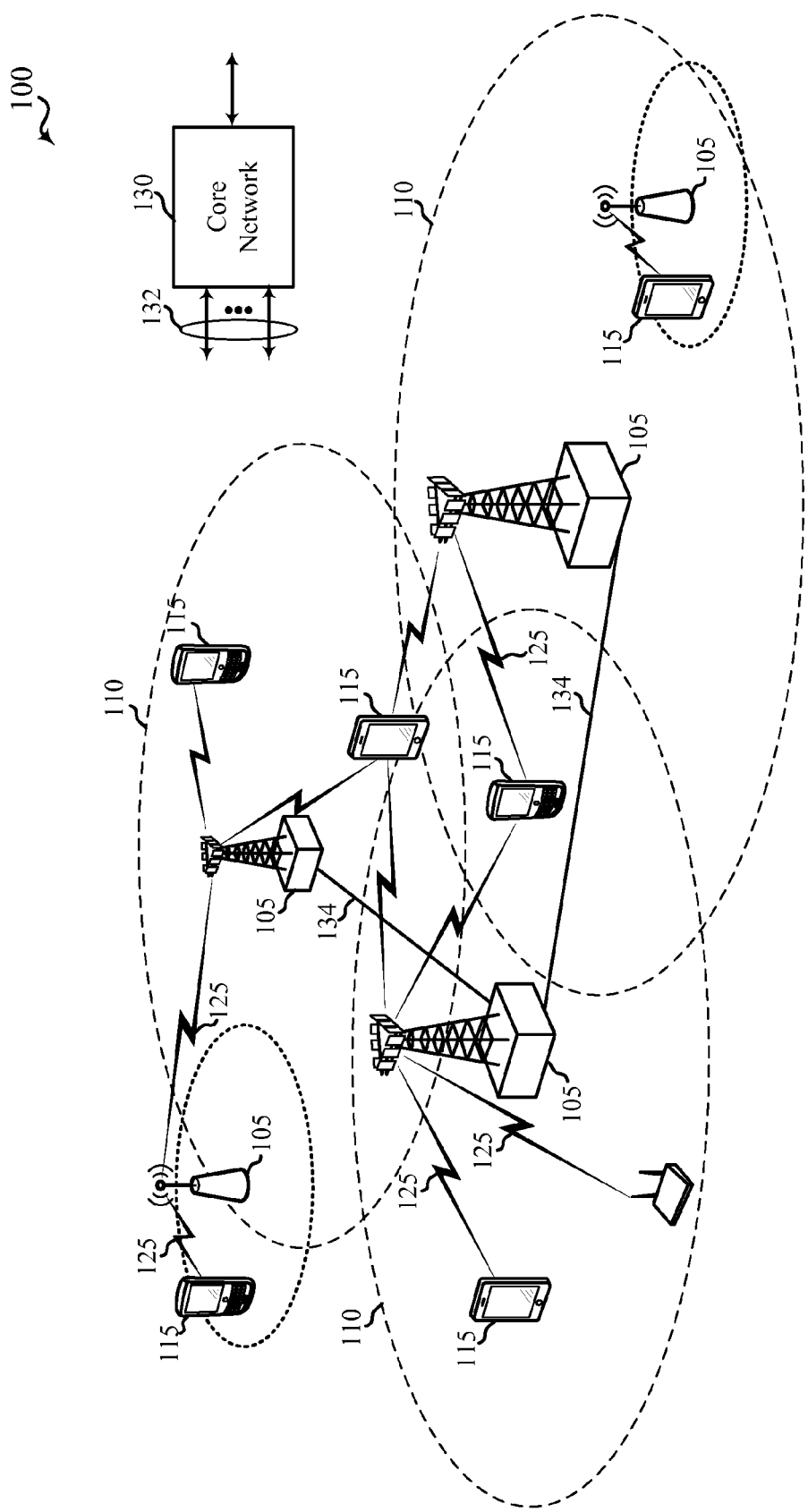
FIG. 1 shows a block diagram of a wireless communications system.

Methods, apparatuses, systems, and devices are described in which unlicensed spectrum is used for LTE/LTE-A communications. Various deployment scenarios may be supported when extending LTE/LTE-A to unlicensed spectrum. One scenario includes a supplemental downlink mode in which LTE/LTE-A downlink traffic may be offloaded to an unlicensed spectrum. Another scenario includes a standalone mode in which LTE/LTE-A downlink and uplink communications between a base station (e.g., eNB) and a UE may take place in an unlicensed spectrum. In yet another scenario, a carrier aggregation mode may be used to offload both LTE/LTE-A downlink and uplink traffic from a licensed spectrum to an unlicensed spectrum. There may be different schemes for uplink transmissions when the carrier aggregation mode is being used for LTE/LTE-A communications in unlicensed spectrum. Base stations and UEs may support one or more of these or similar modes of operation. Orthogonal frequency-division multiple access (OFDMA) communications signals may be used for LTE/LTE-A downlink communications in an unlicensed spectrum, while single carrier frequency-division multiple access (SC-FDMA) communications signals may be used for LTE/LTE-A uplink communications in an unlicensed spectrum.

Generally, operators have looked at WiFi as the primary mechanism to use unlicensed spectrum to relieve ever increasing levels of congestion in cellular networks. However, a new carrier type (NCT) based on LTE/LTE-A unlicensed spectrum may be compatible with carrier-grade WiFi, which makes LTE/LTE-A unlicensed spectrum an alternative to WiFi solutions directed at relieving network congestion. LTE/LTE-A unlicensed spectrum may leverage many LTE/LTE-A concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some cases, LTE/LTE-A unlicensed spectrum may perform significantly better than WiFi. For example, when an all LTE/LTE-A deployment in unlicensed spectrum (for single or multiple operators) is compared to an all WiFi deployment, or when there are dense small cell deployments, LTE/LTE-A unlicensed spectrum may perform significantly better than WiFi. LTE/LTE-A unlicensed spectrum may also perform better than WiFi in other cases, such as when LTE/LTE-A unlicensed spectrum is mixed with WiFi (for single or multiple operators).

For a single service provider (SP), an LTE/LTE-A network in operating in unlicensed spectrum may be configured to be synchronous with an LTE/LTE-A network operating in licensed spectrum. However, LTE/LTE-A networks in unlicensed spectrum and deployed on a given channel by multiple SPs may be configured to be synchronous across the multiple SPs. One approach to incorporate both the above features may involve using a constant timing offset between LTE/LTE-A in licensed spectrum and unlicensed spectrum networks for a given SP. An LTE/LTE-A network in unlicensed spectrum may provide unicast and/or multicast services according to the needs of the SP. Moreover, an LTE/LTE-A network in unlicensed spectrum may operate in a bootstrapped mode in which LTE/LTE-A cells act as anchors and provide relevant LTE/LTE-A unlicensed spectrum cell information (e.g., radio frame timing, common channel configuration, system frame number or SFN, etc.). In this mode, there may be close interworking between LTE/LTE-A networks in licensed spectrum and unlicensed spectrum. For example, the bootstrapped mode may support the supplemental downlink and the carrier aggregation modes described above. The PHY-MAC layers of the LTE/LTE-A network in unlicensed spectrum may operate in a standalone mode in which the LTE/LTE-A network in unlicensed spectrum operates independently from an LTE/LTE-A network in licensed spectrum. In this case, there may be a loose interworking between LTE/LTE-A networks in licensed spectrum and unlicensed spectrum based on a radio link control (RLC)-level aggregation with collocated LTE/LTE-A licensed spectrum and unlicensed spectrum cells, or multiflow across multiple cells and/or base stations, for example.

The techniques described herein are not limited to LTE/LTE-A, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE/LTE-A system in licensed and/or unlicensed spectrum for purposes of example, and LTE/LTE-A terminology is used in much of the description below, although the techniques are applicable beyond LTE/LTE-A applications.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 may be an LTE/LTE-A network that supports one or more LTE/LTE-A unlicensed spectrum modes of operation or deployment scenarios. In other embodiments, the system 100 may support wireless communications using an unlicensed spectrum and an access technology different from LTE/LTE-A, or a licensed spectrum and an access technology different from LTE/LTE-A. The terms evolved NodeB (eNB) and user equipment (UE) may be generally used to describe the base stations 105 and devices 115, respectively. The system 100 may be a Heterogeneous LTE/LTE-A network in licensed spectrum and unlicensed spectrum, in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using licensed spectrum (e.g., LTE/LTE-A licensed spectrum), unlicensed spectrum (e.g., LTE/LTE-A unlicensed spectrum), or both. Similarly, the uplink transmissions may be made using licensed spectrum (e.g., LTE/LTE-A licensed spectrum), unlicensed spectrum (e.g., LTE/LTE-A unlicensed spectrum), or both.

In some embodiments of the system 100, various deployment scenarios for LTE/LTE-A unlicensed spectrum may be supported including a supplemental downlink mode in which LTE/LTE-A downlink capacity in licensed spectrum may be offloaded to an unlicensed spectrum, a carrier aggregation mode in which both LTE/LTE-A downlink and uplink capacity may be offloaded from licensed spectrum to unlicensed spectrum, and a standalone mode in which LTE/LTE-A downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE/LTE-A downlink transmissions in unlicensed and/or licensed spectrum, while SC-FDMA communications signals may be used in the communications links 125 for LTE/LTE-A uplink transmissions in unlicensed and/or licensed spectrum. Additional details regarding the implementation of LTE/LTE-A deployment scenarios or modes of operation in unlicensed spectrum, and more particularly regarding LTE/LTE-A uplink transmissions in the carrier aggregation mode in unlicensed spectrum, in a system such as the system 100, as well as other features and functions related to the operation of LTE/LTE-A unlicensed spectrum, are provided below with reference to FIGS. 2A-20.

Figure 2A:
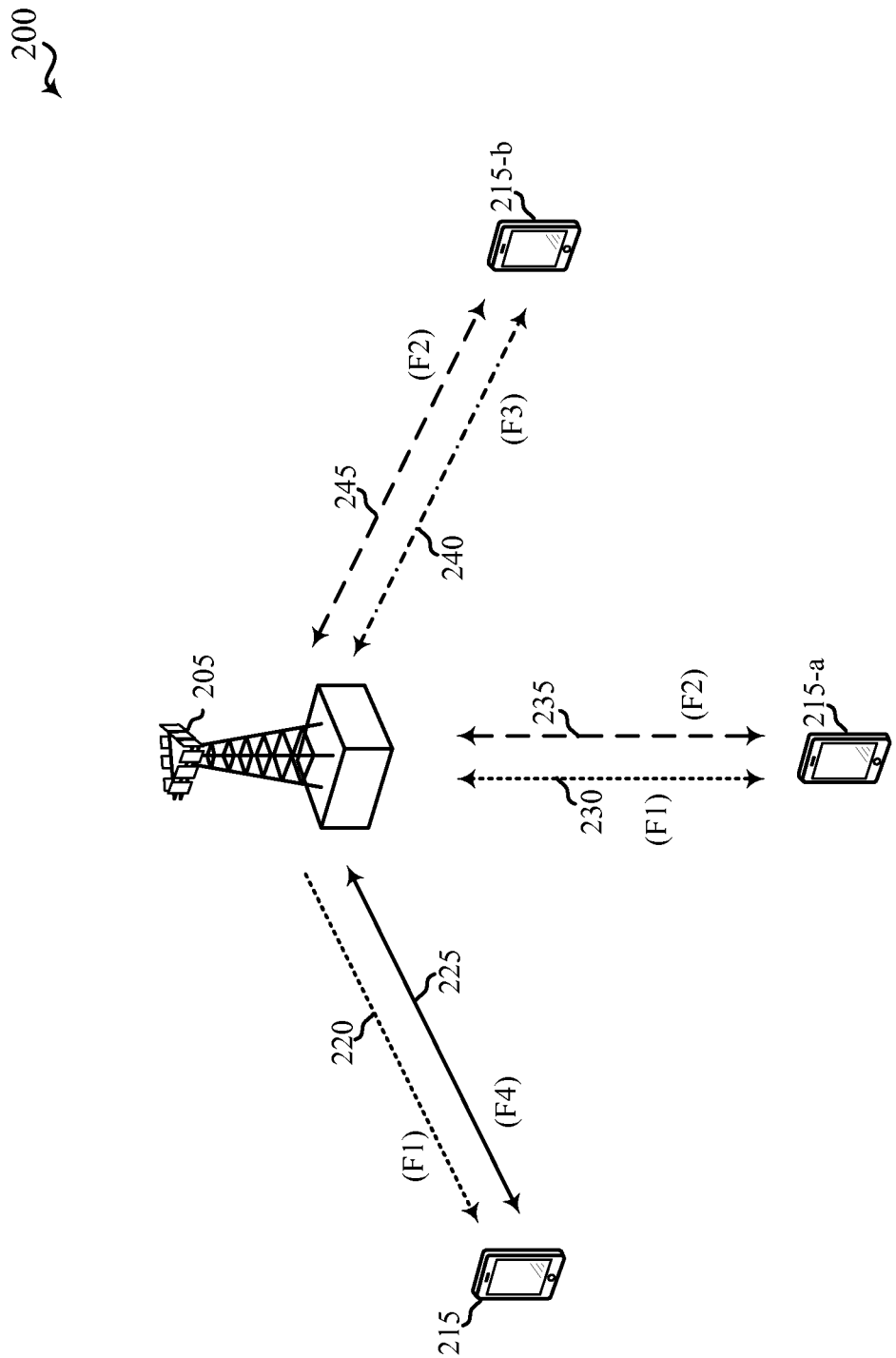
FIG. 2A shows a diagram that illustrates examples of deployment scenarios for using long term evolution (LTE) and/or LTE-Advanced (LTE-A) unlicensed spectrum according to various embodiments.

Turning next to FIG. 2A, a diagram 200 shows examples of a supplemental downlink mode and of a carrier aggregation mode for an LTE/LTE-A network that supports unlicensed spectrum. The diagram 200 may be an example of portions of the system 100 of FIG. 1. Moreover, the base station 205 may be an example of the base stations 105 of FIG. 1, while the UEs 215, 215-a, and 215-b may be examples of the UEs 115 of FIG. 1.

In the example of a supplemental downlink mode in diagram 200, the base station 205 may transmit OFDMA communications signals to a UE 215 using a downlink 220. The downlink 220 is associated with a frequency F1 in an unlicensed spectrum. The base station 205 may transmit OFDMA communications signals to the same UE 215 using a bidirectional link 225 and may receive SC-FDMA communications signals from that UE 215 using the bidirectional link 225. The bidirectional link 225 is associated with a frequency F4 in a licensed spectrum. The downlink 220 in the unlicensed spectrum and the bidirectional link 225 in the licensed spectrum may operate concurrently. The downlink 220 may provide a downlink capacity offload for the base station 205. In some embodiments, the downlink 220 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 205 may transmit OFDMA communications signals to a UE 215-a using a bidirectional link 230 and may receive SC-FDMA communications signals from the same UE 215-a using the bidirectional link 230. The bidirectional link 230 is associated with the frequency F1 in the unlicensed spectrum. The base station 205 may also transmit OFDMA communications signals to the same UE 215-a using a bidirectional link 235 and may receive SC-FDMA communications signals from the same UE 215-a using the bidirectional link 235. The bidirectional link 235 is associated with a frequency F2 in a licensed spectrum. The bidirectional link 230 may provide a downlink and uplink capacity offload for the base station 205. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 205 may transmit OFDMA communications signals to a UE 215-b using a bidirectional link 240 and may receive SC-FDMA communications signals from the same UE 215-b using the bidirectional link 240. The bidirectional link 240 is associated with a frequency F3 in an unlicensed spectrum. The base station 205 may also transmit OFDMA communications signals to the same UE 215-*b* using a bidirectional link 245 and may receive SC-FDMA communications signals from the same UE 215-*b* using the bidirectional link 245. The bidirectional link 245 is associated with the frequency F2 in the licensed spectrum. The bidirectional link 240 may provide a downlink and uplink capacity offload for the base station 205. This example and those provided above are presented for illustrative purposes and there may be other similar modes of operation or deployment scenarios that combine LTE/LTE-A in licensed spectrum and unlicensed spectrum for capacity offload.

As described above, the typical service provider that may benefit from the capacity offload offered by using LTE/LTE-A unlicensed spectrum is a traditional MNO with LTE/LTE-A licensed spectrum. For these service providers, an operational configuration may include a bootstrapped mode (e.g., supplemental downlink, carrier aggregation) that uses the LTE/LTE-A primary component carrier (PCC) on the licensed spectrum and the LTE/LTE-A secondary component carrier (SCC) on the unlicensed spectrum.

In the carrier aggregation mode, data and control may generally be communicated in LTE/LTE-A licensed spectrum (e.g., via bidirectional links 225, 235, and 245) while data may generally be communicated in LTE/LTE-A unlicensed spectrum (e.g., via bidirectional links 230 and 240). The carrier aggregation mechanisms supported when using LTE/LTE-A unlicensed spectrum may fall under a hybrid frequency division duplexing-time division duplexing (FDD-TDD) carrier aggregation or a TDD-TDD carrier aggregation with different symmetry across component carriers.

Figure 2B:
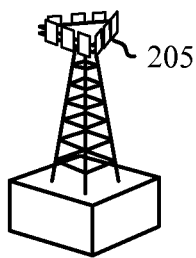
FIG. 2B shows a diagram that illustrates an example of carrier aggregation using LTE/LTE-A unlicensed spectrum according to various embodiments.
Figure 2B:
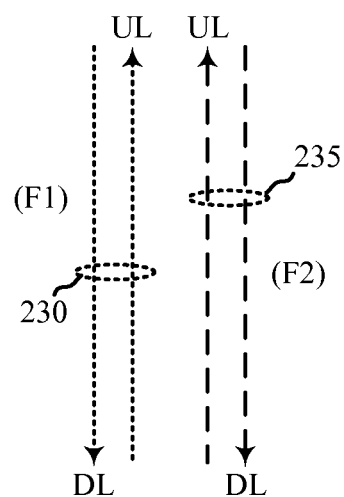
Figure 2B:

FIG. 2B shows a diagram 250 that illustrates a more detailed example of the carrier aggregation mode for LTE/LTE-A unlicensed spectrum described above with respect to FIG. 2A. In this example, the base station 205 may transmit OFDMA communications signals to the UE 215-*a* over a downlink (DL) of the bidirectional link 230 and may receive SC-FDMA communications signals from the same UE 215-*a* over an uplink (UL) of the bidirectional link 230. As described above, the bidirectional link 230 is associated with the frequency F1 in the unlicensed spectrum. The base station 205 may also transmit OFDMA communications signals to the same UE 215-*a* over a DL of a bidirectional link 235 and may receive SC-FDMA communications signals from the same UE 215-*a* over the UL of the bidirectional link 235. The bidirectional link 235 is associated with a frequency F2 in a licensed spectrum. The bidirectional link 230 may provide a downlink and uplink capacity offload for the base station 205. This scenario may occur with any service provider (e.g., MNO) that uses a licensed spectrum and needs to relieve some of the traffic and/or signaling congestion. Signaling and/or control information may be generally communicated between the base station 205 and the UE 215-*a* using the UL and DL of the bidirectional link 235. However, there may be instances in which some signaling and/or control information may be communicated between the base station 205 and the UE 215-*a* using the UL and DL of the bidirectional link 230.

Figure 3:
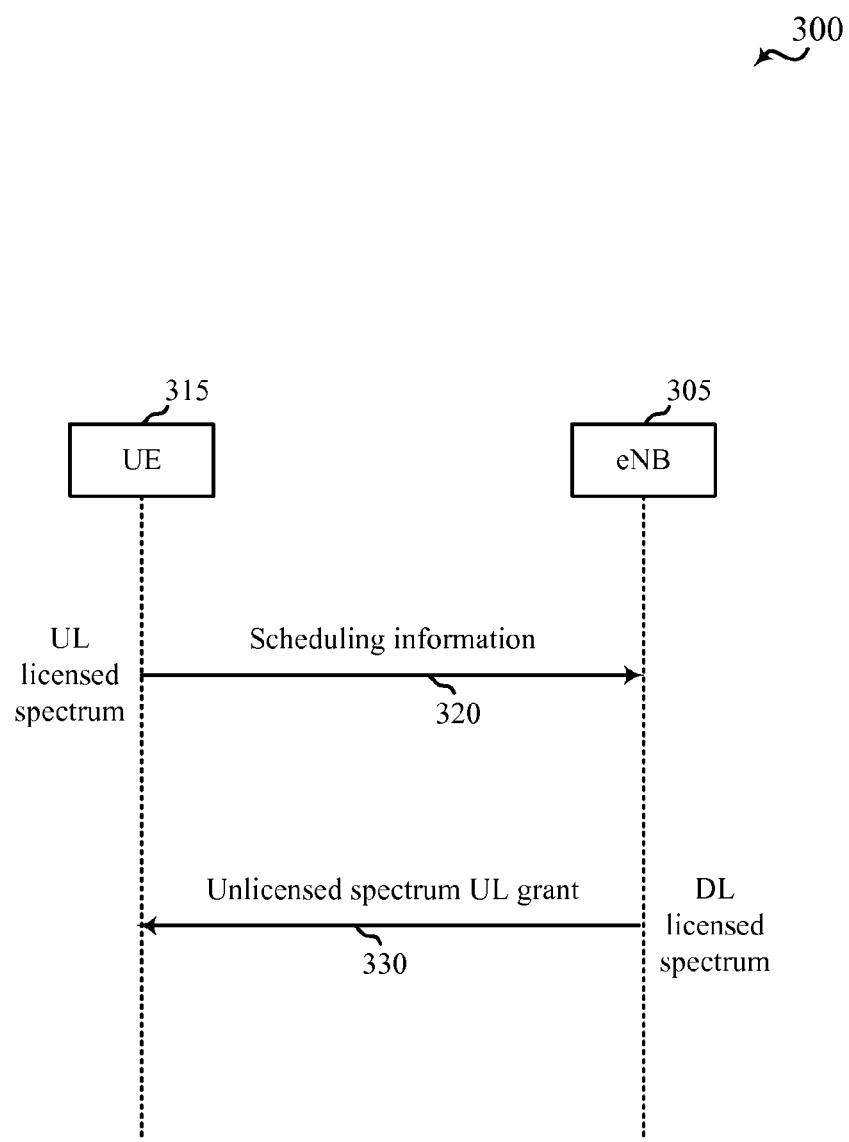
FIG. 3 is a message flow diagram illustrating one example of communications between a UE and an eNB according to various embodiments.

FIG. 3 is a message flow diagram 300 illustrating one example of communications between a UE 315 and an eNB 305 in connection with a carrier aggregation mode of operation. The UE 315 may be an example of aspects of one or more of the UEs 115 and 215 described with reference to FIGS. 1, 2A, and/or 2B, and the eNB 305 may be an example of aspects of one or more of the eNBs 105 and 205 described with reference to FIGS. 1, 2A, and/or 2B.

The message flow may include the UE 315 transmitting scheduling information 320 to the eNB 305 over an uplink carried on a licensed spectrum (e.g., an LTE spectrum). In some cases, the scheduling information may include one or more of a scheduling request (SR), a buffer status report (BSR), and a power headroom report (PHR) indicating a power headroom associated with the licensed spectrum and a power headroom associated with an unlicensed spectrum (e.g., an LTE/LTE-A unlicensed spectrum). The power headroom report may, for each spectrum, indicate a difference between the current transmit power of the UE 315 and a maximum transmit power of the UE 315. This may enable the eNB 305 to adjust transmit power in response to channel conditions (e.g., channel quality) in the licensed or unlicensed spectrum. In some cases, the PHR may be biased based on past clear channel assessment (CCA) history.

The eNB 305 may receive the scheduling information 320 and, based at least in part on the scheduling information, transmit an uplink (UL) grant 330 to the UE 315 over a downlink carried on the licensed spectrum. The UL grant (or "unlicensed spectrum UL grant") 330 may be configured to trigger the UE 315 to perform a CCA to determine the availability of an unlicensed spectrum prior to a transmission by the UE 315 associated with the UL grant.

Figure 4:
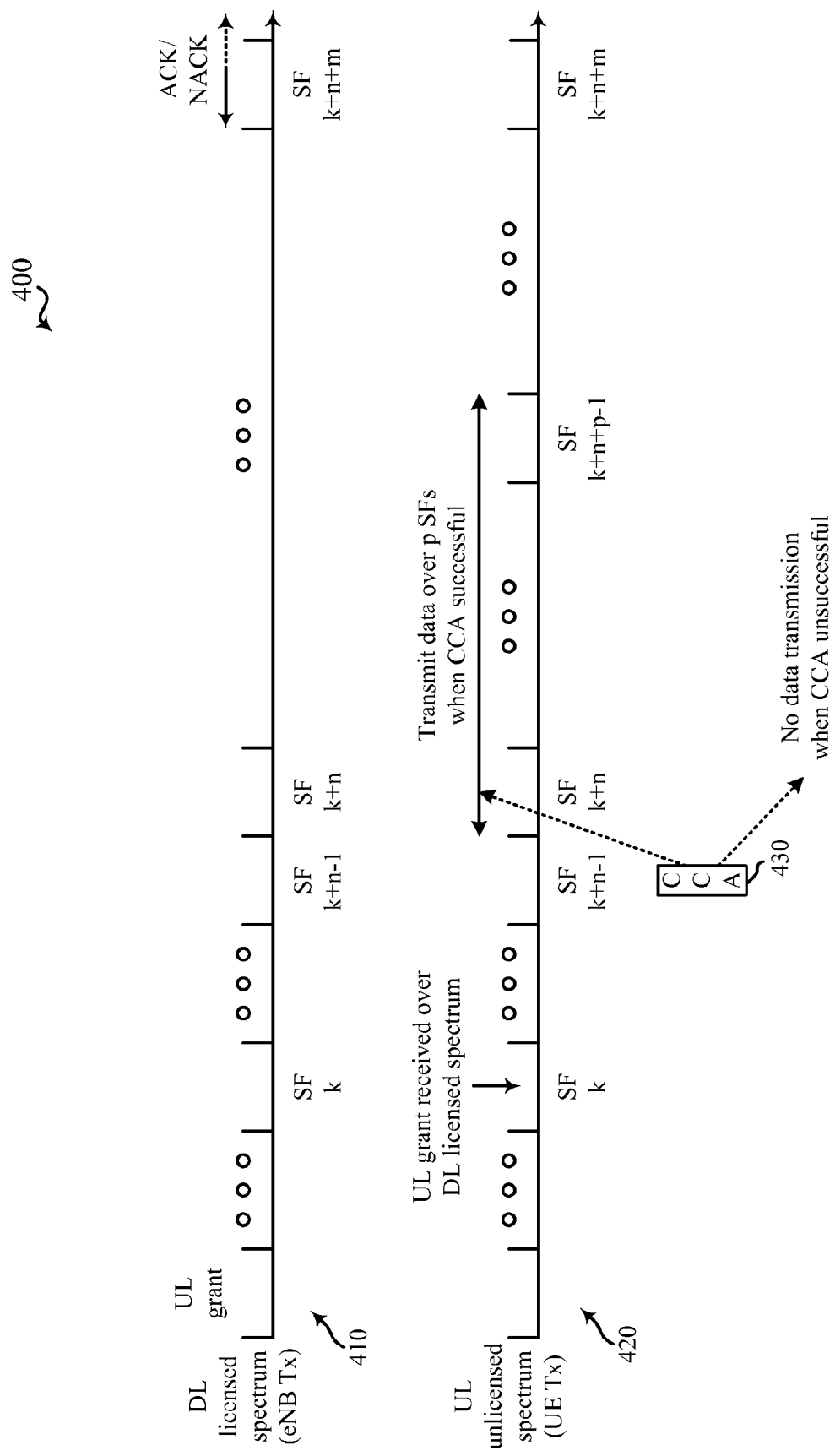
FIG. 4 is a timing diagram illustrating an example of transmissions made by an eNB and a UE according to various embodiments.

FIG. 4 is a timing diagram 400 illustrating an example of transmissions made by an eNB and a UE in connection with a carrier aggregation mode of operation. The transmissions 410 by the eNB may be an example of transmissions made by one of the eNBs 105, 205, and 305 described with reference to FIGS. 1, 2A, 2B, and/or 3, and the transmissions 420 by the UE may be an example of transmissions made by one of the UEs 115, 215, and 315 described with reference to FIGS. 1, 2A, 2B and/or 3. The transmissions 410 by the eNB may be made over a downlink (DL) of licensed spectrum (e.g., LTE/LTE-A licensed spectrum), and the transmissions 420 made by the UE may be made over an uplink of unlicensed spectrum (e.g., LTE/LTE-A unlicensed spectrum).

To begin, the eNB may transmit (Tx) a UL grant over a downlink (DL) of the licensed spectrum. The UL grant may in some cases be based at least in part on scheduling information received by the eNB (e.g., from the UE). The UL grant may be configured to trigger a clear channel assessment (CCA) to determine availability of an unlicensed spectrum prior to a transmission associated with the uplink grant (e.g., a transmission by the UE).

At a subframe (SF) k, the UL grant may be received over the DL of the licensed spectrum. The value of the parameter k may be based on transmission delay(s) and/or other variables, and may in some cases be known in advance by the eNB and UE.

At a subframe k+n−1, where n is a parameter specified in the UL grant or known in advance by the UE and eNB, the UE may perform a CCA 430 to determine availability of the unlicensed spectrum. The CCA 430 may be performed prior to a transmission associated with the UL grant (e.g., a transmission by the UE). When a determination is made that the unlicensed spectrum is available (i.e., the CCA is successful), data may be transmitted to the eNB using the unlicensed spectrum in a subframe k+n. However, when a determination is made that the unlicensed spectrum is not available (i.e., the CCA is unsuccessful), the UL grant may be ignored or disregarded. In some cases, a UE may transmit a signal to an eNB in the licensed spectrum upon determining that the unlicensed spectrum is unavailable. The signal may include a message indicating the unavailability of the unlicensed spectrum.

In some cases, the transmission of data may begin at the subframe k+n and continue over p subframes (e.g., through a subframe k+n+p−1), where p is a parameter specified in the UL grant. The parameter p may indicate a subset of subframes for which the UL grant is applicable. The subset of subframes may be specified in terms of one or more of a number of subframes in the subset, a time interval between successive subframes in the subset, and an initial offset between a time of reception of the uplink grant and a first occurrence of a subframe in the subset. When p=1, a UL grant may be considered non-persistent. When p>1, a UL grant may be considered persistent—i.e., the UL grant may enable a UE to transmit data in more than one subframe of an uplink of the unlicensed spectrum. In some cases, a UE may perform a CCA once before transmitting data in more than one subframe of the uplink of the unlicensed spectrum. In other cases, a UE may be required to perform a CCA before each respective subframe in which it desires to transmit data over the unlicensed spectrum.

At a subframe k+n+m, the eNB may transmit an acknowledgement (ACK) or non-acknowledgement (NACK), such as a Hybrid Automatic Repeat reQuest (HARM) ACK/NACK, depending on whether it received a transmission from the UE over the uplink of the unlicensed spectrum. The ACK or NACK may be transmitted over the downlink of the licensed spectrum to increase reliability.

In some cases, a UL grant provided by an eNB may specify a fixed physical resource block (PRB) allocation and a modulation coding scheme (MCS). In other cases, a UL grant may specify a fixed PRB allocation and a variable MCS allocation. The variable MCS allocation may enable a UE to change its MCS based on channel conditions. In other cases, the UL grant may specify a fixed PRB allocation without specifying an MCS allocation. In those cases, the UE may determine the MCS upon receiving the UL grant and may transmit a message to the eNB over a set of resource elements with the allocated PRBs to indicate the MCS that is to be used for uplink transmissions.

Figure 5:
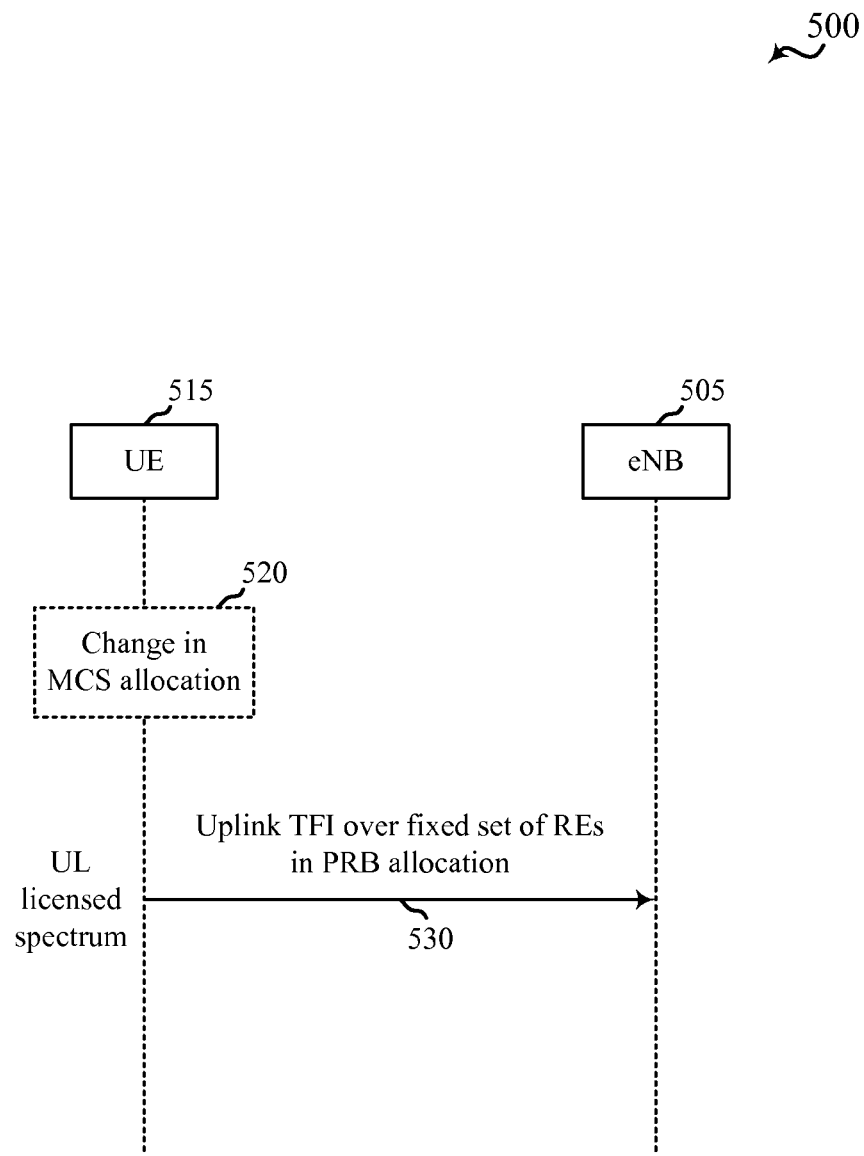
FIG. 5 is a message flow diagram illustrating another example of communications between a UE and an eNB according to various embodiments.

FIG. 5 is a message flow diagram 500 illustrating an example of communications between a UE 515 and an eNB 505 in connection with a carrier aggregation mode of operation where the UE 515 is allowed to change its MCS. The UE 515 may be an example of aspects of one or more of the UEs 115, 215, and 315 described with reference to FIGS. 1, 2A, 2B, and/or 3, and the eNB 505 may be an example of aspects of one or more of the eNBs 105, 205, and 305 described with reference to FIGS. 1, 2A, 2B, and/or 3. The message flow shown in FIG. 5 may be integrated with various other message flows described herein.

The message flow may include the UE 515 identifying a change in its MCS at block 520. The UE 515 may transmit a message 530 over a set of resource elements within PRBs allocated by its UL grant. The message 530 may be provided as part of an uplink transport format indicator (TFI) that indicates the identified change in MCS.

The eNB 505 may receive the message 530 and, based at least in part on the message 530, note the change in MCS allocation. In some embodiments, the eNB 505 can take the MCS into consideration when providing a next UL grant for the UE 515. That is, subsequent communications between the eNB 505 and the UE 515 may be based on the change in MCS allocation identified by the UE 515 and communicated to the eNB 505.

FIG. 6A is a timing diagram 600 illustrating another example of transmissions made by an eNB and a UE in connection with a carrier aggregation mode of operation. The transmissions 610 by the eNB may be an example of transmissions made by one of the eNBs 105, 205, 205, and 505 described with reference to FIGS. 1, 2A, 2B, 3, and/or 5, and the transmissions 620, 640 by the UE may be an example of transmissions made by one of the UEs 115, 215, 31, 5 and 515 described with reference to FIGS. 1, 2A, 2B, 3, and/or 5. The transmissions 610 by the eNB may be made over a downlink (DL) of a licensed spectrum (e.g., LTE/LTE-A licensed spectrum), and the transmissions 620 and 640 made by the UE may be made over an uplink of unlicensed spectrum (e.g., LTE/LTE-A unlicensed spectrum) and an uplink of the licensed spectrum, respectively.

To begin, the eNB may transmit a UL grant over a downlink of the licensed spectrum. The UL grant may in some cases be based at least in part on scheduling information received by the eNB (e.g., from the UE). The UL grant may be configured to trigger a CCA to determine availability of an unlicensed spectrum prior to a transmission associated with the uplink grant (e.g., a transmission by the UE).

At a subframe k, the UL grant may be received over the DL of the licensed spectrum. The value of the parameter k may be based on transmission delay(s) and/or other variables, and may in some cases be known in advance by the eNB and UE.

At a subframe k+n−1, where n is a parameter specified in the UL grant or known in advance by the UE and eNB, the UE may perform a CCA 630 to determine availability of the unlicensed spectrum. The CCA 430 may be performed prior to a transmission associated with the UL grant (e.g., a transmission by the UE). When a determination is made that the unlicensed spectrum is available, data may be transmitted to the eNB using the unlicensed spectrum in a subframe k+n. However, when a determination is made that the unlicensed spectrum is not available, data may be transmitted to the eNB using the licensed spectrum.

Figure 6B:
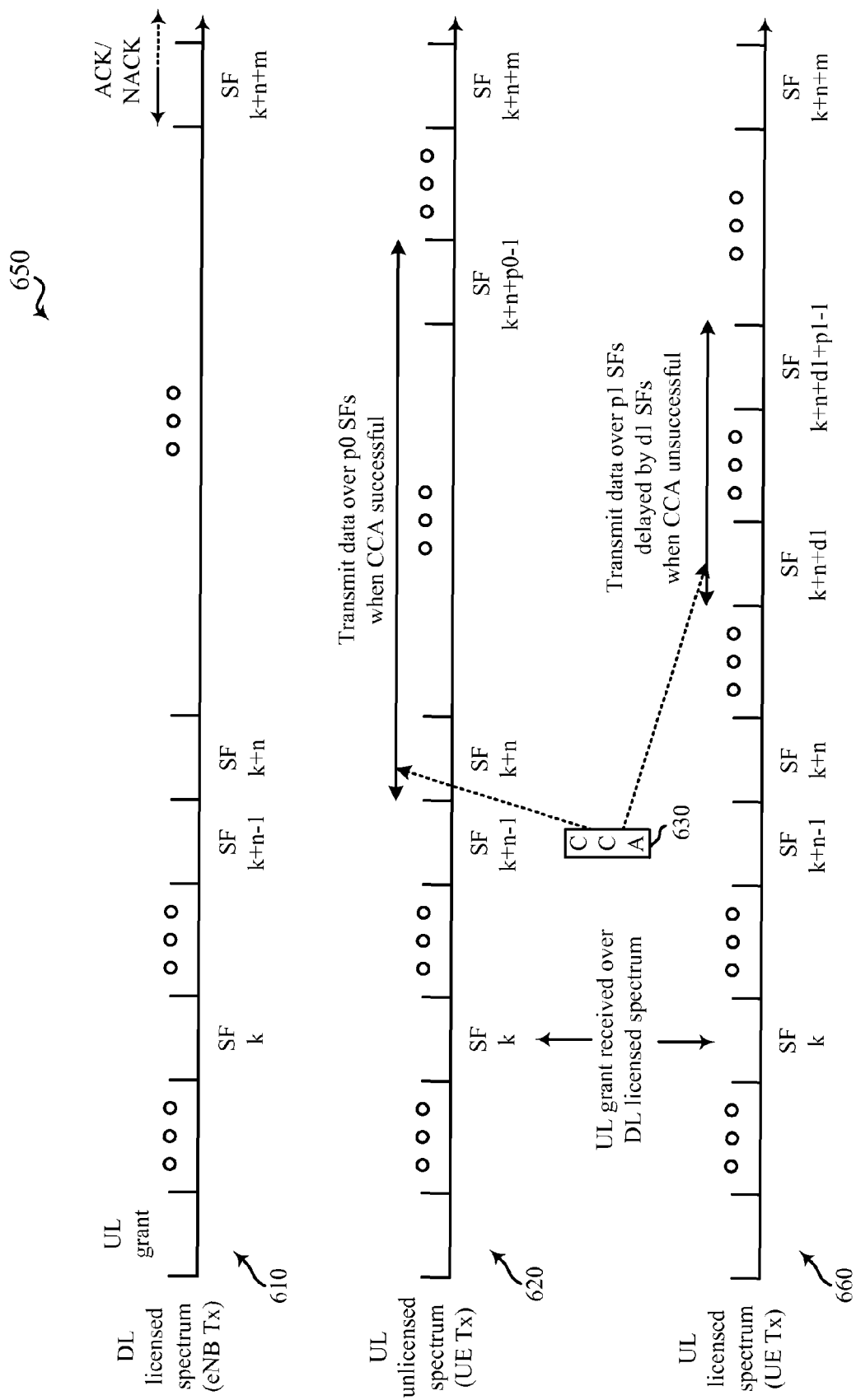

As shown in FIG. 6A, a transmission using the licensed spectrum may begin at subframe k+n (i.e., the same subframe in which a transmission would have been made in the unlicensed spectrum). Alternately, and as shown in FIG. 6B, a transmission using the licensed spectrum may begin at subframe k+n+d1, which differs from the subframe k+n in which a transmission would have been made in the unlicensed spectrum. The parameter d1 may in some cases be a delay of some number of subframes. By employing the parameter d1, a UL grant that enables a fallback transmission on the licensed spectrum may be relinquished and reallocated when the UE determines the unlicensed spectrum is available and the UL grant for the licensed spectrum is not needed. That is, resources allocated as part of the UL grant for transmissions over the licensed spectrum may be released and reallocated when the eNB detects that the unlicensed spectrum was used for the uplink transmission.

An eNB may mitigate the likelihood of collisions between transmissions by multiple UEs by assigning different pilot sequences to different UEs, which pilot sequences can be decoded and distinguished by the eNB. In some cases, the different pilot sequences may be orthogonal demodulation reference signals (DM-RS) in corresponding Physical Uplink Shared CHannel (PUSCH) resources of the licensed spectrum.

In some cases, a transmission of data by the UE may begin at a subframe k+n or k+n+d1 and continue over p0 or p1 subframes, where p0 and p1 are parameters specified in the UL grant. The parameter p0 may indicate a first subset of subframes for which the UL grant is applicable in the unlicensed spectrum and parameter p1 may indicate a second subset of subframes for which the UL grant is applicable in the licensed spectrum. For example, when transmitting data using the unlicensed spectrum, the UE may transmit data during the first subset (or period) of subframes p0, but when transmitting data using the licensed spectrum, the UE may transmit data during the second subset (or period) of subframes p1. The first subset of subframes may be less than, equal to, or greater than the second subset of subframes. However, when the unlicensed spectrum has more available bandwidth than the licensed spectrum, it may be useful to make the first subset of subframes greater than the second subset of subframes. In some instances, the first subset of subframes may include the second subset of subframes. The first and second subsets of subframes may start in the same subframe or at different subframes (i.e., offset or delayed). Each of the first and second subsets of subframes may be specified in terms of one or more of a number of subframes in the subset, a time interval between successive subframes in the subset, and an initial offset between a time of reception of the uplink grant and a first occurrence of a subframe in the subset.

At a subframe k+n+m, the eNB may transmit an acknowledgement (ACK) or non-acknowledgement (NACK), such as a HARQ ACK/NACK, depending on whether it received a transmission from the UE over the uplink of the unlicensed and/or licensed spectrum. The ACK or NACK may be transmitted over the downlink of the licensed spectrum to increase reliability.

Figure 7:
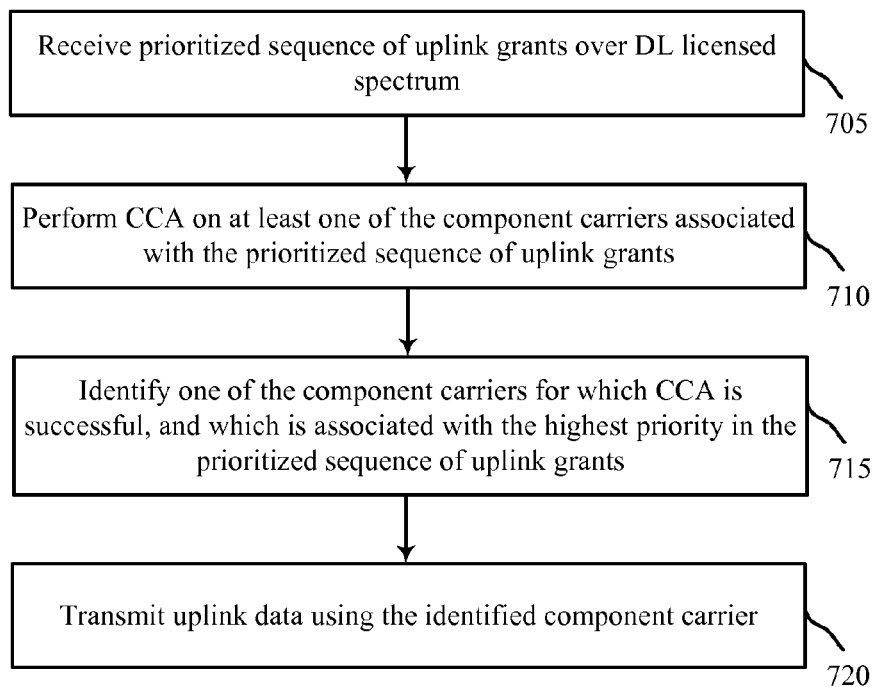
FIG. 7 is a flowchart of an example of a method for wireless communications using licensed and unlicensed spectrum according to various embodiments.

FIG. 7 is a flow chart illustrating an example of a method 700 for wireless communications. For clarity, the method 700 is described below with reference to one of the eNBs 105, 205, 305, and 505 or the UEs 115, 215, 315, and 515 shown in FIGS. 1, 2A, 2B, 3, and/or 5. In one embodiment, one of the UEs may execute one or more sets of codes to control the functional elements of the UE to perform the functions described below.

At block 705, an uplink grant may be received over a licensed spectrum. In some embodiments, the uplink grant may be received by a UE from an eNB. In some embodiments, the licensed spectrum may include an LTE/LTE-A spectrum. The uplink grant may include a prioritized sequence of uplink grants, in which each uplink grant in the prioritized sequence is associated with a respective component carrier.

In some embodiments, each UL grant in the prioritized sequence may include one or both of a set of PRBs for the respective component carrier and a subset of subframes for which the uplink grant is applicable. The subset of subframes may be specified in terms of one or more of a number (period) of subframes in the subset, a time interval between successive subframes in the subset, and an initial offset or delay between a time of reception of the uplink grant and a first occurrence of a subframe in the subset. For example, a prioritized sequence of uplink grants may specify a set of parameters $\{G_k=(f_k, r_k, p_k)|k=1, 2, \ldots, N\}$, where each $f_k$ is a component carrier in the unlicensed spectrum or the licensed spectrum, $r_k$ is a set of PRBs for the respective component carrier, and $p_k$ is the persistence of the grant, specified in units of subframes, for example.

In some cases, a parameter in a UL grant in the prioritized sequence may be determined implicitly from a respective parameter in another UL grant in the prioritized sequence. This may reduce the number of parameters that need to be transmitted as part of the prioritized sequence of uplink grants. For example, the last grant in the list may be a grant for the Primary Component Carrier (PCC), which may be a carrier in the licensed spectrum. By way of further example, the parameter $p_{k+1}$ may be equal to $p_k-1$ for all k, or $P_{k+1}$ may be equal to ceil ($p_k/2$). By way of additional example, for k>1, the grant parameters $G_k$ may be systematically configured using Radio Resource Control (RRC) signaling. In this case, the prioritized sequence is used to dynamically generate the first grant in the sequence, $G_1$, and activate the persistent assignments $G_2, G_3, \ldots, G_N$ when CCA fails for the preceding carriers in the prioritized sequence.

At blocks 710 and 715, and in response to the prioritized sequence of uplink grants, CCA may be performed to determine availability of the unlicensed spectrum. In some cases, the CCA may be performed by 1) at block 710, performing CCA on at least one of the component carriers associated with the prioritized sequence of uplink grants to determine availability, and 2) at block 715, identifying one of the component carriers found to be available for use in transmitting data. In one example, a UE may sequentially perform a CCA for each component carrier $f_k$, beginning with k=1. Upon determining that the unlicensed spectrum corresponding to $f_n$ is available, no further CCAs may need to be performed. In another example, the component carriers corresponding to a subset of the uplink grants in the prioritized sequence may be found to be available, and the one component carrier for use in transmitting data may be identified by selecting from the component carriers found to be available the one that corresponds to the uplink grant with the highest priority in the subset.

At block 720, UL data may be transmitted (e.g., from a UE 115 to an eNB 105) using the identified component carrier. For example, a UE may transmit data on the component carrier $f_n$, using the PRBs $r_n$, for the next $p_n$ subframes. Although not shown in FIG. 7, unused UL grants of lower priority may be released when the component carrier for a UL grant of a particular priority is determined to be available.

In some embodiments, a parameter in an uplink grant in the prioritized sequence may be determined implicitly from a respective parameter in another uplink grant in the prioritized sequence. In some embodiments, an implicit relationship between parameters in different uplink grants of the prioritized sequence may be specified at least in part through radio resource control (RRC) signaling.

Thus, the method 700 may provide for wireless communications. It should be noted that the method 700 is just one implementation and that the operations of the method 700 may be rearranged or otherwise modified such that other implementations are possible.

Figure 8:
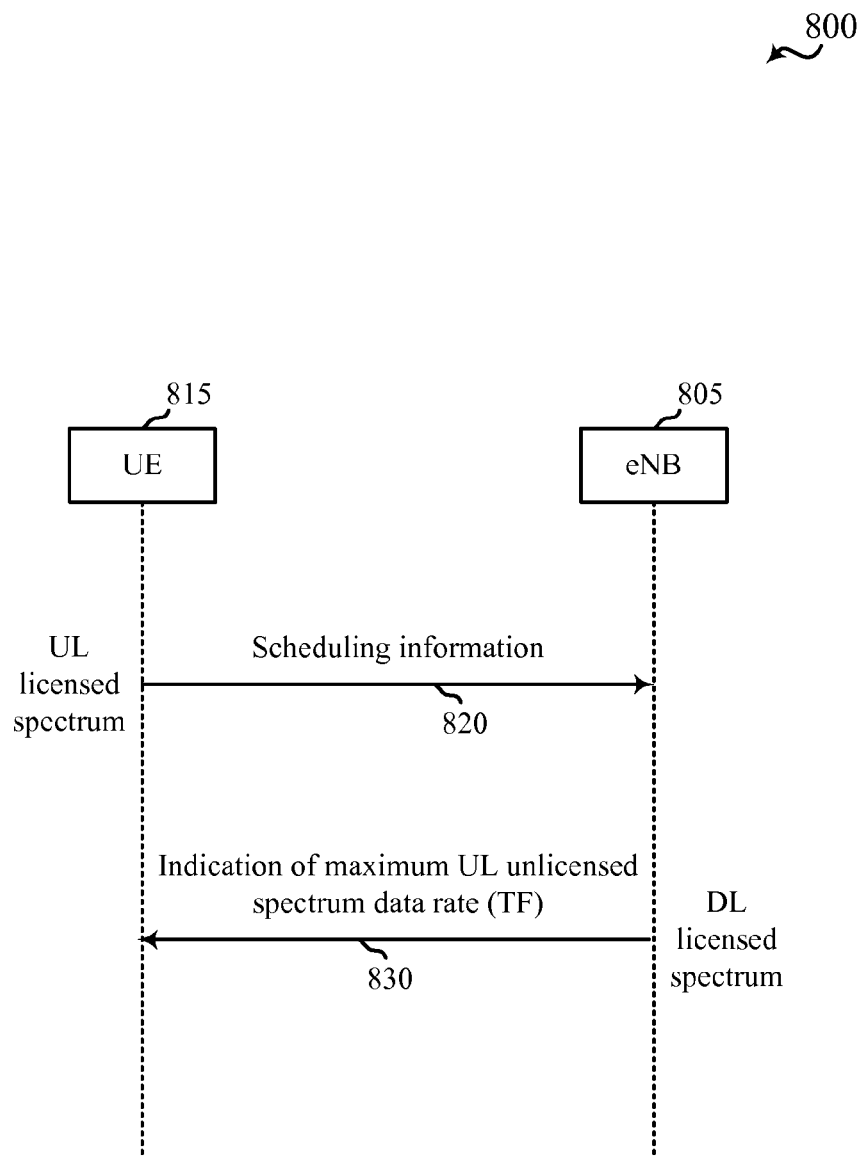
FIG. 8 is a message flow diagram illustrating yet another example of communications between a UE and an eNB according to various embodiments.

FIG. 8 is a message flow diagram 800 illustrating one example of communications between a UE 815 and an eNB 805. The UE 815 may be an example of aspects of one or more of the UEs 115, 215, 315, and 515 described with reference to FIGS. 1, 2A, 2B, 3, and/or 5, and the eNB 805 may be an example of aspects of one or more of the eNBs 105, 205, 305, and 505 described with reference to FIGS. 1, 2A, 2B, 3, and/or 5.

The message flow may include the UE 815 transmitting scheduling information 820 to the eNB 805 over an uplink carried on licensed spectrum (e.g., LTE/LTE-A licensed spectrum). In some cases, the scheduling information may include one or more of a scheduling request, a buffer status report, and a power headroom report indicating a power headroom associated with the licensed spectrum and a power headroom associated with unlicensed spectrum (e.g., LTE/LTE-A unlicensed spectrum). The power headroom report may, for each spectrum, indicate a difference between the current transmit power of the UE 815 and a maximum transmit power of the UE 815. This may enable the eNB 805 to adjust transmit power in response to channel conditions (e.g., channel quality) in the licensed or unlicensed spectrum. In some cases, the power headroom may be biased based on past CCA history.

The eNB 805 may receive the scheduling information 820 and, based at least in part on the scheduling information, transmit an indication 830 of a maximum uplink data rate (transport format or TF) over the unlicensed spectrum for a set of PRBs. The UE 815 may receive this indication and perform CCA in a subframe in response to the indication. The CCA may be performed to determine availability of a component carrier for the set of PRBs in the unlicensed spectrum to transmit data in a next subframe. Examples of performing CCA in response to the indication of a maximum uplink data rate are described below.

Figure 9A:
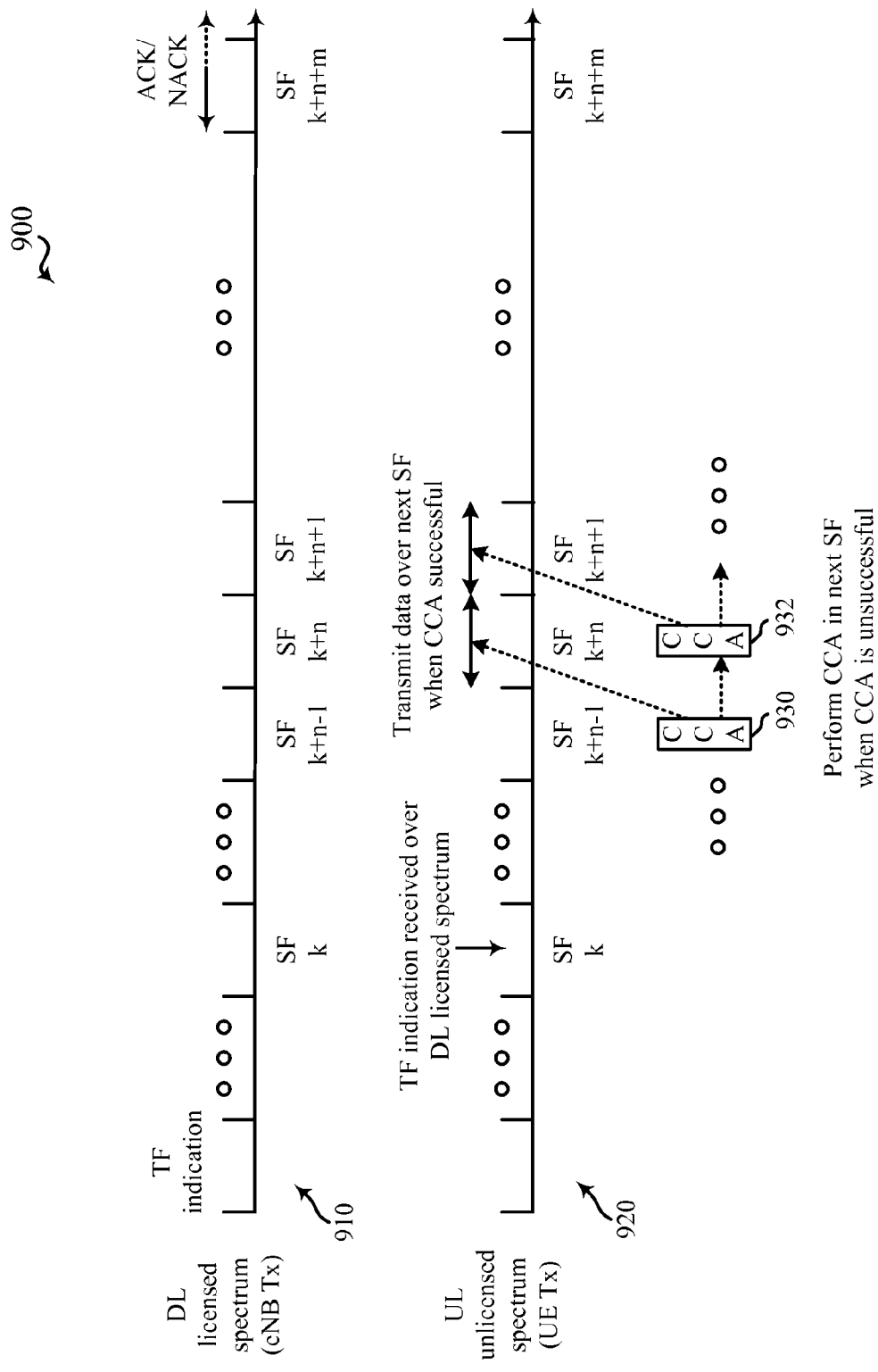
FIGS. 9A and 9B are timing diagrams illustrating additional examples of transmissions made by an eNB and a UE according to various embodiments.

FIG. 9A is a timing diagram 900 illustrating another example of transmissions made by an eNB and a UE. The transmissions 910 by the eNB may be an example of transmissions made by one of the eNBs 105, 205, 305, 505, and 805 described with reference to FIGS. 1, 2A, 2B, 3, 5, and/or 8, and the transmissions 920 by the UE may be an example of transmissions made by one of the UEs 115, 215, 315, 515, and 815 described with reference to FIGS. 1, 2A, 2B, 3, 5, and/or 8. The transmissions 910 by the eNB may be made over a downlink (DL) of licensed spectrum (e.g., LTE/LTE-A spectrum), and the transmissions 920 made by the UE may be made over an uplink of unlicensed spectrum (e.g., LTE/LTE-A unlicensed spectrum).

To begin, the eNB may transmit a UL grant over a downlink of the licensed spectrum. The eNB may also transmit a maximum uplink data rate (e.g., a TF indication) over the downlink of the licensed spectrum. In response to the UL grant and the TF indication, a CCA may be triggered to determine availability of an unlicensed spectrum prior to a transmission associated with the uplink grant (e.g., a transmission by the UE).

The UL grant may be broadcast or unicast. When broadcast, all of the UEs to which the UL grant is broadcast are allowed to transmit on all PRBS in a group of uplink PRBs. When unicast, each UE is allowed to transmit on a specific set of PRBs.

At a subframe k, the TF indication may be received over the DL of the licensed spectrum. The value of the parameter k may be based on transmission delay(s) and/or other variables, and may in some cases be known in advance by the eNB and UE.

At a subframe k+n−1, where n is a parameter specified in the UL grant or known in advance by the UE and eNB, the UE may perform a CCA 930 to determine availability of a component carrier for the set of PRBs in the unlicensed spectrum. The CCA 930 may be performed prior to a transmission associated with the UL grant (e.g., a transmission by the UE). When a determination is made that the unlicensed spectrum is available, data may be transmitted to the eNB using the unlicensed spectrum in a subframe k+n (e.g., a next subframe). However, when a determination is made that the component carrier for the set of PRBs in the unlicensed spectrum is not available, a CCA 932 may be performed during the subframe k+n. When a determination is made in response to the CCA 932 that the unlicensed spectrum is available, data may be transmitted to the eNB using the unlicensed spectrum in a subframe k+n+1. Otherwise, the cycle may continue for as long as specified or allowed by the eNB.

Each of a number of UEs may perform the operations described with respect to FIG. 9A in parallel, and code division multiple access (CDMA) technology (e.g., spreading sequences) may be used to mitigate interference between UEs that transmit data in the same subframe.

At a subframe that is m subframes from a subframe in which data is or is not transmitted to the eNB, the eNB may transmit an acknowledgement (ACK) or non-acknowledgement (NACK), such as a HARQ ACK/NACK, depending on whether it received a transmission from the UE over the uplink of the unlicensed spectrum. The ACK or NACK may be transmitted over the downlink of the licensed spectrum to increase reliability.

Figure 9B:
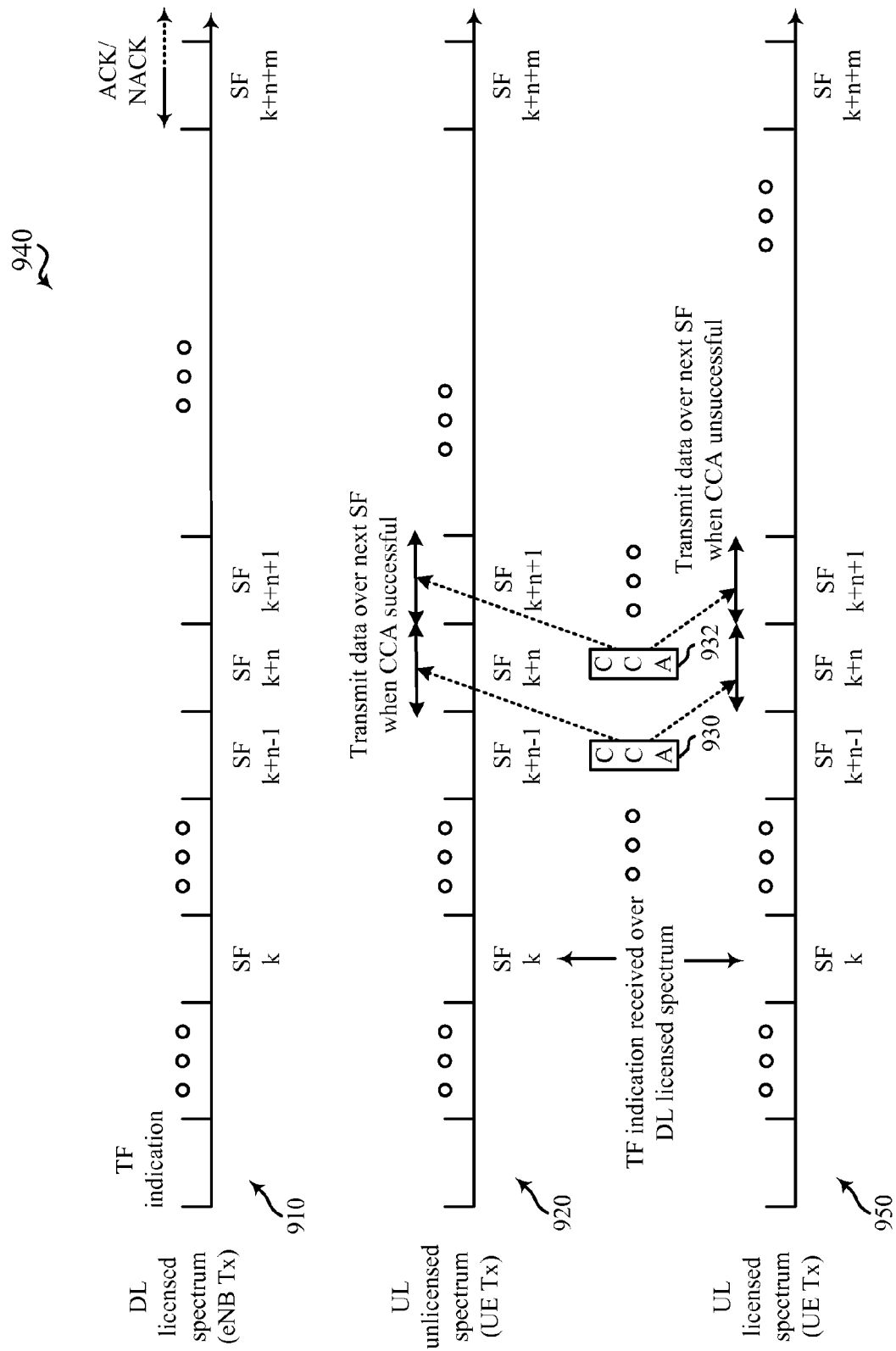

FIG. 9B is a timing diagram 900 illustrating yet another example of transmissions made by an eNB and a UE. The transmissions 910 by the eNB may be an example of transmissions made by one of the eNBs 105, 205, 305, 505, and 805 described with reference to FIGS. 1, 2A, 2B, 3, 5, and/or 8, and the transmissions 920 and 950 by the UE may be an example of transmissions made by one of the UEs 115, 215, 315, 515, and 815 described with reference to FIGS. 1, 2A, 2B, 3, 5, and/or 8. The transmissions 910 by the eNB may be made over a downlink (DL) of licensed spectrum (e.g., LTE/LTE-A licensed spectrum), and the transmissions 920 and 940 made by the UE may be made over an uplink of unlicensed spectrum (e.g., LTE/LTE-A unlicensed spectrum) and an uplink of the licensed spectrum, respectively.

To begin, the eNB may transmit a UL grant over a downlink of the licensed spectrum. The eNB may also transmit a maximum uplink data rate (e.g., a TF indication) over the downlink of the licensed spectrum. In response to the UL grant and the TF indication, a CCA may be triggered to determine availability of an unlicensed spectrum prior to a transmission associated with the uplink grant (e.g., a transmission by the UE).

At a subframe k, the TF indication may be received over the DL of the licensed spectrum. The value of the parameter k may be based on transmission delay(s) and/or other variables, and may in some cases be known in advance by the eNB and UE.

At a subframe k+n−1, where n is a parameter specified in the UL grant or known in advance by the UE and eNB, the UE may perform a CCA 930 to determine availability of a component carrier for the set of PRBs in the unlicensed spectrum. The CCA 930 may be performed prior to a transmission associated with the UL grant (e.g., a transmission by the UE). When a determination is made that the unlicensed spectrum is available, data may be transmitted to the eNB using the unlicensed spectrum in a subframe k+n (e.g., a next subframe). However, when a determination is made that the unlicensed spectrum is not available, data may be transmitted to the eNB using the licensed spectrum for the set of PRBs in the subframe k+n. Another CCA 932 may then be performed during the subframe k+n. When a determination is made in response to the CCA 932 that the unlicensed spectrum is available, data may be transmitted to the eNB using the unlicensed spectrum in a subframe k+n+1. Otherwise, data may be transmitted to the eNB using the licensed spectrum in the subframe k+n. The cycle may continue for as long as specified or allowed by the eNB.

At a subframe that is m subframes from a subframe in which data is or is not transmitted to the eNB, the eNB may transmit an acknowledgement (ACK) or non-acknowledgement (NACK), such as a HARQ ACK/NACK, depending on whether it received a transmission from the UE over the uplink of the unlicensed spectrum. The ACK or NACK may be transmitted over the downlink of the licensed spectrum to increase reliability.

In connection with the features described in at least FIGS. 9A and 9B, a same set of PRBs may be assigned (e.g., by an eNB 105) to each of multiple users on the uplink of the unlicensed spectrum. Data transmitted from the multiple users (e.g., multiple UEs 115) that are assigned the same set of PRBs, where the data occupies those PRBs, may be decoded (e.g., by the eNB 105) using successive interference cancellation (SIC). The multiple users assigned the same set of PRBs may be assigned (e.g., by the eNB 105) orthogonal demodulation reference signals (DM-RS) sequences. Each of the users assigned the orthogonal DM-RS sequences may also be assigned (e.g., by the eNB 105) a distinct scrambling code. When a determination is made that the component carrier for the set of PRBs in the unlicensed spectrum is available (e.g., successful CCA), uplink reference signals, control signals, and/or data signals may be transmitted using one or both of the orthogonal DM-RS sequence and the scrambling code assigned to a user. An additional signal may be transmitted along with uplink reference, control, and/or data signals, where the additional signal indicates one or more of a transmit format selection (e.g., through transmit format indication or TFI), a Hybrid Automatic Repeat Request identifier (HARQ-ID), and a HARQ redundancy version (RV).

Figure 10A:
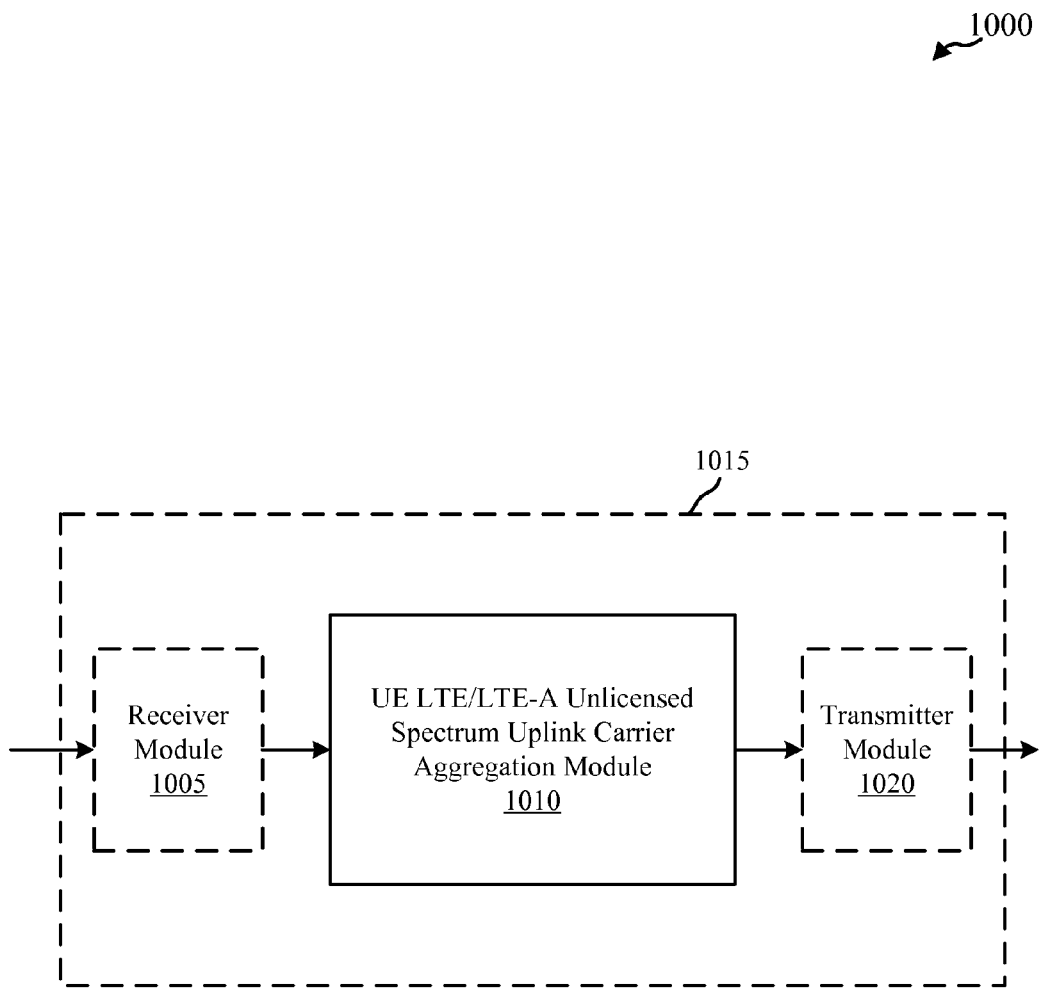
FIGS. 10A and 10B show block diagrams of examples of devices, such as UEs, for use in wireless communications according to various embodiments.

Referring now to FIG. 10A, a block diagram 1000 illustrates a device 1015 for use in wireless communications in accordance with various embodiments. In some embodiments, the device 1015 may be an example of one or more aspects of one of the UEs 115, 215, 315, 515, and 815 described with reference to FIGS. 1, 2, 3, 5, and/or 8. The device 1015 may also be a processor. The device 1015 may include a receiver module 1005, a UE LTE/LTE-A unlicensed spectrum uplink carrier aggregation module 1010, and/or a transmitter module 1020. Each of these components may be in communication with each other.

The components of the device 1015 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 1005 may be or include a radio frequency (RF) receiver, such as an RF receiver operable to receive transmissions in licensed spectrum (e.g., LTE/LTE-A licensed spectrum) and/or unlicensed spectrum (e.g., LTE/LTE-A unlicensed spectrum). The RF receiver may include separate receivers for the licensed spectrum and the unlicensed spectrum. The receiver module 1005 may be used to receive various types of data and/or control signals (i.e., transmissions) over one or more communication links of a wireless communications system including the licensed and unlicensed spectrums, such as one or more communication links of the wireless communications system 100 described with reference to FIGS. 1, 2A, and/or 2B.

In some embodiments, the transmitter module 1020 may be or include an RF transmitter, such as an RF transmitter operable to transmit in the licensed spectrum and/or the unlicensed spectrum. The RF transmitter may include separate transmitters for the licensed spectrum and the unlicensed spectrum. The transmitter module 1020 may be used to transmit various types of data and/or control signals (i.e., transmissions) over one or more communication links of a wireless communications system, such as one or more communication links of the wireless communications system 100 described with reference to FIGS. 1, 2A, and/or 2B.

In some embodiments, the UE LTE/LTE-A unlicensed spectrum carrier aggregation module 1010 may receive an uplink grant over a licensed spectrum and perform a CCA in response to the uplink grant to determine availability of an unlicensed spectrum. The CCA may be performed prior to a transmission associated with the uplink grant. The uplink grant may be received, for example, from one of the base stations or eNBs 105 and 205 described with reference to FIGS. 1, 2A, and/or 2B.

In some cases, the uplink grant may be received after the device 1015 transmits one or more of a scheduling request, a buffer status report, and a power headroom report to a base station or eNB. The power headroom report may indicate a power headroom associated with the licensed spectrum and/or a power headroom associated with the unlicensed spectrum. The power headroom report may, for each spectrum, indicate a difference between the current transmit power of the device 1015 and a maximum transmit power of the device 1015. This may enable an eNB to adjust transmit power in response to channel conditions (e.g., channel quality) in the licensed or unlicensed spectrum. In some cases, the power headroom may be biased based on past CCA history.

Upon making a determination that the unlicensed spectrum is available (e.g., by performing a successful CCA), the device 1015 may transmit data using the unlicensed spectrum. (e.g., the device 1015 may transmit data in accordance with the uplink grant).

Figure 10B:
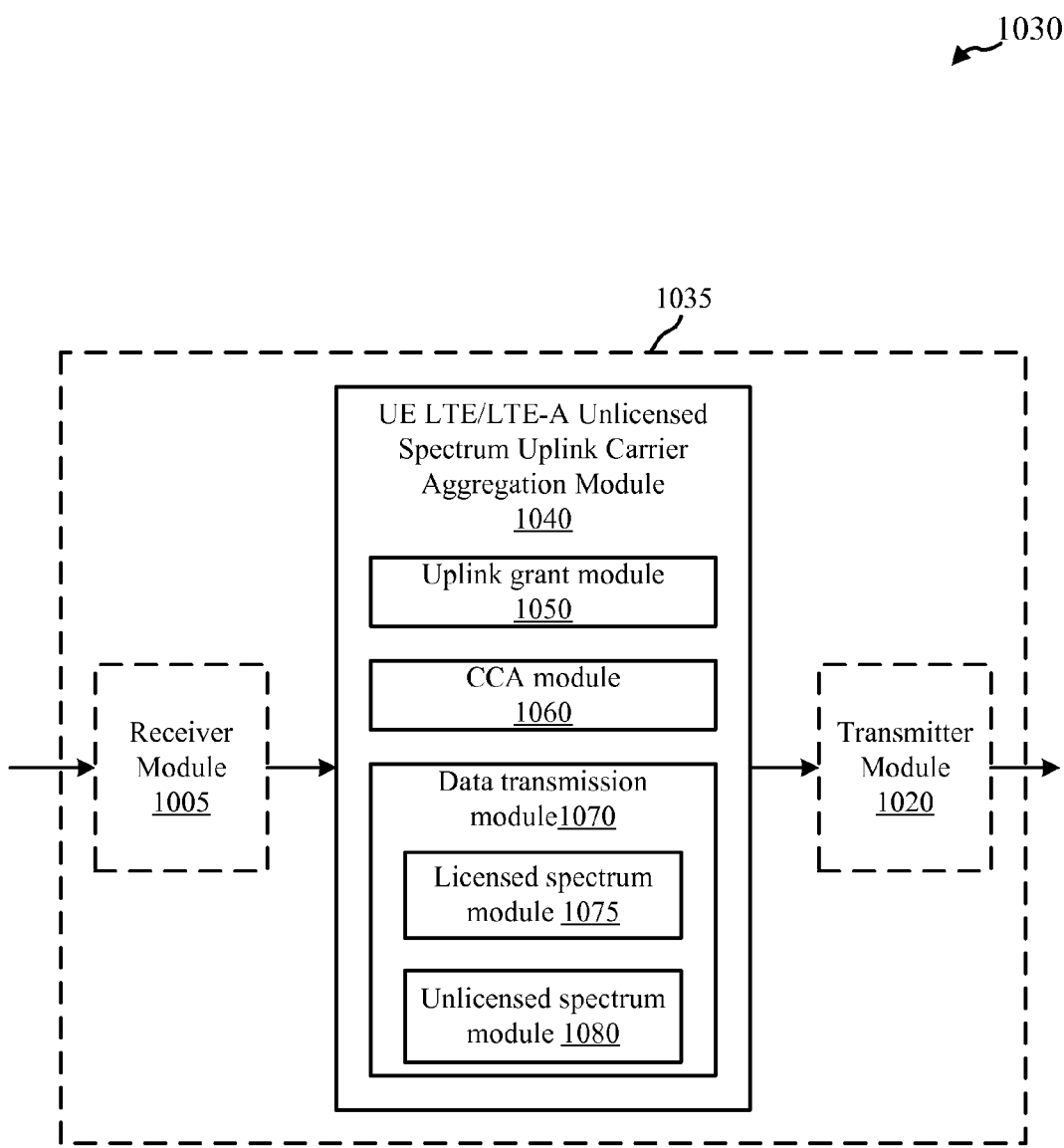

Referring now to FIG. 10B, a block diagram 1030 illustrates a device 1035 for use in wireless communications in accordance with various embodiments. In some embodiments, the device 1035 may be an example of the device 1015 of FIG. 10A. The device 1035 may also be a processor. The device 1035 may include the receiver module 1005, a UE LTE/LTE-A unlicensed spectrum uplink carrier aggregation module 1040, and/or the transmitter module 1020. Each of these components may be in communication with each other.

The components of the device 1035 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver module 1005 and transmitter module 1020 may be configured similarly to what is described with respect to FIG. 10A. The UE LTE/LTE-A unlicensed spectrum uplink carrier aggregation module 1040 may be an example of the UE LTE/LTE-A unlicensed spectrum uplink carrier aggregation module 1010 described with reference to FIG. 10A and may include an uplink grant module 1050, a CCA module 1060, and/or a data transmission module 1070. Each of these components may be in communication with each other.

In some embodiments, the uplink grant module 1050 may receive an uplink grant over a licensed spectrum. The uplink grant may be received, for example, from one of the base stations or eNBs 105 and 205 described with reference to FIGS. 1, 2A, and/or 2B.

In some embodiments, the CCA module 1060 may perform a CCA in response to the uplink grant to determine availability of an unlicensed spectrum. The CCA may be performed prior to a transmission associated with the uplink grant.

In some embodiments, the data transmission module 1070 may transmit data using a licensed spectrum module 1075 and/or an unlicensed spectrum module 1080. For example, the data transmission module 1070 may transmit data in accordance with one or more of the following scenarios.

In a first scenario, the data transmission module 1070 may transmit data using the unlicensed spectrum module 1080 when the CCA module 1060 makes a determination that the unlicensed spectrum is available (e.g., following a successful CCA). However, when the CCA module 1060 makes a determination that the unlicensed spectrum is unavailable, the data transmission module 1050 may disregard an associated uplink grant and not transmit any data. An example of this first scenario of operation is described with reference to FIG. 4.

In a second scenario, the data transmission module 1070 may transmit data using the unlicensed spectrum module 1080 when the CCA module 1060 makes a determination that the unlicensed spectrum is available (e.g., following a successful CCA). However, when the CCA module 1060 makes a determination that the unlicensed spectrum is unavailable, the licensed spectrum module 1075 may transmit data using the licensed spectrum. In some embodiments, transmitting data using the unlicensed spectrum may include transmitting data during a first subset of subframes indicated by an uplink grant, and transmitting data using the licensed spectrum may include transmitting data during a second subset of subframes indicated by the uplink grant. The first subset of subframes may be less than, equal to, or greater than the second subset of subframes. However, when the unlicensed spectrum has more available bandwidth than the licensed spectrum, it may be useful to make the first subset of subframes greater than the second subset of subframes. In some cases, the first subset of subframes includes the second subset of subframes. The first and second subsets of subframes may start in the same subframe or at different subframes. In the latter case, and by way of example, the first subset of subframes may start in a first subframe, and the second subset of subframes may start in a second subframe, with the second subframe being delayed from the first subframe. An example of the second scenario of operation, in which the first and second subsets of subframes start in the same subframe, is described with reference to FIG. 6A. An example of the second scenario of operation in which the first and second subsets of subframes start in different subframes is described with reference to FIG. 6B.

In a third scenario, the uplink grant received by the uplink grant module 1050 may include a prioritized sequence of uplink grants, in which each uplink grant in the prioritized sequence is associated with a respective component carrier. In response to the prioritized sequence of uplink grants, the CCA module 1060 may perform CCA to determine availability of the unlicensed spectrum by 1) performing CCA on at least one of the component carriers associated with the prioritized sequence of uplink grants to determine availability, and 2) identifying one of the component carriers found to be available for use in transmitting data. In some cases, the component carriers corresponding to a subset of the uplink grants in the prioritized sequence may be found to be available, and the one component carrier for use in transmitting data may be identified by selecting from the component carriers found to be available the one that corresponds to the uplink grant with the highest priority in the subset.

In accordance with the third scenario, but only in some cases, each uplink grant in the prioritized sequence may include one or more of a set of PRBs for the respective component carrier and a subset of subframes for which the uplink grant is applicable. The subset of subframes may be specified in terms of one or more of a number of subframes in the subset, a time interval between successive subframes in the subset, and an initial offset between a time of reception of the uplink grant and a first occurrence of a subframe in the subset. In some cases, a parameter in an uplink grant in the prioritized sequence may be determined implicitly from a respective parameter in another uplink grant in the prioritized sequence. In some cases, an implicit relationship between parameters in different uplink grants of the prioritized sequence may be specified at least in part through RRC signaling.

In a fourth scenario, the uplink grant module 1050 may receive, over the licensed spectrum, an indication of a maximum uplink data rate over the unlicensed spectrum for a set of PRBs. The CCA module 1060 may perform CCA in a subframe in response to the indication. The CCA may be performed to determine availability of a component carrier for the set of PRBs in the unlicensed spectrum to transmit data in a next subframe. The unlicensed spectrum module 1080 may then transmit data using the unlicensed spectrum when a determination is made by the CCA module 1060 that the component carrier for the set of PRBs in the unlicensed spectrum is available. Otherwise, the CCA module 1060 may perform CCA in the next subframe when a determination is made that the component carrier for the set of PRBs in the unlicensed spectrum is not available. An example of this fourth scenario of operation is described with reference to FIG. 9A.

In a fifth scenario, the uplink grant module 1050 may receive, over the licensed spectrum, an indication of a maximum uplink data rate over the unlicensed spectrum for a set of PRBs. The CCA module 1060 may perform CCA in a subframe in response to the indication. The CCA may be performed to determine availability of a component carrier for the set of PRBs in the unlicensed spectrum to transmit data in a next subframe. The unlicensed spectrum module 1080 may then transmit data using the unlicensed spectrum when a determination is made by the CCA module 1060 that the component carrier for the set of PRBs in the unlicensed spectrum is available. Otherwise, the licensed spectrum module 1075 may transmit data using the licensed spectrum when a determination is made that the component carrier for the set of PRBs in the unlicensed spectrum is not available. An example of this fifth scenario of operation is described with reference to FIG. 9B.

In a sixth scenario, the uplink grant module 1050 may receive an uplink grant and identify a change from an MCS indicated by the uplink grant. In this scenario (which may form a part of any of the first through fifth scenarios), the licensed spectrum module 1075 may use the licensed spectrum to transmit a message over a set of resource elements within the PRBs allocated by the uplink grant. The message may indicate the identified change in MCS. When the uplink grant does not indicate an MCS, the device 1035 may be configured to determine the MCS for uplink transmission upon reception of the uplink grant and to transmit a message over the set of resource elements within the PRBs allocated by the uplink grant, where the message indicates the MCS to be used for uplink transmission.

In some cases, the device 1035 may receive an uplink grant after transmitting one or more of a scheduling request, a buffer status report, and a power headroom report indicating a power headroom associated with the licensed spectrum and a power headroom associated with unlicensed spectrum (e.g., LTE/LTE-A unlicensed spectrum). The power headroom report may, for each spectrum, indicate a difference between the current transmit power of the device 1035 and a maximum transmit power of the device 1035. This may enable an eNB to adjust transmit power in response to channel conditions (e.g., channel quality) in the licensed or unlicensed spectrum. In some cases, the power headroom may be biased based on past CCA history. The scheduling report, buffer status report, and power headroom report may in some cases be transmitted by the licensed spectrum module 1075 using the licensed spectrum.

Figure 11A:
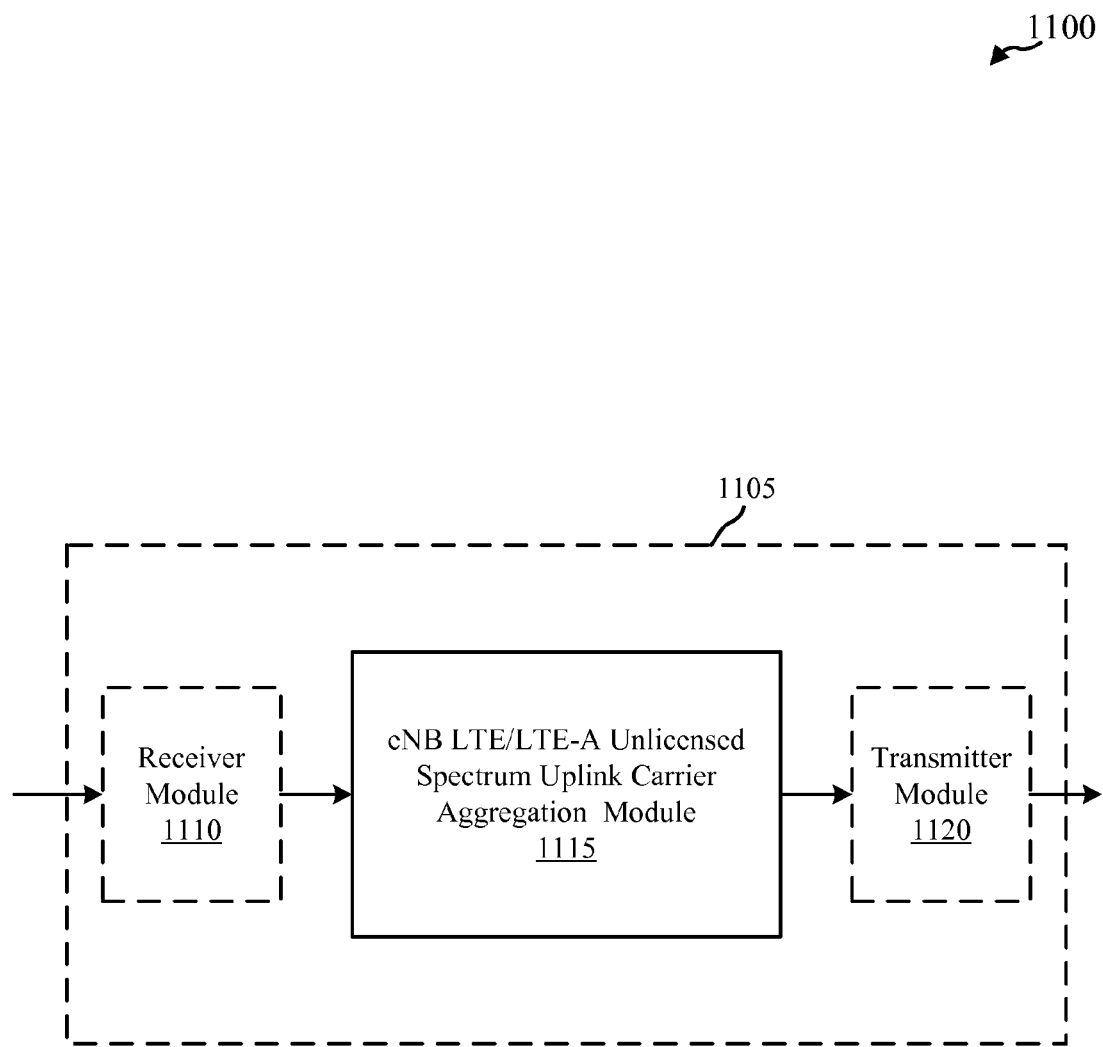
FIGS. 11A and 11B show block diagrams of examples of devices, such as eNBs, for use in wireless communications according to various embodiments.

Referring now to FIG. 11A, a block diagram 1100 illustrates a device 1105 for use in wireless communications in accordance with various embodiments. In some embodiments, the device 1105 may be an example of one or more aspects of one of the base stations or eNBs 105, 205, 305, 505, and 805 described with reference to FIGS. 1, 2, 3, 5, and/or 8. The device 1105 may also be a processor. The device 1105 may include a receiver module 1110, an eNB LTE/LTE-A unlicensed spectrum uplink carrier aggregation module 1115, and/or a transmitter module 1120. Each of these components may be in communication with each other.

The components of the device 1105 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 1110 may be or include an RF receiver, such as a receiver operable to receive transmissions in licensed spectrum (e.g., LTE/LTE-A licensed spectrum) and/or unlicensed spectrum (e.g., LTE/LTE-A unlicensed spectrum). The RF receiver may include separate receivers for the licensed spectrum and the unlicensed spectrum. The receiver module 1110 may be used to receive various types of data and/or control signals (i.e., transmissions) over one or more communication links of a wireless communications system including the licensed and unlicensed spectrums, such as one or more communication links of the wireless communications system 100 described with reference to FIGS. 1, 2A, and/or 2B.

In some embodiments, the transmitter module 1120 may be or include an RF transmitter, such as a transmitter operable to transmit in the licensed spectrum and/or the unlicensed spectrum. The RF transmitter may include separate transmitters for the licensed spectrum and the unlicensed spectrum. The transmitter module 1120 may be used to transmit various types of data and/or control signals (i.e., transmissions) over one or more communication links of a wireless communications system, such as one or more communication links of the wireless communications system 100 described with reference to FIGS. 1, 2A, and/or 2B.

In some embodiments, the eNB LTE/LTE-A unlicensed spectrum uplink carrier aggregation module 1115 may receive scheduling information over a licensed spectrum (e.g., from a UE or device such as one of the UEs 115, 215, 315, 515, and 815 or devices 1015 and 1035 described with reference to FIGS. 1, 2A, 2B, 3, 5, 8, 10A, and/or 10B) and then transmit an uplink grant over the licensed spectrum (e.g., to the UE). The uplink grant may be based at least in part on the scheduling information, and may be configured to trigger a CCA to determine availability of an unlicensed spectrum prior to a transmission associated with the uplink grant (e.g., a transmission from a UE). Depending on the uplink grant and/or the availability of the unlicensed spectrum, data may be received by the device 1105 over the licensed and/or unlicensed spectrum.

In some cases, the scheduling information may include one or more of a scheduling request, a buffer status report, and a power headroom report indicating a power headroom associated with the licensed spectrum and a power headroom associated with unlicensed spectrum (e.g., LTE/LTE-A unlicensed spectrum). The power headroom report may, for each spectrum, indicate a difference between the current transmit power of a UE and a maximum transmit power of the UE. This may enable an eNB to adjust transmit power in response to channel conditions (e.g., channel quality) in the licensed or unlicensed spectrum. In some cases, the power headroom may be biased based on past CCA history.

Figure 11B:
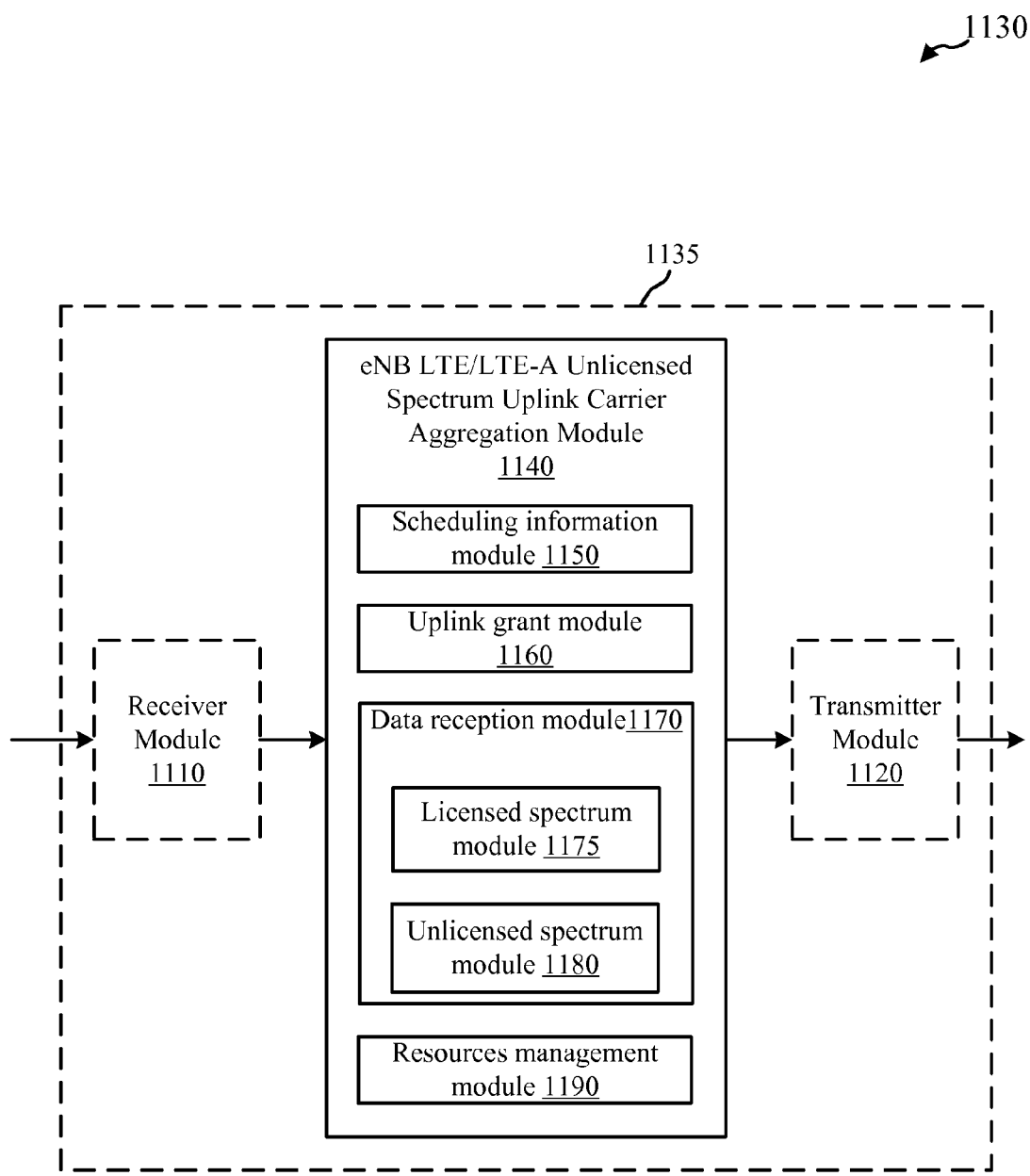

Referring now to FIG. 11B, a block diagram 1130 illustrates a device 1135 for use in wireless communications in accordance with various embodiments. In some embodiments, the device 1135 may be an example of the device 1105 of FIG. 11A. The device 1135 may also be a processor. The device 1135 may include the receiver module 1110, an eNB LTE/LTE-A unlicensed spectrum uplink carrier aggregation module 1140, and/or the transmitter module 1120. Each of these components may be in communication with each other.

The components of the device 1135 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver module 1110 and transmitter module 1120 may be configured similarly to what is described with respect to FIG. 11A. The eNB LTE/LTE-A unlicensed spectrum uplink carrier aggregation module 1140 may be an example of the eNB LTE/LTE-A unlicensed spectrum uplink carrier aggregation module 1115 described with reference to FIG. 11A and may include a scheduling information module 1150, an uplink grant module 1160, a data reception module 1170, and/or a resource management module 1190. Each of these components may be in communication with each other.

In some embodiments, the scheduling information module 1150 may receive scheduling information over a licensed spectrum (e.g., from a UE or device such as one of the UEs 115, 215, 315, 515, and 815 or devices 1015 and 1035 described with reference to FIGS. 1, 2A, 2B, 3, 5, 8, 10A, and/or 10B). In some cases, the scheduling information may include one or more of a scheduling request, a buffer status report, and a power headroom report indicating a power headroom associated with the licensed spectrum and a power headroom associated with unlicensed spectrum (e.g., LTE/LTE-A unlicensed spectrum). The power headroom report may, for each spectrum, indicate a difference between the current transmit power of a UE and a maximum transmit power of the UE. This may enable the eNB to adjust transmit power in response to channel conditions (e.g., channel quality) in the licensed or unlicensed spectrum. In some cases, the power headroom may be biased based on past CCA history.

In some embodiments, the uplink grant module 1160 may transmit an uplink grant over the licensed spectrum (e.g., to the UE). The uplink grant may be based at least in part on the scheduling information, and may be configured to trigger a CCA to determine availability of an unlicensed spectrum prior to a transmission associated with the uplink grant (e.g., a transmission from a UE).

In some embodiments, the data reception module 1170 may receive data using a licensed spectrum module 1175 and/or an unlicensed spectrum module 1180. For example, the unlicensed spectrum module 1180 may receive data over the unlicensed spectrum when a determination is made (e.g., by a UE) that the unlicensed spectrum is available, and the licensed spectrum module 1175 may receive data over the licensed spectrum when a determination is made (e.g., by the UE) that the unlicensed spectrum is not available.

In some cases, receiving data over the unlicensed spectrum may include receiving data transmitted over a first subset of subframes indicated by the uplink grant, and receiving data over the licensed spectrum may include receiving data transmitted over a second subset of subframes indicated by the uplink grant. The first subset of subframes may be less than, equal to, or greater than the second subset of subframes. However, when the unlicensed spectrum has more available bandwidth than the licensed spectrum, it may be useful to make the first subset of subframes greater than the second subset of subframes. In some cases, the first subset of subframes includes the second subset of subframes. The first and second subsets of subframes may start in the same subframe or at different subframes. In the latter case, and by way of example, the first subset of subframes may start in a first subframe, and the second subset of subframes may start in a second subframe, with the second subframe being offset or delayed from the first subframe.

In some embodiments, when data transmitted over the first subset of subframes is received by the device 1135, the resource management module 1190 may release resources in the licensed spectrum associated with the transmission of data over the second subset of subframes.

Figure 12:
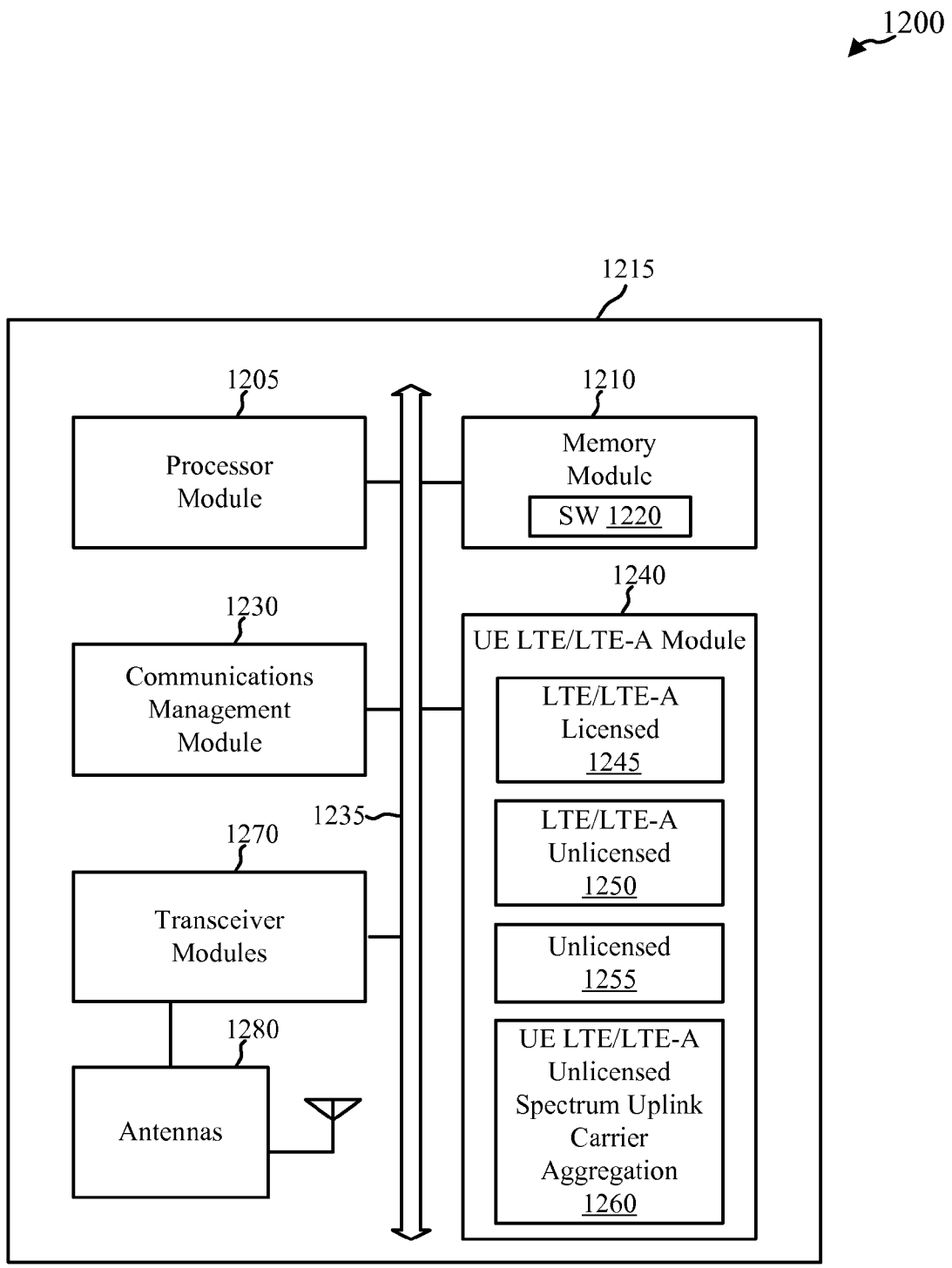
FIG. 12 shows a block diagram that illustrates an example of a UE architecture according to various embodiments.

Turning to FIG. 12, a diagram 1200 is shown that illustrates a UE 1215 configured for operation in LTE/LTE-A unlicensed spectrum. The UE 1215 may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 1215 may have an internal power supply (not shown), such as a small battery, to facilitate mobile operation. The UE 1215 may be an example of one or more of the UEs or devices 115, 215, 315, 515, 815, 1015, and 1035 described with reference to FIGS. 1, 2A, 2B, 3, 5, 8, 10A, and/or 10B. The UE 1215 may be configured to implement at least some of the features and functions described above with respect to FIGS. 1-10B.

The UE 1215 may include a processor module 1205, a memory module 1210, at least one transceiver module (represented by transceiver module(s) 1270), at least one antenna (represented by antenna(s) 1280), and a UE LTE/LTE-A module 1240. Each of these components may be in communication with each other, directly or indirectly, over one or more buses 1235.

The memory module 1210 may include random access memory (RAM) and read-only memory (ROM). The memory module 1210 may store computer-readable, computer-executable software (SW) code 1220 containing instructions that are configured to, when executed, cause the processor module 1205 to perform various functions described herein for using LTE/LTE-A-based communications in licensed and/or unlicensed spectrum, including various aspects related to uplink transmissions using licensed and/or unlicensed spectrum in a carrier aggregation mode of operation. Alternatively, the software code 1220 may not be directly executable by the processor module 1205 but be configured to cause the UE 1215 (e.g., when compiled and executed) to perform various of the functions described herein.

The processor module 1205 may include an intelligent hardware device, e.g., a central processing unit (CPU), a microcontroller, an ASIC, etc. The processor module 1205 may process information received through the transceiver module(s) 1270 and/or information to be sent to the transceiver module(s) 1270 for transmission through the antenna(s) 1280. The processor module 1205 may handle, alone or in connection with the UE LTE/LTE-A module 1240, various aspects of using LTE/LTE-A-based communications in licensed and/or unlicensed spectrum, including various aspects related to uplink transmissions using licensed and/or unlicensed spectrum in a carrier aggregation mode of operation.

The transceiver module(s) 1270 may be configured to communicate bi-directionally with base stations or eNBs. The transceiver module(s) 1270 may be implemented as one or more transmitter modules and one or more separate receiver modules. The transceiver module(s) 1270 may support communications in at least one licensed spectrum (e.g., an LTE/LTE-A spectrum) and in at least one unlicensed spectrum (e.g., an LTE/LTE-A unlicensed spectrum). The transceiver module(s) 1270 may include a modem configured to modulate the packets and provide the modulated packets to the antenna(s) 1280 for transmission, and to demodulate packets received from the antenna(s) 1280. While the UE 1215 may include a single antenna, there may be embodiments in which the UE 1215 may include multiple antennas 1280.

According to the architecture of FIG. 12, the UE 1215 may further include a communications management module 1230. The communications management module 1230 may manage communications with various base stations. The communications management module 1230 may be a component of the UE 1215 in communication with some or all of the other components of the UE 1215 over the one or more buses 1235. Alternatively, functionality of the communications management module 1230 may be implemented as a component of the transceiver module(s) 1270, as a computer program product, and/or as one or more controller elements of the processor module 1205.

The UE LTE/LTE-A module 1240 may be configured to perform and/or control some or all of the functions or aspects described in FIGS. 1-10B related to using LTE/LTE-A-based communications in licensed and/or unlicensed spectrum. For example, the UE LTE/LTE-A module 1240 may be configured to support a supplemental downlink mode, a carrier aggregation mode, and/or a standalone mode. The UE LTE/LTE-A module 1240 may include an LTE/LTE-A licensed module 1245 configured to handle LTE/LTE-A licensed spectrum communications, an LTE/LTE-A unlicensed module 1250 configured to handle LTE/LTE-A unlicensed spectrum communications, and an unlicensed module 1255 configured to handle communications other than LTE/LTE-A unlicensed spectrum communications in unlicensed spectrum. The UE LTE/LTE-A module 1240 may also include a UE LTE/LTE-A unlicensed spectrum uplink carrier aggregation module 1260 configured to perform any of the UE functions described with reference to FIGS. 3, 4, 5, 6A, 6B, 8, 9A, 9B, 10A, and/or 10B. The UE LTE/LTE-A unlicensed spectrum uplink carrier aggregation module 1260 may be an example of similar modules described in FIGS. 10A and 10B. The UE LTE/LTE-A module 1240, or portions of it, may include a processor. Moreover, some or all of the functionality of the UE LTE/LTE-A module 1240 may be performed by the processor module 1205 and/or in connection with the processor module 1205.

Figure 13:
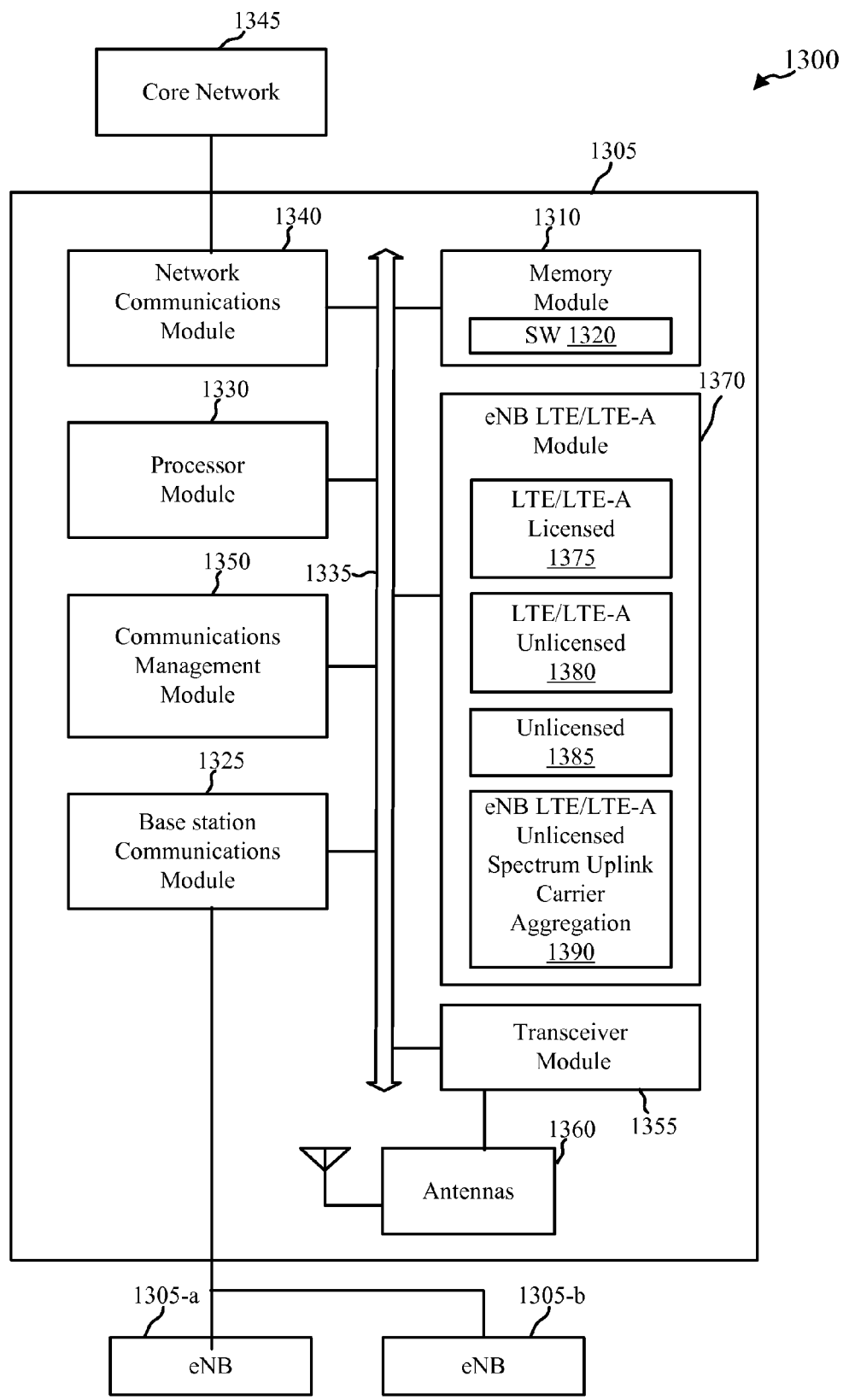
FIG. 13 shows a block diagram that illustrates an example of a base station architecture according to various embodiments.

Turning to FIG. 13, a diagram 1300 is shown that illustrates a base station or eNB 1305 configured for operation in LTE/LTE-A unlicensed spectrum. In some embodiments, the base station 1305 may be an example of one or more of the eNBs or devices 105, 205, 305, 505, 805, 1105, and 1135 described with reference to FIGS. 1, 2A, 2B, 3, 5, 8, 11A, and/or 11B. The base station 1305 may be configured to implement at least some of the features and functions described above with respect to FIGS. 1-9, 11A, and 11B. The base station 1305 may include a processor module 1330, a memory module 1310, at least one transceiver module (represented by transceiver module(s) 1355, at least one antenna (represented by antenna(s) 1360), and an eNB LTE/LTE-A module 1370. The base station 1305 may also include one or both of a base station communications module 1325 and a network communications module 1340. Each of these components may be in communication with each other, directly or indirectly, over one or more buses 1335.

The memory module 1310 may include RAM and ROM. The memory module 1310 may also store computer-readable, computer-executable software (SW) code 1320 containing instructions that are configured to, when executed, cause the processor module 1330 to perform various functions described herein for using LTE-based communications in a licensed and/or unlicensed spectrum, including various aspects related to uplink transmissions using licensed and/or unlicensed spectrum in a carrier aggregation mode of operation. Alternatively, the software code 1320 may not be directly executable by the processor module 1330 but be configured to cause the base station or eNB 1305, e.g., when compiled and executed, to perform various of the functions described herein.

The processor module 1330 may include an intelligent hardware device, e.g., a CPU, a microcontroller, an ASIC, etc. The processor module 1330 may process information received through the transceiver module(s) 1355, the base station communications module 1325, and/or the network communications module 1340. The processor module 1330 may also process information to be sent to the transceiver module(s) 1355 for transmission through the antenna(s) 1360, to the base station communications module 1325 for transmission to one or more other base stations or eNBs 1305-*a* and 1305-*b*, and/or to the network communications module 1340 for transmission to a core network 1345, which may be an example of the core network 130 of FIG. 1. The processor module 1330 may handle, alone or in connection with the eNB LTE/LTE-A module 1370, various aspects of using LTE/LTE-A-based communications in licensed and/or unlicensed spectrum, including various aspects related to uplink transmissions using licensed and/or unlicensed spectrum in a carrier aggregation mode of operation.

The transceiver module(s) 1355 may include a modem configured to modulate the packets and provide the modulated packets to the antennas 1360 for transmission, and to demodulate packets received from the antenna(s) 1360. The transceiver module(s) 1355 may be implemented as one or more transmitter modules and one or more separate receiver modules. The transceiver module(s) 1355 may support communications in at least one licensed spectrum (e.g., an LTE/LTE-A licensed spectrum) and in at least one unlicensed spectrum (e.g., an LTE/LTE-A unlicensed spectrum). The transceiver module(s) 1355 may be configured to communicate bi-directionally, via the antennas 1360, with one or more of the UEs or devices 115, 215, 315, 515, 815, 1015, 1035, and 1215 described with reference to FIGS. 1, 2A, 2B, 3, 5, 8, 10A, 10B, and/or 12, for example. The base station 1305 may typically include multiple antennas 1360 (e.g., an antenna array). The base station 1305 may communicate with the core network 1345 through the network communications module 1340. The base station 1305 may communicate with other base stations, such as the eNBs 1305-*a* and 1305-*b*, using the base station communications module 1325.

According to the architecture of FIG. 13, the base station 1305 may further include a communications management module 1350. The communications management module 1350 may manage communications with other base stations and/or devices. The communications management module 1350 may be in communication with some or all of the other components of the base station 1305 via the bus or buses 1335. Alternatively, functionality of the communications management module 1350 may be implemented as a component of the transceiver module(s) 1355, as a computer program product, and/or as one or more controller elements of the processor module 1330.

The eNB LTE/LTE-A module 1370 may be configured to perform and/or control some or all of the functions or aspects described with reference to FIGS. 1-9B, 11A, and 11B related to using LTE/LTE-A-based communications in licensed and/or unlicensed spectrum. For example, the eNB LTE/LTE-A module 1370 may be configured to support a supplemental downlink mode, a carrier aggregation mode, and/or a standalone mode. The eNB LTE/LTE-A module 1370 may include an LTE/LTE-A licensed module 1375 configured to handle LTE/LTE-A licensed spectrum communications, an LTE/LTE-A unlicensed module 1380 configured to handle LTE/LTE-A unlicensed spectrum communications, and an unlicensed module 1385 configured to handle communications other than LTE/LTE-A communications in unlicensed spectrum. The eNB LTE/LTE-A module 1370 may also include an eNB LTE/LTE-A unlicensed spectrum uplink carrier aggregation module 1390 configured to perform, for example, any of the eNB functions described with reference to FIGS. 3, 4, 5, 6A, 6B, 8, 9A, 9B, 11A, and/or 11B. The eNB LTE/LTE-A unlicensed spectrum uplink carrier aggregation module 1390 may be an example of similar modules described in FIGS. 11A and 11B. The eNB LTE/LTE-A module 1370, or portions of it, may include a processor. Moreover, some or all of the functionality of the eNB LTE/LTE-A module 1370 may be performed by the processor module 1330 and/or in connection with the processor module 1330.

Figure 14:
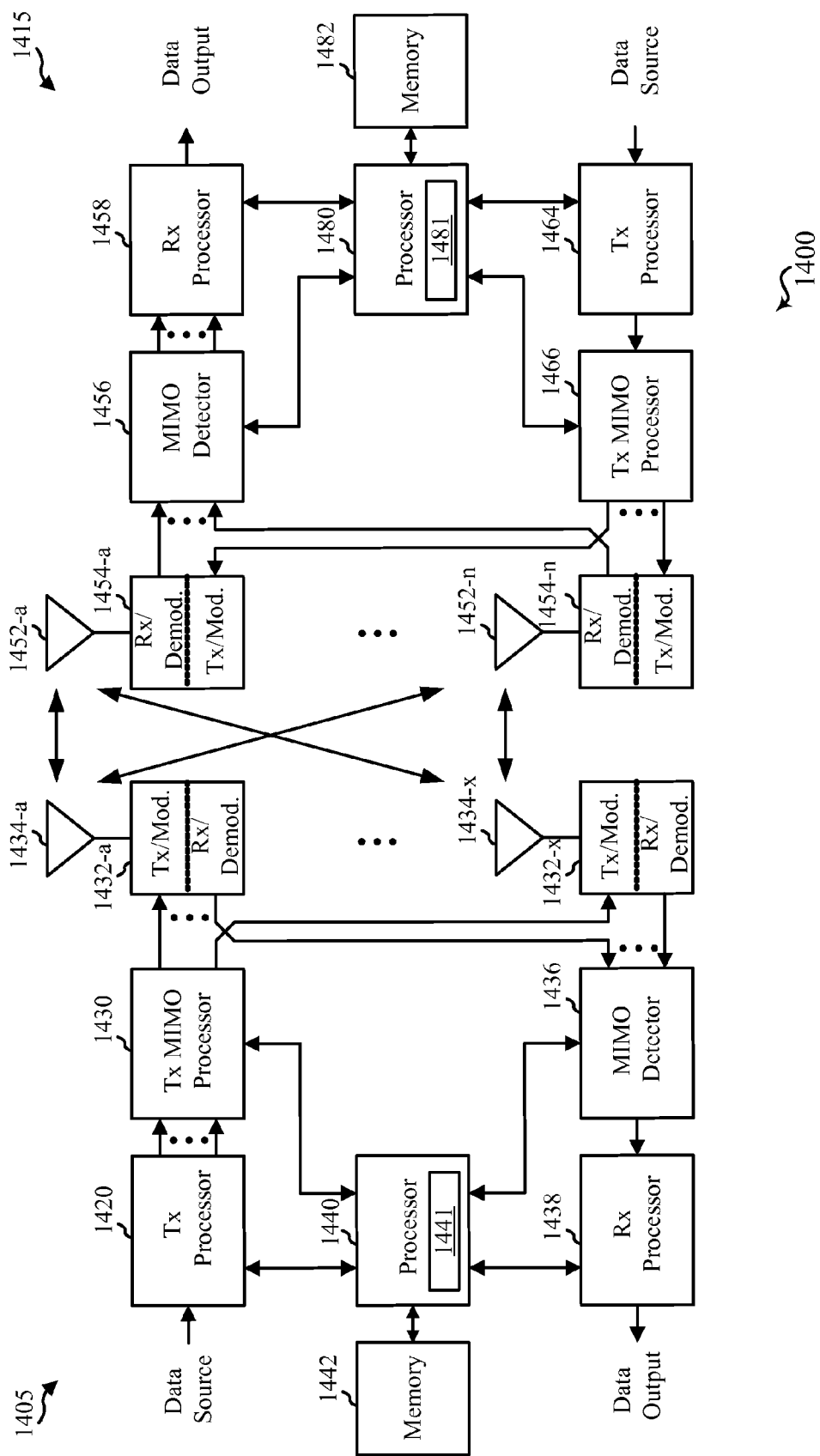
FIG. 14 shows a block diagram that illustrates an example of a multiple-input multiple-output (MIMO) communications system according to various embodiments.

Turning next to FIG. 14, a block diagram of a multiple-input multiple-output (MIMO) communication system 1400 is shown including a base station 1405 (e.g., an eNB) and a UE 1415. The base station 1405 and the UE 1415 may support LTE/LTE-A-based communications using licensed and/or unlicensed spectrum (e.g., LTE/LTE-A licensed spectrum and/or LTE/LTE-A unlicensed spectrum). Moreover, the base station 1405 and the UE 1415 may support different schemes for uplink transmissions related to a carrier aggregation mode of operation. The base station 1405 may be an example of one or more of the base stations or devices 105, 205, 305, 505, 805, 1105, 1135, and 1305 described with reference to FIGS. 1, 2A, 2B, 3, 5, 8, 11A, 11B, and/or 13, while the UE 1415 may be an example of one or more of the UEs or devices 115, 215, 315, 515, 815, 1015, 1035, and 1215 described with reference to FIGS. 1, 2A, 2B, 3, 5, 8, 10A, 10B, and/or 12. The system 1400 may illustrate aspects of the wireless communications system 100 described with reference to FIGS. 1, 2A, and/or 2B.

The base station 1405 may be equipped with antennas 1434-$a$ through 1434-$x$, and the UE 1415 may be equipped with antennas 1452-$a$ through 1452-$n$. In the system 1400, the base station 1405 may be able to send data over multiple communication links at the same time. Each communication link may be called a "layer" and the "rank" of the communication link may indicate the number of layers used for communication. For example, in a 2×2 MIMO system where base station 1405 transmits two "layers," the rank of the communication link between the base station 1405 and the UE 1415 may be two.

At the base station 1405, a transmit (Tx) processor 1420 may receive data from a data source. The transmit processor 1420 may process the data. The transmit processor 1420 may also generate reference symbols and/or a cell-specific reference signal. A transmit (Tx) MIMO processor 1430 may perform spatial processing (e.g., precoding) on data symbols, control symbols, and/or reference symbols, if applicable, and may provide output symbol streams to the transmit modulators 1432-$a$ through 1432-$x$. Each modulator 1432 may process a respective output symbol stream (e.g., for OFDM, etc.) to obtain an output sample stream. Each modulator 1432 may further process (e.g., convert to analog, amplify, filter, and upconvert) the output sample stream to obtain a downlink (DL) signal. In one example, DL signals from modulators 1432-$a$ through 1432-$x$ may be transmitted via the antennas 1434-$a$ through 1434-$x$, respectively.

At the UE 1415, the antennas 1452-$a$ through 1452-$n$ may receive the DL signals from the base station 1405 and may provide the received signals to the demodulators 1454-$a$ through 1454-$n$, respectively. Each demodulator 1454 may condition (e.g., filter, amplify, downconvert, and digitize) a respective received signal to obtain input samples. Each demodulator 1454 may further process the input samples (e.g., for OFDM, etc.) to obtain received symbols. A MIMO detector 1456 may obtain received symbols from all the demodulators 1454-$a$ through 1454-$n$, perform MIMO detection on the received symbols if applicable, and provide detected symbols. A receive (Rx) processor 1458 may process (e.g., demodulate, deinterleave, and decode) the detected symbols, providing decoded data for the UE 515 to a data output, and provide decoded control information to a processor 1480, or memory 1482. The processor 1480 may include a module or function 1481 that may perform various functions related to using LTE/LTE-A-based communications in licensed and/or unlicensed spectrum. For example, the module or function 1481 may perform some or all of the functions described above with reference to the FIGS. 1-10B and 12.

On the uplink (UL), at the UE 1415, a transmit (Tx) processor 1464 may receive and process data from a data source. The transmit processor 1464 may also generate reference symbols for a reference signal. The symbols from the transmit processor 1464 may be precoded by a transmit (Tx) MIMO processor 1466 if applicable, further processed by the demodulators 1454-$a$ through 1454-$n$ (e.g., for SC-FDMA, etc.), and be transmitted to the base station 1405 in accordance with the transmission parameters received from the base station 1405. At the base station 1405, the UL signals from the UE 1415 may be received by the antennas 1434, processed by the demodulators 1432, detected by a MIMO detector 1436 if applicable, and further processed by a receive processor. The receive (Rx) processor 1438 may provide decoded data to a data output and to the processor 1440. The processor 1440 may include a module or function 1441 that may perform various aspects related to using LTE/LTE-A-based communications in licensed and/or unlicensed spectrum. For example, the module or function 1441 may perform some or all of the functions described above with reference to FIGS. 1-9B, 11A, 11B, and 13.

The components of the base station 1405 may, individually or collectively, be implemented with one or more ASICs adapted to perform some or all of the applicable functions in hardware. Each of the noted modules may be a means for performing one or more functions related to operation of the system 1400. Similarly, the components of the UE 1415 may, individually or collectively, be implemented with one or more ASICs adapted to perform some or all of the applicable functions in hardware. Each of the noted components may be a means for performing one or more functions related to operation of the system 1400.

Figure 15:
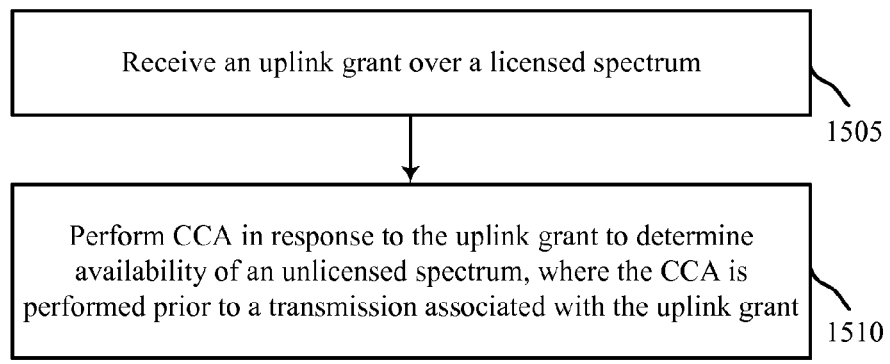
FIGS. 15-19 are flowcharts of example of methods for wireless communications using licensed and unlicensed spectrum (e.g., at a UE) according to various embodiments.

FIG. 15 is a flow chart illustrating an example of a method 1500 for wireless communications. For clarity, the method 1500 is described below with reference to one of the eNBs, UEs, or devices shown in FIGS. 1, 2A, 2B, 3, 5, 8, 10A, 10B, 11A, 11B, 12, 13, and/or 14. In one embodiment, one of the UEs may execute one or more sets of codes to control the functional elements of the UE to perform the functions described below.

At block 1505, an uplink grant may be received over a licensed spectrum. In some embodiments, the uplink grant may be received by a UE (e.g., UE 115) from an eNB (e.g., eNB 105). In some embodiments, the licensed spectrum may include an LTE/LTE-A licensed spectrum. The operation at block 1505 may in some cases be performed by the UE LTE/LTE-A unlicensed spectrum uplink carrier aggregation modules 1010, 1040, or 1260 described with reference to FIG. 10A, 10B or 12, or the uplink grant module 1050 described with reference to FIG. 10B, or the module or function 1481 described with reference to FIG. 14.

At block 1510, a CCA may be performed in response to the uplink grant to determine availability of an unlicensed spectrum. The CCA may be performed prior to a transmission associated with the uplink grant (e.g., prior to a UL transmission of a UE). In some embodiments, the unlicensed spectrum may include LTE/LTE-A unlicensed spectrum. The operation at block 1510 may in some cases be performed by the UE LTE/LTE-A unlicensed spectrum uplink carrier aggregation modules 1010, 1040, and 1260 described with reference to FIG. 10A, 10B or 12, or the CCA module 1060 described with reference to FIG. 10B, or the module or function 1481 described with reference to FIG. 14.

In some embodiments of the method 1500, an indication of a maximum uplink data rate over the unlicensed spectrum for a set of PRBs is received over the licensed spectrum. The method includes performing CCA in a subframe in response to the indication, where the CCA is performed to determine availability of a component carrier for the set of PRBs in the unlicensed spectrum to transmit data in a next subframe. The same set of PRBs may be assigned to each of multiple users on the uplink of the unlicensed spectrum. Data transmitted from the multiple users (e.g., multiple UEs 115) that are assigned the same set of PRBs, where the data occupies those PRBs, may be decoded (e.g., by an eNB 105) using successive interference cancellation (SIC). The multiple users assigned the same set of PRBs may be assigned orthogonal demodulation reference signals (DM-RS) sequences. Each of the users assigned the same set of PRBs may also be assigned a distinct scrambling code. When a determination is made that the component carrier for the set of PRBs in the unlicensed spectrum is available (e.g., successful CCA), the method 1500 may include transmitting uplink reference signals, control signals and/or data signals, using one or both of the orthogonal DM-RS sequence and distinct scrambling code assigned to the user. Uplink transmission may also include an additional signal indicating one or more of a transmit format indication (TFI) based on the selection of transmit format for uplink data, an HARQ-ID, and an HARQ RV.

Thus, the method 1500 may provide for wireless communications. It should be noted that the method 1500 is just one implementation and that the operations of the method 1500 may be rearranged or otherwise modified such that other implementations are possible.

Figure 16:
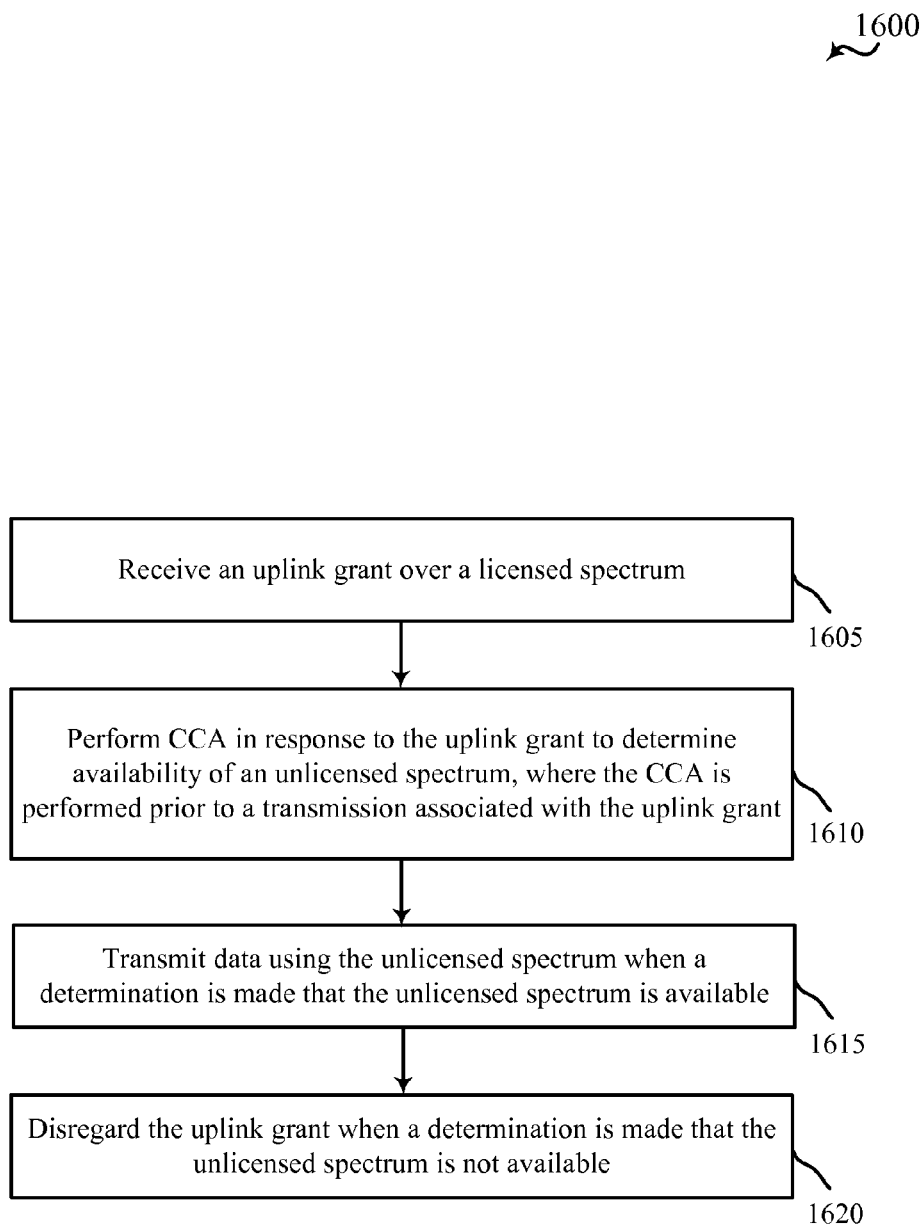

FIG. 16 is a flow chart illustrating another example of a method 1600 for wireless communications. For clarity, the method 1600 is described below with reference to one of the eNBs, UEs, or devices shown in FIGS. 1, 2A, 2B, 3, 5, 8, 10A, 10B, 11A, 11B, 12, 13, and/or 14. In one embodiment, one of the UEs may execute one or more sets of codes to control the functional elements of the UE to perform the functions described below.

At block 1605, an uplink grant may be received over a licensed spectrum. In some embodiments, the uplink grant may be received by a UE (e.g., UE 115) from an eNB (e.g., eNB 105). In some embodiments, the licensed spectrum may include LTE/LTE-A licensed spectrum. The operation at block 1605 may in some cases be performed by the UE LTE/LTE-A unlicensed spectrum uplink carrier aggregation modules 1010, 1040, or 1260 described with reference to FIG. 10A, 10B or 12, or the uplink grant module 1050 described with reference to FIG. 10B, or the module or function 1481 described with reference to FIG. 14.

At block 1610, a CCA may be performed in response to the uplink grant to determine availability of an unlicensed spectrum. The CCA may be performed prior to a transmission associated with the uplink grant (e.g., prior to a UL transmission of a UE). In some embodiments, the unlicensed spectrum may include LTE/LTE-A unlicensed spectrum. The operation at block 1610 may in some cases be performed by the UE LTE/LTE-A unlicensed spectrum uplink carrier aggregation modules 1010, 1040, and 1260 described with reference to FIG. 10A, 10B or 12, or the CCA module 1060 described with reference to FIG. 10B, or the module or function 1481 described with reference to FIG. 14.

At block 1615, data may be transmitted using the unlicensed spectrum when a determination is made that the unlicensed spectrum is available (e.g., data may be transmitted from a UE to an eNB).

At block 1620, the uplink grant may be disregarded when a determination is made that the unlicensed spectrum is not available.

The operation at block 1615 and/or 1620 may in some cases be performed by the UE LTE/LTE-A unlicensed spectrum uplink carrier aggregation modules 1010. 1040, and 1260 described with reference to FIG. 10A, 10B or 12, or the data transmission module 1070 described with reference to FIG. 10B, or the module or function 1481 described with reference to FIG. 14.

An example of an implementation of the method 1600 is described with reference to FIG. 4.

Thus, the method 1600 may provide for wireless communications. It should be noted that the method 1600 is just one implementation and that the operations of the method 1600 may be rearranged or otherwise modified such that other implementations are possible.

Figure 17:
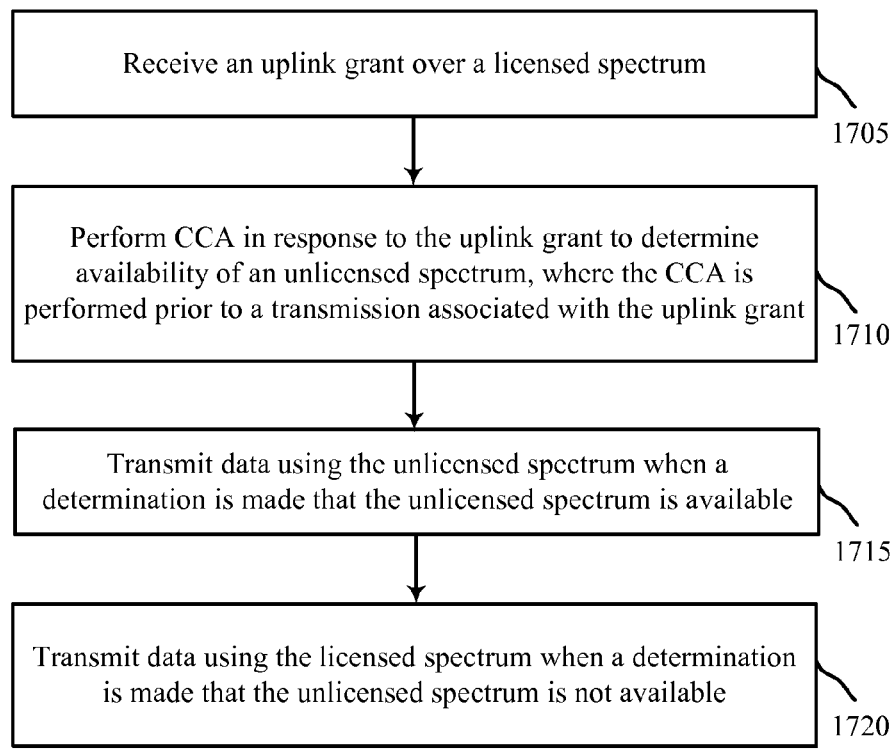

FIG. 17 is a flow chart illustrating yet another example of a method 1700 for wireless communications. For clarity, the method 1700 is described below with reference to one of the eNBs, UEs, or devices shown in FIGS. 1, 2A, 2B, 3, 5, 8, 10A, 10B, 11A, 11B, 12, 13, and/or 14. In one embodiment, one of the UEs may execute one or more sets of codes to control the functional elements of the UE to perform the functions described below.

At block 1705, an uplink grant may be received over a licensed spectrum. In some embodiments, the uplink grant may be received by a UE (e.g., UE 115) from an eNB (e.g., eNB 105). In some embodiments, the licensed spectrum may include LTE/LTE-A licensed spectrum. The operation at block 1705 may in some cases be performed by the UE LTE/LTE-A unlicensed spectrum uplink carrier aggregation modules 1010, 1040, or 1260 described with reference to FIG. 10A, 10B or 12, or the uplink grant module 1050 described with reference to FIG. 10B, or the module or function 1481 described with reference to FIG. 14.

At block 1710, a CCA may be performed in response to the uplink grant to determine availability of an unlicensed spectrum. The CCA may be performed prior to a transmission associated with the uplink grant (e.g., prior to a UL transmission of a UE 115). In some embodiments, the unlicensed spectrum may include LTE/LTE-A unlicensed spectrum. The operation at block 1710 may in some cases be performed by the UE LTE/LTE-A unlicensed spectrum uplink carrier aggregation modules 1010, 1040, or 1260 described with reference to FIG. 10A, 10B, or 12, or the CCA module 1060 described with reference to FIG. 10B, or the module or function 1481 described with reference to FIG. 14.

At block 1715, data may be transmitted using the unlicensed spectrum when a determination is made that the unlicensed spectrum is available (e.g., data may be transmitted from the UE to the eNB).

At block 1720, data may be transmitted using the licensed spectrum when a determination is made that the unlicensed spectrum is not available.

In some embodiments, transmitting data using the unlicensed spectrum may include transmitting data during a first subset of subframes indicated by the uplink grant, and transmitting data using the licensed spectrum may include transmitting data during a second subset of subframes indicated by the uplink grant. The first subset of subframes may be less than, equal to, or greater than the second subset of subframes. However, when the unlicensed spectrum has more available bandwidth than the licensed spectrum, it may be useful to make the first subset of subframes greater than the second subset of subframes. In some cases, the first subset of subframes includes the second subset of subframes. The first and second subset of subframes may start in the same subframe or different subframes. In the latter case, and by way of example, the first subset of subframes may start in a first subframe, and the second subset of subframes may start in a second subframe, with the second subframe being offset or delayed from the first subframe. Each of the first and second subsets of subframes may be specified in terms of one or more of a number of subframes in the subset, a time interval between successive subframes in the subset, and an initial offset between a time of reception of the uplink grant and a first occurrence of a subframe in the subset.

The operation at block 1715 and/or 1720 may in some cases be performed by the UE LTE/LTE-A unlicensed spectrum uplink carrier aggregation modules 1010, 1040, or 1260 described with reference to FIG. 10A, 10B or 12, or the data transmission module 1070 described with reference to FIG. 10B, or the module or function 1481 described with reference to FIG. 14.

Example implementations of the method 1700 are described with reference to FIGS. 6A and 6B.

Thus, the method 1700 may provide for wireless communications. It should be noted that the method 1700 is just one implementation and that the operations of the method 1700 may be rearranged or otherwise modified such that other implementations are possible.

Figure 18:
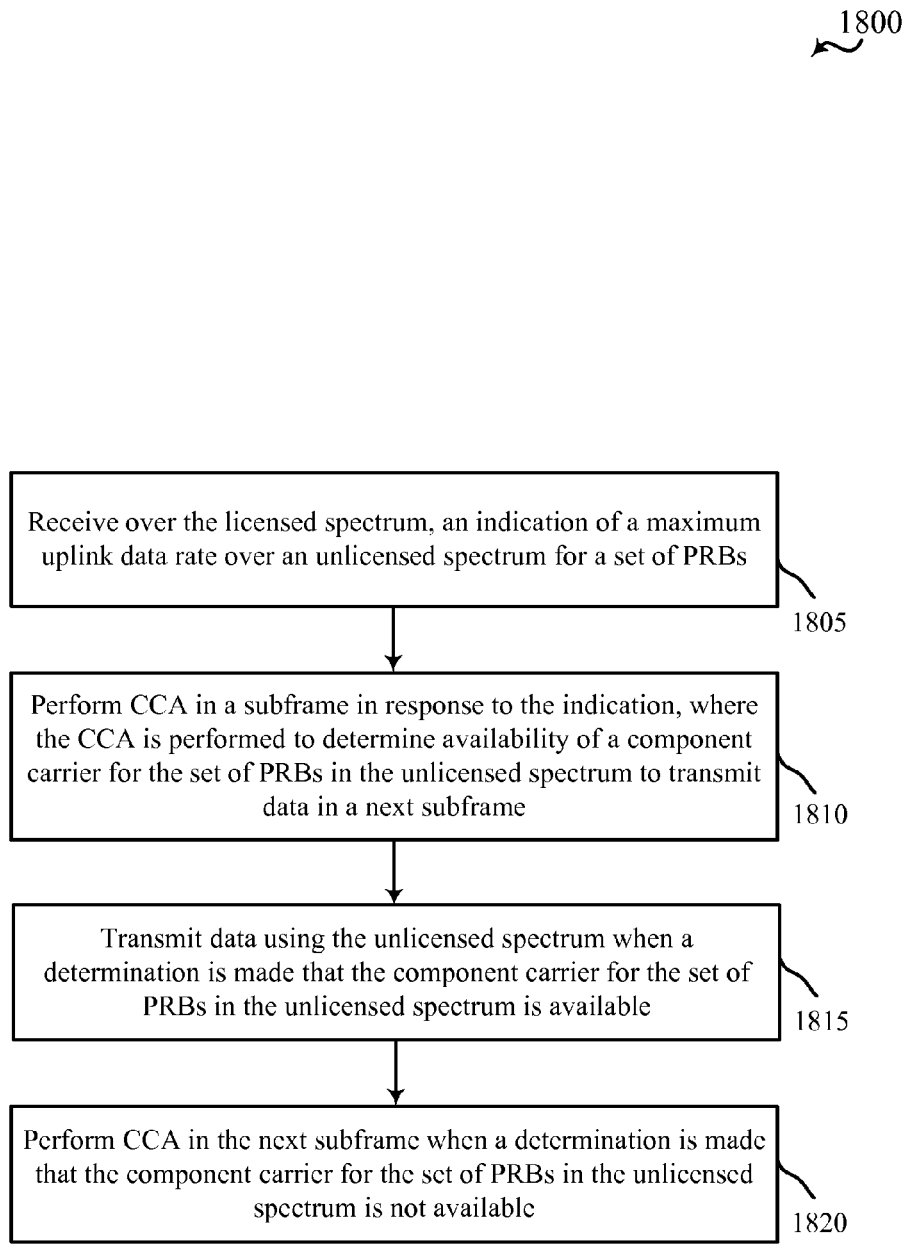

FIG. 18 is a flow chart illustrating another example of a method 1800 for wireless communications. For clarity, the method 1800 is described below with reference to one of the eNBs, UEs, or devices shown in FIGS. 1, 2A, 2B, 3, 5, 8, 10A, 10B, 11A, 11B, 12, 13, and/or 14. In one embodiment, one of the UEs may execute one or more sets of codes to control the functional elements of the UE to perform the functions described below.

At block 1805, an uplink grant may be received over a licensed spectrum. The uplink grant may take the form of, or include, or may be provided in addition to, an indication of a maximum uplink data rate over an unlicensed spectrum for a set of PRBs. In some embodiments, the uplink grant may be received by a UE (e.g., UE 115) from an eNB (e.g., eNB 115). In some embodiments, the licensed spectrum may include LTE/LTE-A spectrum, and the unlicensed spectrum may include LTE/LTE-A unlicensed licensed spectrum. The operation at block 1805 may in some cases be performed by the UE LTE/LTE-A unlicensed spectrum uplink carrier aggregation modules 1010, 1040, or 1260 described with reference to FIG. 10A, 10B or 12, or the uplink grant module 1050 described with reference to FIG. 10B, or the module or function 1481 described with reference to FIG. 14.

At block 1810, a CCA may be performed in a subframe in response to the indication. The CCA may be performed to determine availability of a component carrier for the set of PRBs in the unlicensed spectrum to transmit data in a next subframe. The operation at block 1810 may in some cases be performed by the UE LTE/LTE-A unlicensed spectrum uplink carrier aggregation module 1010 described with reference to FIG. 10A or 12, or the CCA module 1060 described with reference to FIG. 10B, or the module or function 1481 described with reference to FIG. 14.

At block 1815, data may be transmitted using the unlicensed spectrum when a determination is made that the component carrier for the set of PRBs in the unlicensed spectrum is available (e.g., data may be transmitted from the UE 115 to the eNB 105). The operation at block 1815 may in some cases be performed by the UE LTE/LTE-A unlicensed spectrum uplink carrier aggregation modules 1010, 1040, or 1260 described with reference to FIG. 10A, 10B, or 12, or the data transmission module 1070 described with reference to FIG. 10B, or the module or function 1481 described with reference to FIG. 14.

At block 1820, a CCA may be performed in the next subframe when a determination is made that the component carrier for the set of PRBs in the unlicensed spectrum is not available. The operation at block 1820 may in some cases be performed by the UE LTE/LTE-A unlicensed spectrum uplink carrier aggregation modules 1010, 1040, or 1260 described with reference to FIG. 10A, 10B, or 12, or the CCA module 1060 described with reference to FIG. 10B, or the module or function 1481 described with reference to FIG. 14.

An example of an implementation of the method 1800 is described with reference to FIG. 9A.

Thus, the method 1800 may provide for wireless communications. It should be noted that the method 1800 is just one implementation and that the operations of the method 1800 may be rearranged or otherwise modified such that other implementations are possible.

Figure 19:
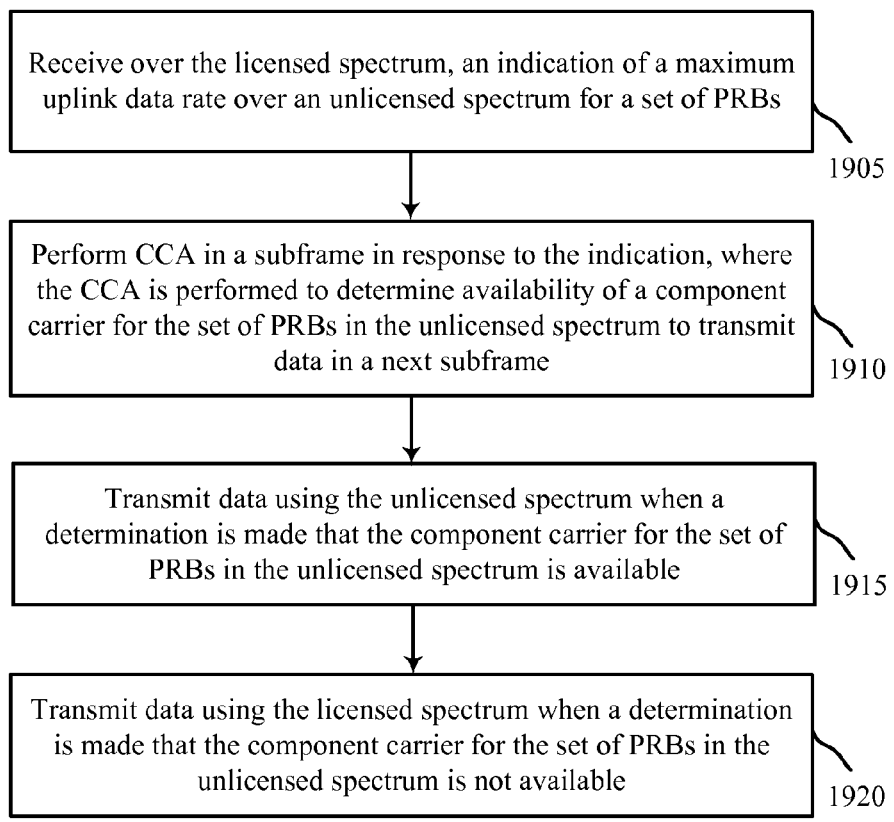

FIG. 19 is a flow chart illustrating another example of a method 1900 for wireless communications. For clarity, the method 1900 is described below with reference to one of the eNBs, UEs, or devices shown in FIGS. 1, 2A, 2B, 3, 5, 8, 10A, 10B, 11A, 11B, 12, 13, and/or 14. In one embodiment, one of the UEs may execute one or more sets of codes to control the functional elements of the UE to perform the functions described below.

At block 1905, an uplink grant may be received over a licensed spectrum. The uplink grant may take the form of, or include, an indication of a maximum uplink data rate over an unlicensed spectrum for a set of PRBs. In some embodiments, the uplink grant may be received by a UE (e.g., UE 115) from an eNB (e.g., eNB 105). In some embodiments, the licensed spectrum may include LTE/LTE-A licensed spectrum, and the unlicensed spectrum may include LTE/LTE-A unlicensed spectrum. The operation at block 1905 may in some cases be performed by the UE LTE/LTE-A unlicensed spectrum uplink carrier aggregation modules 1010, 1040, or 1260 described with reference to FIG. 10A, 10B or 12, or the uplink grant module 1050 described with reference to FIG. 10B, or the module or function 1481 described with reference to FIG. 14.

At block 1910, a CCA may be performed in a subframe in response to the indication. The CCA may be performed to determine availability of a component carrier for the set of PRBs in the unlicensed spectrum to transmit data in a next subframe. The operation at block 1910 may in some cases be performed by the UE LTE/LTE-A unlicensed spectrum uplink carrier aggregation modules 1010, 1040, or 1260 described with reference to FIG. 10A, 10B or 12, or the CCA module 1060 described with reference to FIG. 10B, or the module or function 1481 described with reference to FIG. 14.

At block 1915, data may be transmitted using the unlicensed spectrum when a determination is made that the component carrier for the set of PRBs in the unlicensed spectrum is available (e.g., data may be transmitted from a UE to an eNB).

At block 1920, data may be transmitted using the licensed spectrum when a determination is made that the component carrier for the set of PRBs in the unlicensed spectrum is not available.

The operation at block 1915 and/or 1920 may in some cases be performed by the UE LTE/LTE-A unlicensed spectrum uplink carrier aggregation modules 1010, 1040, or 1260 described with reference to FIG. 10A, 10B or 12, or the data transmission module 1070 described with reference to FIG. 10B, or the module or function 1481 described with reference to FIG. 14.

An example of an implementation of the method 1900 is described with reference to FIG. 9B.

Thus, the method 1900 may provide for wireless communications. It should be noted that the method 1900 is just one implementation and that the operations of the method 1900 may be rearranged or otherwise modified such that other implementations are possible.

Figure 20:
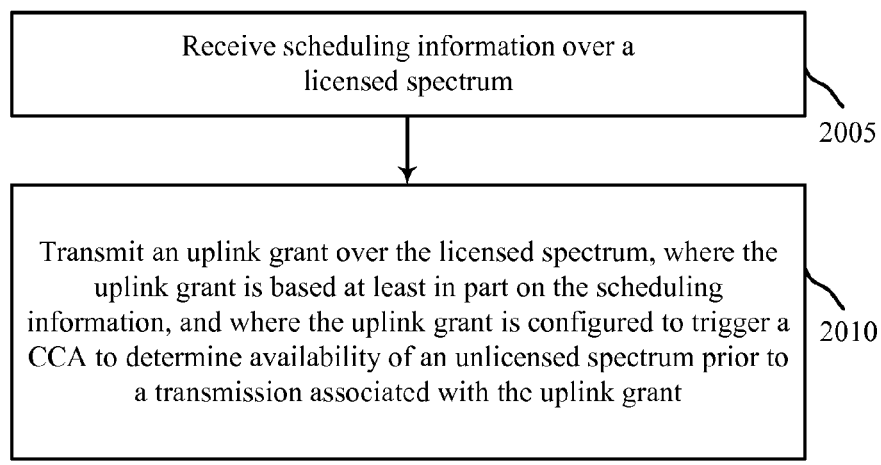
FIG. 20 is a flowchart of an example of a method for wireless communications using licensed and unlicensed spectrum (e.g., at an eNB) according to various embodiments.

FIG. 20 is a flow chart illustrating an example of a method 2000 for wireless communications. For clarity, the method 2000 is described below with reference to one of the eNBs, UEs, or devices shown in FIGS. 1, 2A, 2B, 3, 5, 8, 10A, 10B, 11A, 11B, 12, 13, and/or 14. In one embodiment, one of the eNBs may execute one or more sets of codes to control the functional elements of the eNB to perform the functions described below.

At block 2005, scheduling information may be received over a licensed spectrum. In some embodiments, the scheduling information may be received by an eNB 105 from a UE 115. In some embodiments, the licensed spectrum may include LTE/LTE-A licensed spectrum. The operation at block 2005 may in some cases be performed by the eNB LTE/LTE-A unlicensed spectrum uplink carrier aggregation modules 1115, 1140, or 1390 described with reference to FIG. 11A, 11B or 13, or the scheduling information module 1150 and/or the data reception module 1170 described with reference to FIG. 11B, or the module or function 1441 described with reference to FIG. 14.

At block 2010, an uplink grant may be transmitted over the licensed spectrum. The uplink grant may be based at least in part on the scheduling information, and may be configured to trigger a CCA to determine availability of an unlicensed spectrum prior to a transmission associated with the uplink grant (e.g., prior to a UL transmission of a UE). In some embodiments, the unlicensed spectrum may include LTE/LTE-A unlicensed spectrum. The operation at block 2010 may in some cases be performed by the eNB LTE/LTE-A unlicensed spectrum uplink carrier aggregation modules 1115, 1140, or 1390 described with reference to FIG. 11A, 11B or 13, or the uplink grant module 1160 described with reference to FIG. 11B, or the module or function 1441 described with reference to FIG. 14.

In some embodiments of the method 2000, a same set of PRBs may be assigned (e.g., by an eNB 105) to multiple users (e.g., UEs 115) on the uplink of the unlicensed spectrum based at least in part on the transmitted uplink grant. The method 2000 includes receiving uplink data from the multiple users using the assigned PRBs and decoding (e.g., at the eNB 105) the uplink data using SIC. The method 2000 may include assigning one or both of an orthogonal DM-RS sequence and a distinct scrambling code to each of the multiple users for transmission of the uplink data. The method 2000 may also include receiving from each of the multiple users, along with the uplink data, a signal indicating one or more of a transmit format selection (e.g., through TFI), an HARQ-ID, and an HARQ RV. The received signal may be processed based on the orthogonal DM-RS sequence and/or scrambling code assigned to the user.

Thus, the method 2000 may provide for wireless communications. It should be noted that the method 2000 is just one implementation and that the operations of the method 2000 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   receiving, at a user equipment (UE) capable of transmitting over both a licensed spectrum and an unlicensed spectrum, an uplink grant over the licensed spectrum, wherein the uplink grant indicates that a first set of resources on the unlicensed spectrum and a second set of fallback resources on the licensed spectrum are reserved for the UE;
   performing, by the UE, a clear channel assessment (CCA) in response to the uplink grant to determine an availability of the first set of resources on the unlicensed spectrum, the CCA being performed prior to an occurrence of the first set of resources and the second set of fallback resources;
   performing, by the UE, a transmission using the first set of resources on the unlicensed spectrum instead of the second set of fallback resources on the licensed spectrum when the performed CCA indicates that the first set of resources is available; and
   performing, by the UE, a fallback transmission using the second set of fallback resources on the licensed spectrum instead of the first set of resources on the unlicensed spectrum when the performed CCA indicates that the first set of resources is not available.

2. The method of claim 1, further comprising:
   transmitting signaling using the licensed spectrum indicating unavailability of the unlicensed spectrum when the CCA indicates that the first set of resources is not available.

3. The method of claim 1, wherein each of the first set of resources and the second set of resources is specified in terms of one or more of:
   a number of subframes, a time interval between successive subframes, and an initial offset between a time of reception of the uplink grant and a first occurrence of a subframe in the first set of resources subset or the second set of fallback resources.

4. The method of claim 1, wherein the first set of resources overlap in time with the second set of fallback resources.

5. The method of claim 1, wherein the first set of resources and the second set of resources start in a same subframe.

6. The method of claim 1, wherein:
   the first set of resources starts in a first subframe; and
   the second set of resources starts in a second subframe delayed from the first subframe.

7. The method of claim 1, wherein:
   the uplink grant comprises a prioritized sequence of uplink grants, each uplink grant in the prioritized sequence of uplink grants being associated with a respective component carrier; and
   wherein performing the CCA comprises performing one or more CCAs on one or more component carriers of the respective component carriers associated with the prioritized sequence of uplink grants to determine an availability of the one or more respective component carriers, the method further comprising:
   identifying a component carrier of the one or more component carriers as available based at least in part on the one or more CCAs.

8. The method of claim 7, wherein the identifying comprises identifying a plurality of component carriers of the one or more component carriers as available, the plurality of component carriers corresponding to a subset of uplink grants in the prioritized sequence of uplink grants, and
   wherein the identified component carrier is selected from the plurality of component carriers and corresponds to a second uplink grant with a highest priority in the subset of uplink grants.

9. The method of claim 7, wherein each uplink grant in the prioritized sequence of uplink grants further comprises one or more of:
   a set of physical resource blocks (PRBs) for the respective component carrier; and
   a subset of subframes for which the uplink grant is applicable.

10. The method of claim 9, wherein the subset of subframes is specified in terms of one or more of:
    a number of subframes in the subset of subframes, a time interval between successive subframes in the subset of subframes, and an initial offset between a time of reception of the uplink grant and a first occurrence of a subframe in the subset of subframes.

11. The method of claim 7, wherein a parameter in a second uplink grant in the prioritized sequence of uplink grants is determined implicitly from a respective parameter in another uplink grant in the prioritized sequence of uplink grants.

12. The method of claim 7, wherein an implicit relationship between parameters in different uplink grants of the prioritized sequence is specified at least in part through radio resource control (RRC) signaling.

13. The method of claim 1, further comprising:
receiving over the licensed spectrum, an indication of a maximum uplink data rate over the unlicensed spectrum for a set of PRBs; and
performing the CCA in a subframe in response to the indication, the CCA being performed to determine availability of a component carrier for the set of PRBs in the unlicensed spectrum for performing the transmission in a next subframe.

14. The method of claim 13, further comprising:
performing the transmission using the unlicensed spectrum based at least in part on the uplink grant when the CCA indicates that the component carrier for the set of PRBs in the unlicensed spectrum is available; and
performing the CCA in the next subframe based at least in part on the uplink grant when the CCA indicates that the component carrier for the set of PRBs in the unlicensed spectrum is not available.

15. The method of claim 13, further comprising:
performing the transmission using the unlicensed spectrum based at least in part on the uplink grant when the CCA indicates that the component carrier for the set of PRBs in the unlicensed spectrum is available; and
performing the transmission using the licensed spectrum based at least in part on the uplink grant when the CCA indicates that the component carrier for the set of PRBs in the unlicensed spectrum is not available.

16. The method of claim 13, wherein the same set of PRBs are assigned to each of a plurality of users on an uplink of the unlicensed spectrum.

17. The method of claim 16, wherein data transmitted from the plurality of users assigned the same set of PRBs is decoded using successive interference cancellation (SIC).

18. The method of claim 16, wherein the plurality of users assigned the same set of PRBs are assigned orthogonal demodulation reference signals (DM-RS) sequences.

19. The method of claim 18, wherein each of the plurality of users is assigned a distinct scrambling code.

20. The method of claim 13, wherein when the CCA indicates that the component carrier for the set of PRBs in the unlicensed spectrum is available, the method further comprises:
transmitting one or more of: uplink data, uplink control signals, and uplink reference signals according to one or both of an assigned orthogonal DM-RS sequence and an assigned scrambling code.

21. The method of claim 20, further comprising:
transmitting, along with the one or more of: the uplink data, the uplink control signals, and the uplink reference signals, a signal indicating one or more of: a transmit format selection, a Hybrid Automatic Repeat Request identifier (HARQ-ID), and a HARQ redundancy version (RV).

22. The method of claim 1, further comprising:
transmitting one or more of: a scheduling request, a buffer status report, and a power headroom report for a base station to schedule the uplink grant.

23. The method of claim 22, wherein the power headroom report indicates a first power headroom associated with the licensed spectrum and a second power headroom associated with the unlicensed spectrum.

24. The method of claim 1, further comprising:
identifying a change from a modulation coding scheme (MCS) indicated by the uplink grant; and
transmitting a message over a set of resource elements within PRBs allocated by the uplink grant, the message indicating the identified change in MCS.

25. The method of claim 1, wherein the uplink grant allocates PRBs for uplink transmission without allocating MCS for uplink transmission, the method further comprising:
determining the MCS for uplink transmission upon receiving the uplink grant; and
transmitting a message over a set of resource elements within the PRBs allocated for uplink transmission, the message indicating the MCS determined for uplink transmission.

26. An apparatus for wireless communications, comprising:
a processor;
memory in electronic communication with the processor; and
instructions stored in the memory, the instructions being executable by the processor to:
receive, at a user equipment (UE) capable of transmitting over both a licensed spectrum and an unlicensed spectrum, an uplink grant over the licensed spectrum, wherein the uplink grant indicates that a first set of resources on the unlicensed spectrum and a second set of fallback resources on the licensed spectrum are reserved for the UE;
perform, by the UE, a clear channel assessment (CCA) in response to the uplink grant to determine an availability of the first set of resources on the unlicensed spectrum, the CCA being performed prior to an occurrence of the first set of resources and the second set of fallback resources;
perform, by the UE, a transmission using the first set of resources on the unlicensed spectrum instead of the second set of fallback resources on the licensed spectrum when the performed CCA indicates that the first set of resources is available; and
perform, by the UE, a fallback transmission using the second set of fallback resources on the licensed spectrum instead of the first set of resources on the unlicensed spectrum when the performed CCA indicates that the first set of resources is not available.

27. The apparatus of claim 26, wherein the instructions are executable by the processor to:
transmit signaling using the licensed spectrum indicating unavailability of the unlicensed spectrum when the CCA indicates that the first set of resources not available.

28. The apparatus of claim 26, wherein each of the first set of resources and the second set of resources is specified in terms of one or more of:
a number of subframes, a time interval between successive subframes, and an initial offset between a time of reception of the uplink grant and a first occurrence of a subframe in the first set of resources or the second set of fallback resources.

29. The apparatus of claim 26, wherein:
the first set of resources starts in a first subframe; and
the second set of resources starts in a second subframe delayed from the first subframe.

30. The apparatus of claim 26, wherein:
the uplink grant comprises a prioritized sequence of uplink grants, each uplink grant in the prioritized sequence of uplink grants being associated with a respective component carrier; and
the instructions to perform the CCA are further executable by the processor to:
perform one or more CCAs on one or more component carriers of the respective component carriers associated with the prioritized sequence of uplink grants to determine an availability of the one or more respective component carriers, the instructions executable by the processor to:
identify a component carrier of the one or more component carriers as available based at least in part on the one or more CCAs.

31. The apparatus of claim 30, wherein each uplink grant in the prioritized sequence of uplink grants further comprises one or more of:
a set of physical resource blocks (PRBs) for the respective component carrier; and
a subset of subframes for which the uplink grant is applicable.

32. The apparatus of claim 31, wherein the subset of subframes is specified in terms of one or more of:
a number of subframes in the subset of subframes, a time interval between successive subframes in the subset of subframes, and an initial offset between a time of reception of the uplink grant and a first occurrence of a subframe in the subset of subframes.

33. The apparatus of claim 30, wherein an implicit relationship between parameters in different uplink grants of the prioritized sequence is specified at least in part through radio resource control (RRC) signaling.

34. The apparatus of claim 26, wherein the instructions are executable by the processor to:
receive over the licensed spectrum, an indication of a maximum uplink data rate over the unlicensed spectrum for a set of PRBs; and
perform the CCA in a subframe in response to the indication, the CCA being performed to determine availability of a component carrier for the set of PRBs in the unlicensed spectrum for performing the transmission in a next subframe.

35. The apparatus of claim 34, wherein the instructions are executable by the processor to:
perform the transmission using the unlicensed spectrum based at least in part on the uplink grant when the CCA indicates that the component carrier for the set of PRBs in the unlicensed spectrum is available; and
perform the CCA in the next subframe based at least in part on the uplink grant when the CCA indicates that the component carrier for the set of PRBs in the unlicensed spectrum is not available.

36. The apparatus of claim 34, wherein the instructions are executable by the processor to:
perform the transmission using the unlicensed spectrum based at least in part on the uplink grant when the CCA indicates that the component carrier for the set of PRBs in the unlicensed spectrum is available; and
perform the transmission using the licensed spectrum based at least in part on the uplink grant when the CCA indicates that the component carrier for the set of PRBs in the unlicensed spectrum is not available.

37. The apparatus of claim 34, wherein the same set of PRBs are assigned to each of a plurality of users on an uplink of the unlicensed spectrum.

38. The apparatus of claim 37, wherein data transmitted from the plurality of users assigned the same set of PRBs is decoded using successive interference cancellation (SIC).

39. The apparatus of claim 37, wherein the plurality of users assigned the same set of PRBs are assigned orthogonal demodulation reference signals (DM-RS) sequences.

40. The apparatus of claim 39, wherein each of the plurality of users is assigned a distinct scrambling code.

41. The apparatus of claim 34, wherein when the CCA indicates that the component carrier for the set of PRBs in the unlicensed spectrum is available, the instructions are executable by the processor to:
transmit one or more of: uplink data, uplink control signals, and uplink reference signals according to one or both of an assigned orthogonal DM-RS sequence and an assigned scrambling code.

42. The apparatus of claim 41, wherein the instructions are executable by the processor to:
transmit, along with the one or more of: the uplink data, the uplink control signals, and the uplink reference signals, a signal indicating one or more of: a transmit format selection, a Hybrid Automatic Repeat Request identifier (HARQ-ID), and a HARQ redundancy version (RV).

43. The apparatus of claim 26, wherein the instructions are executable by the processor to:
transmit one or more of: a scheduling request, a buffer status report, and a power headroom report for a base station to schedule the uplink grant.

44. The apparatus of claim 26, wherein:
the uplink grant allocates PRBs for uplink transmission without allocating a modulation coding scheme (MCS) for uplink transmission; and
the instructions are executable by the processor to:
determine the MCS for uplink transmission upon receiving the uplink grant; and
transmit a message over a set of resource elements within the PRBs allocated for uplink transmission, the message indicating the MCS determined for uplink transmission.

45. An apparatus for wireless communications, comprising:
means for receiving, at a user equipment (UE) capable of transmitting over both a licensed spectrum and an unlicensed spectrum, an uplink grant over the licensed spectrum, wherein the uplink grant indicates that a first set of resources on the unlicensed spectrum and a second set of fallback resources on the licensed spectrum are reserved for the UE;
means for performing, by the UE, a clear channel assessment (CCA) in response to the uplink grant to determine an availability of the first set of resources on the unlicensed spectrum, the CCA being performed prior to an occurrence of the first set of resources and the second set of fallback resources;
means for performing, by the UE, a transmission using the first set of resources on the unlicensed spectrum instead of the second set of fallback resources on the licensed spectrum when the performed CCA indicates that the first set of resources is available; and
means for performing, by the UE, a fallback transmission using the second set of fallback resources on the licensed spectrum instead of the first set of resources on the unlicensed spectrum when the performed CCA indicates that the first set of resources is not available.

46. The apparatus of claim 45, further comprising:
means for transmitting signaling using the licensed spectrum indicating unavailability of the unlicensed spectrum when the CCA indicates that the first set of resources is not available.

47. A computer program product for wireless communications, the computer program product comprising a non-transitory computer-readable medium storing instructions executable by a processor to:

receive, at a user equipment (UE) capable of transmitting over both a licensed spectrum and an unlicensed spectrum, an uplink grant over the licensed spectrum, wherein the uplink grant indicates that a first set of resources on the unlicensed spectrum and a second set of fallback resources on the licensed spectrum are reserved for the UE;

perform, by the UE, a clear channel assessment (CCA) in response to the uplink grant to determine an availability of the first set of resources on the unlicensed spectrum, the CCA being performed prior to an occurrence of the first set of resources and the second set of fallback resources;

perform, by the UE, a transmission using the first set of resources on the unlicensed spectrum instead of the second set of fallback resources on the licensed spectrum when the performed CCA indicates that the first set of resources is available; and perform, by the UE, a fallback transmission using the second set of fallback resources on the licensed spectrum instead of the first set of resources on the unlicensed spectrum when the performed CCA indicates that the first set of resources is not available.

48. The computer program product of claim 47, wherein the instructions are executable by the processor to:
transmit signaling using the licensed spectrum indicating unavailability of the unlicensed spectrum when the CCA indicates that the first set of resources is not available.

49. A method for wireless communications, comprising:
receiving scheduling information over a licensed spectrum;
transmitting an uplink grant over the licensed spectrum to a user equipment (UEs) capable of transmitting over both the licensed and an unlicensed spectrum, the uplink grant being based at least in part on the scheduling information and indicating that a first set of resources on the unlicensed spectrum and a second set of fallback resources on the licensed spectrum are reserved for the UE, and the uplink grant being configured to trigger a clear channel assessment (CCA) for determining availability of the first set of resources on the unlicensed spectrum prior to an occurrence of the first set of resources and the second set of fallback resources;
receiving a transmission over the first set of resources on the unlicensed spectrum when the CCA indicates that the first set of resources is available; and
receiving a fallback transmission over the second set of fallback resources on the licensed spectrum when the CCA indicates that the first set of resources is not available.

50. The method of claim 49, wherein the first set of resources overlap in time with the second set of fallback resources.

51. The method of claim 49, wherein the first set of resources and the second set of resources start in a same subframe.

52. The method of claim 49, wherein:
the first set of resources starts in a first subframe; and
the second set of resources starts in a second subframe delayed from the first subframe.

53. The method of claim 52, further comprising:
releasing the second set of fallback resources in the licensed spectrum when the transmission is received over the first set of resources in the unlicensed spectrum.

54. The method of claim 49, wherein the scheduling information comprises one or more of:
a scheduling request;
a buffer status report; and
a power headroom report indicating a first power headroom associated with the licensed spectrum and a second power headroom associated with the unlicensed spectrum.

55. The method of claim 49, further comprising:
assigning a same set of physical resource blocks (PRBs) to a plurality of users on an uplink of the unlicensed spectrum based at least in part on the transmitted uplink grant;
receiving uplink data from the plurality of users using the assigned PRBs; and
decoding the uplink data using a successive interference cancellation (SIC).

56. The method of claim 55, further comprising:
assigning one or both of an orthogonal demodulation reference signals (DM-RS) sequence and a scrambling code to each of the plurality of users for transmission of the uplink data.

57. The method of claim 55, further comprising:
receiving from each of the plurality of users, along with the uplink data, a signal indicating one or more of: a transmit format selection, a Hybrid Automatic Repeat Request identifier (HARQ-ID), and a HARQ redundancy version (RV).

58. An apparatus for wireless communications, comprising:
a processor;
memory in electronic communication with the processor; and
instructions stored in the memory, the instructions being executable by the processor to:
receive scheduling information over a licensed spectrum;
transmit an uplink grant over the licensed spectrum to a user equipment (UEs) capable of transmitting over both the licensed and an unlicensed spectrum, the uplink grant being based at least in part on the scheduling information and indicating that a first set of resources on the unlicensed spectrum and a second set of fallback resources on the licensed spectrum are reserved for the UE, and the uplink grant being configured to trigger a clear channel assessment (CCA) for determining availability of the first set of resources on the unlicensed spectrum prior to an occurrence of the first set of resources and the second set of fallback resources;
receive a transmission over the first set of resources on the unlicensed spectrum when the CCA indicates that the first set of resources is available; and
receive a fallback transmission over the second set of fallback resources on the licensed spectrum when the CCA indicates that the first set of resources is not available.

59. The apparatus of claim 58, wherein the scheduling information comprises one or more of:
a scheduling request;
a buffer status report; and
a power headroom report indicating a first power headroom associated with the licensed spectrum and a second power headroom associated with the unlicensed spectrum.

60. An apparatus for wireless communications, comprising:
means for receiving scheduling information over a licensed spectrum;

means for transmitting an uplink grant over the licensed spectrum to a user equipment (UEs) capable of transmitting over both the licensed and an unlicensed spectrum, the uplink grant being based at least in part on the scheduling information and indicating that a first set of resources on the unlicensed spectrum and a second set of fallback resources on the licensed spectrum are reserved for the UE, and the uplink grant being configured to trigger a clear channel assessment (CCA) for determining availability of the first set of resources on the unlicensed spectrum prior to an occurrence of the first set of resources and the second set of fallback resources;

means for receiving a transmission over the first set of resources on the unlicensed spectrum when the CCA indicates that the first set of resources is available; and means for receiving a fallback transmission over the second set of fallback resources on the licensed spectrum when the CCA indicates that the first set of resources is not available.

61. A computer program product for wireless communications, the computer program product comprising a non-transitory computer-readable medium storing instructions executable by a processor to:

receive scheduling information over a licensed spectrum;

transmit an uplink grant over the licensed spectrum to a user equipment (UEs) capable of transmitting over both the licensed and an unlicensed spectrum, the uplink grant being based at least in part on the scheduling information and indicating that a first set of resources on the unlicensed spectrum and a second set of fallback resources on the licensed spectrum are reserved for the UE, and the uplink grant being configured to trigger a clear channel assessment (CCA) for determining availability of the first set of resources on the unlicensed spectrum prior to an occurrence of the first set of resources and the second set of fallback resources;

receive a transmission over the first set of resources on the unlicensed spectrum when the CCA indicates that the first set of resources is available; and receive a fallback transmission over the second set of fallback resources on the licensed spectrum when the CCA indicates that the first set of resources is not available.

* * * * *